US011677922B2

United States Patent
Oh et al.

(10) Patent No.: US 11,677,922 B2
(45) Date of Patent: Jun. 13, 2023

(54) APPARATUS FOR TRANSMITTING A VIDEO, A METHOD FOR TRANSMITTING A VIDEO, AN APPARATUS FOR RECEIVING A VIDEO, AND A METHOD FOR RECEIVING A VIDEO

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/268,350

(22) PCT Filed: Aug. 12, 2019

(86) PCT No.: PCT/KR2019/010183
§ 371 (c)(1),
(2) Date: Feb. 12, 2021

(87) PCT Pub. No.: WO2020/036384
PCT Pub. Date: Feb. 20, 2020

(65) Prior Publication Data
US 2021/0321072 A1    Oct. 14, 2021

Related U.S. Application Data

(60) Provisional application No. 62/717,902, filed on Aug. 12, 2018.

(51) Int. Cl.
*H04N 13/128* (2018.01)
*H04N 13/161* (2018.01)
(Continued)

(52) U.S. Cl.
CPC ......... *H04N 13/128* (2018.05); *H04N 13/161* (2018.05); *H04N 13/194* (2018.05); *H04N 13/282* (2018.05)

(58) Field of Classification Search
None
See application file for complete search history.

(56) References Cited

U.S. PATENT DOCUMENTS

2010/0046619 A1   2/2010   Koo et al.
2014/0111611 A1*  4/2014   Lecroart .............. H04N 19/156
                                                    348/43
(Continued)

FOREIGN PATENT DOCUMENTS

EP    2536142       12/2012
KR    100566100      3/2006
(Continued)

OTHER PUBLICATIONS

PCT International Search Report and Written Opinion in International Appln. No. PCT/KR2019/010183, dated Dec. 10, 2019, 12 pages.

*Primary Examiner* — Christopher Braniff
(74) *Attorney, Agent, or Firm* — Fish & Richardson P.C.

(57) ABSTRACT

An apparatus for transmitting a video comprises an inter-view redundancy remover configured to remove redundant information of pictures for viewing positions, where redundant pixel information between the pictures in adjacent viewing positions is removed, a packing unit configured to pack the pictures and generate packing information, and an encoder configured to encode the pictures. The apparatus is further configured to perform multi-view packing the pictures into a packed picture, where each view for the picture includes different types of a texture and a depth map, and a residual of texture and a depth map are generated for a subsidiary view based on redundancy between each view. The apparatus is further configured to generate signaling information for the inter-view redundancy remover, the packing unit, or the multi-view packing.

14 Claims, 28 Drawing Sheets

(51) Int. Cl.
*H04N 13/194* (2018.01)
*H04N 13/282* (2018.01)

(56) References Cited

U.S. PATENT DOCUMENTS

2014/0168362 A1* 6/2014 Hannuksela ......... H04N 13/161
  348/43
2014/0341289 A1 11/2014 Schwarz et al.
2021/0250600 A1* 8/2021 Kuma ..................... G06T 9/00
2021/0281858 A1* 9/2021 Hannuksela ......... H04N 19/176

FOREIGN PATENT DOCUMENTS

WO WO2017142353 8/2017
WO WO2019185985 * 10/2019

* cited by examiner

[Fig. 1]
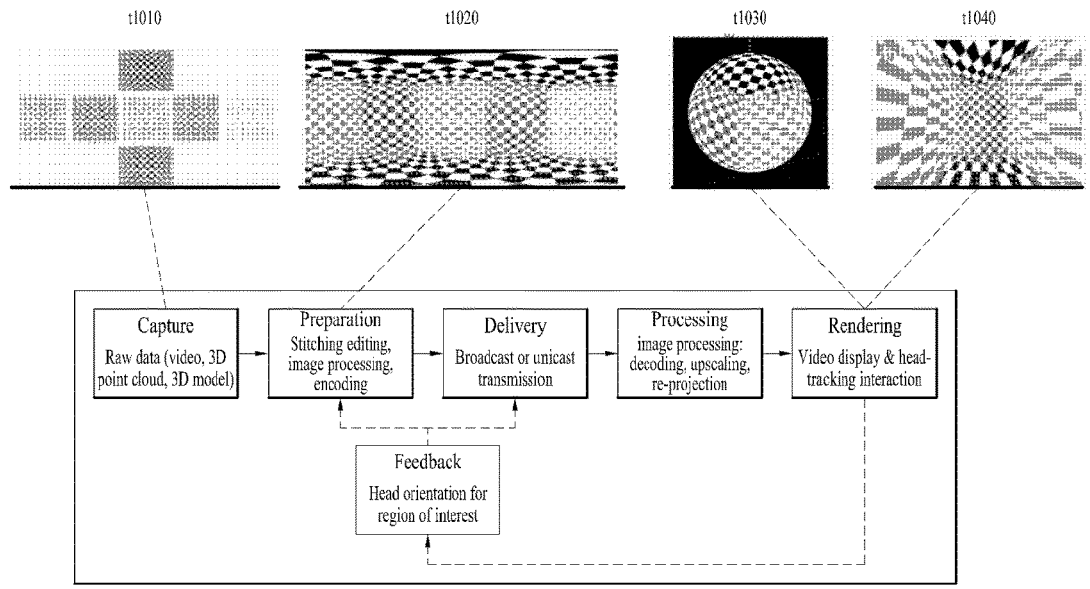
[Fig. 2]
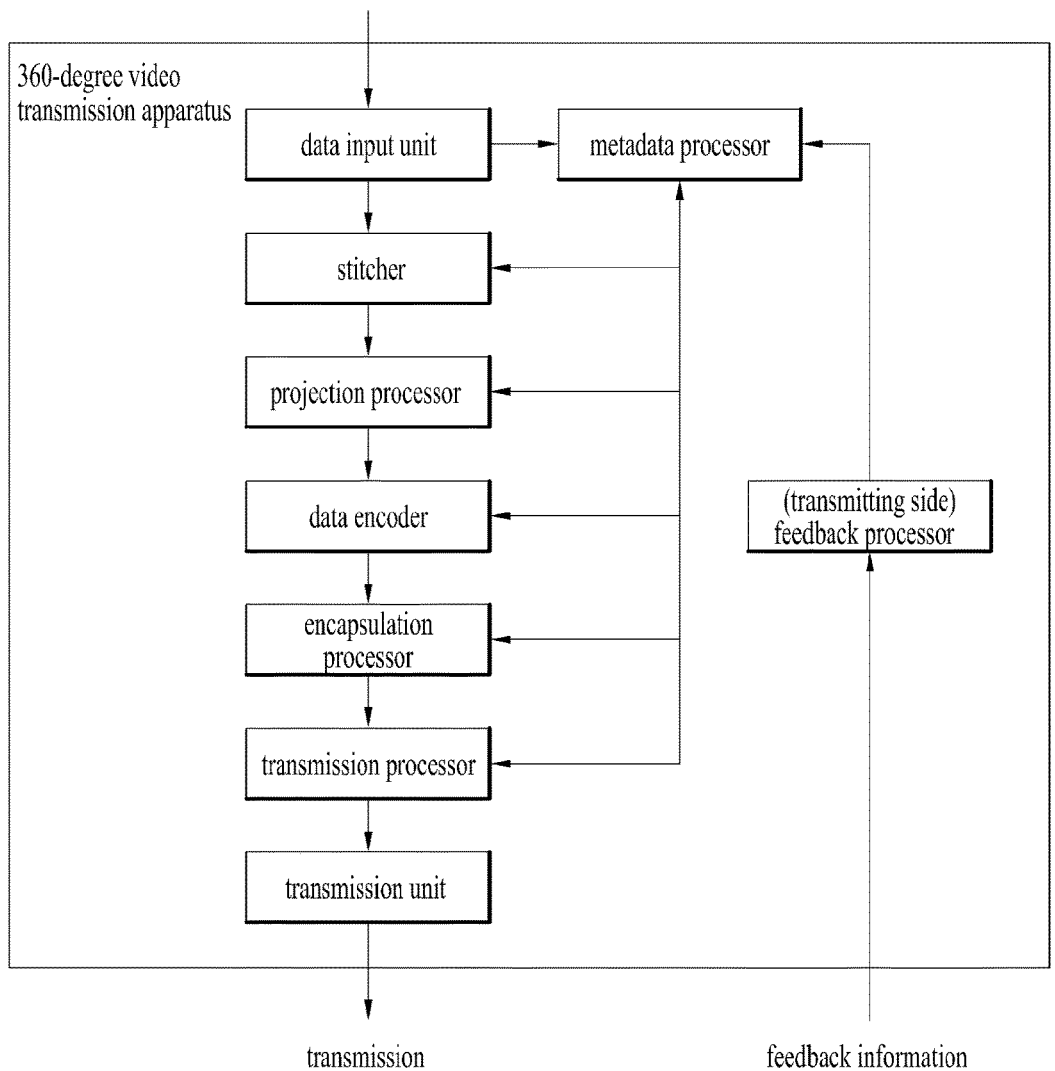

[Fig. 3]
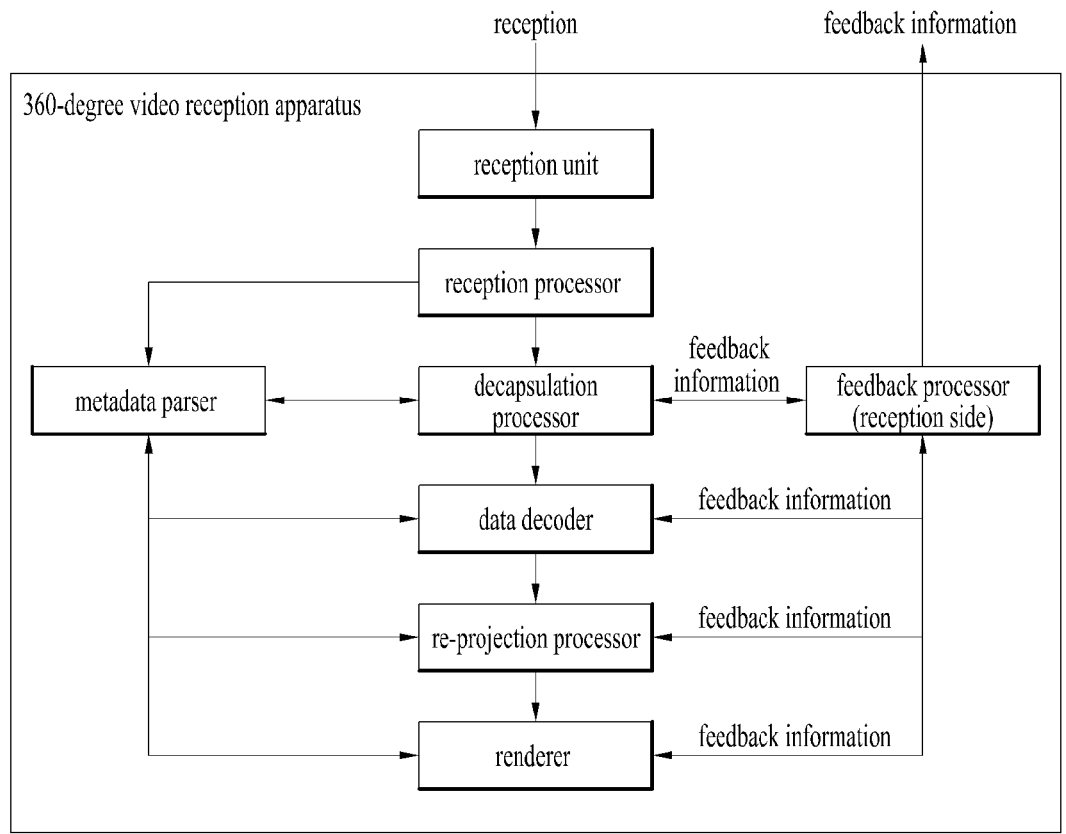
[Fig. 4]
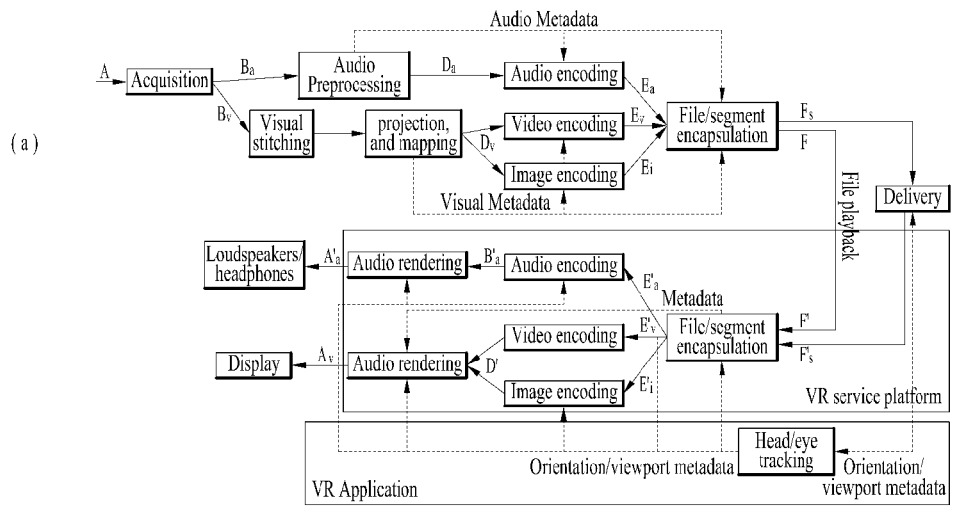
(a)
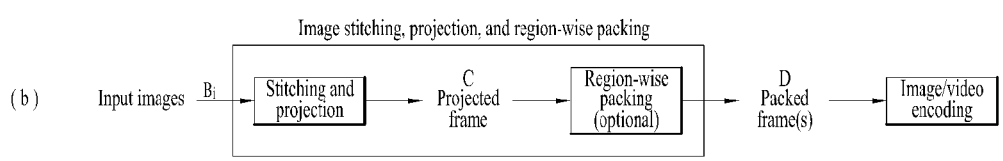
(b)

[Fig. 5]
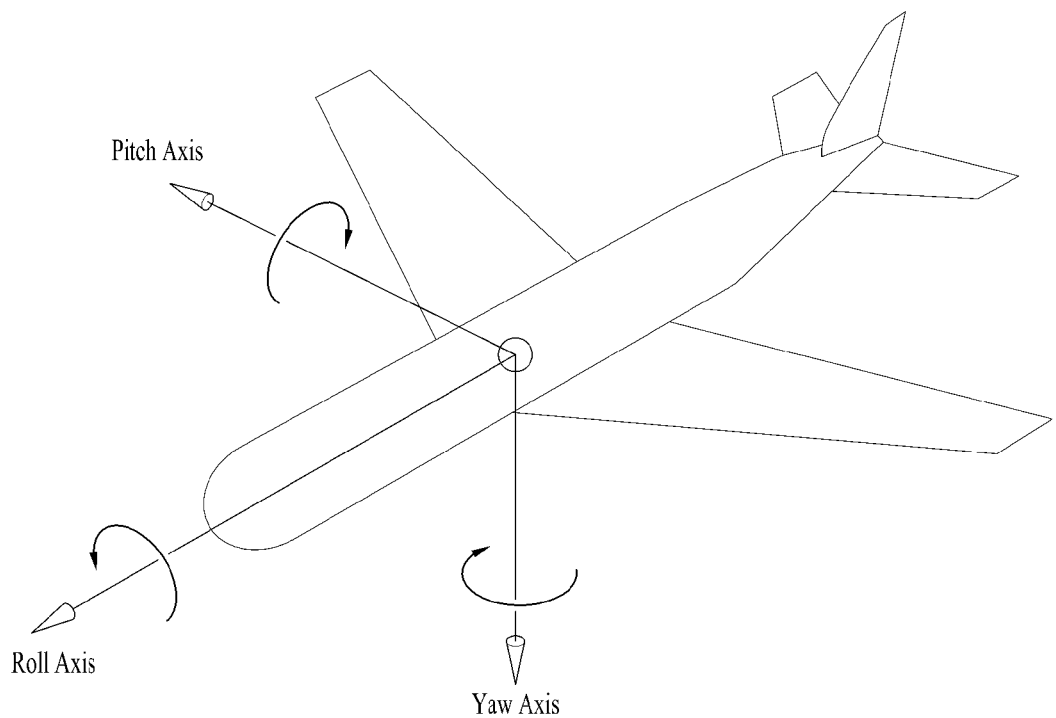

[Fig. 6]
(a) 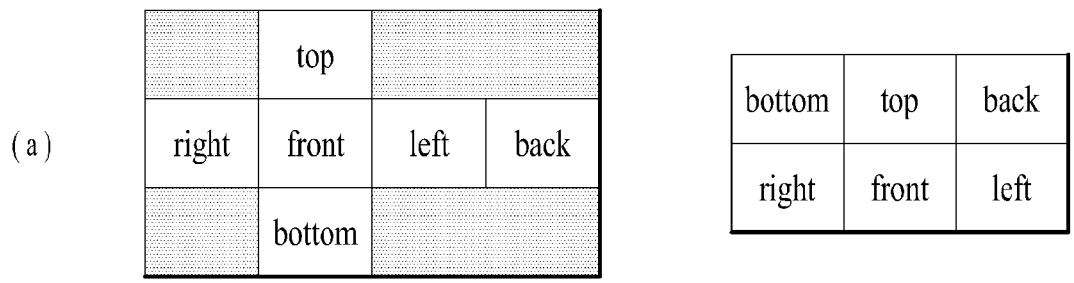
(b) 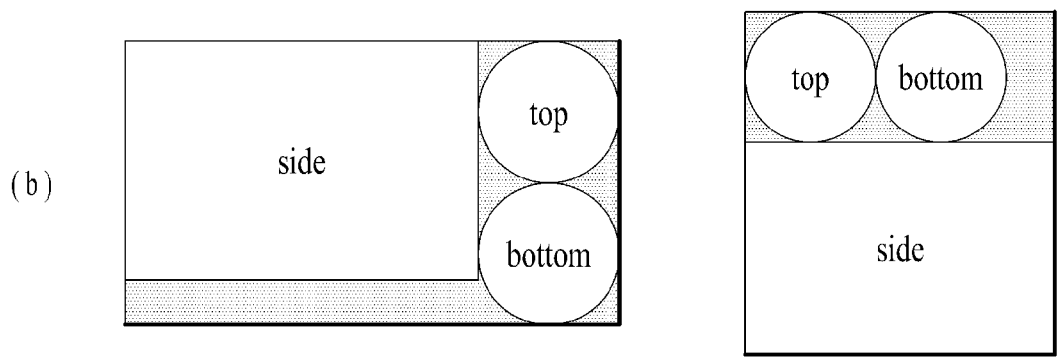
(c) 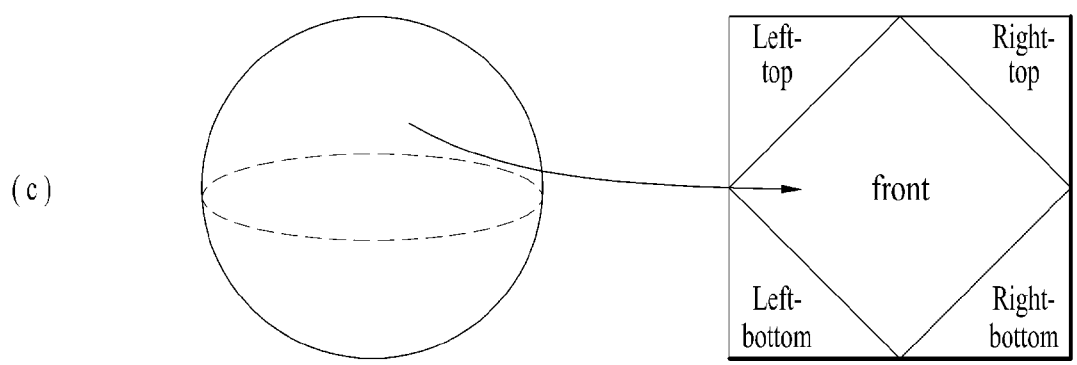

[Fig. 7]
(a)
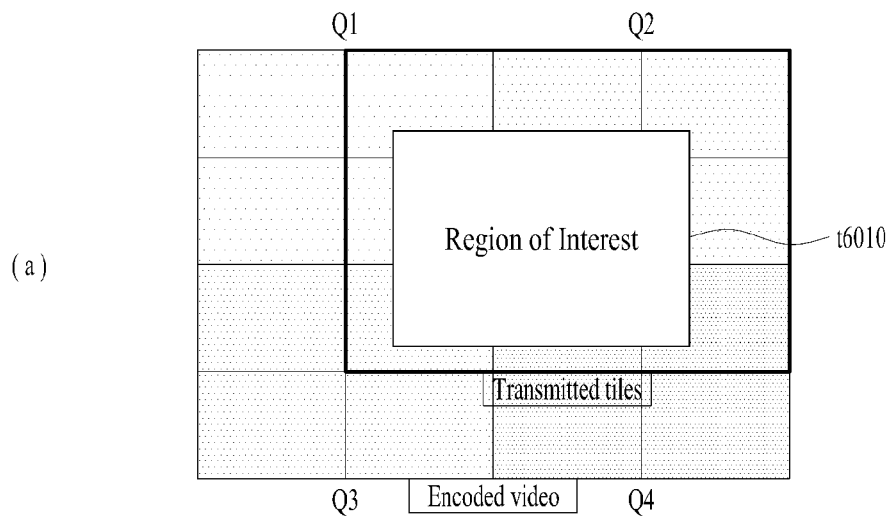
(b)
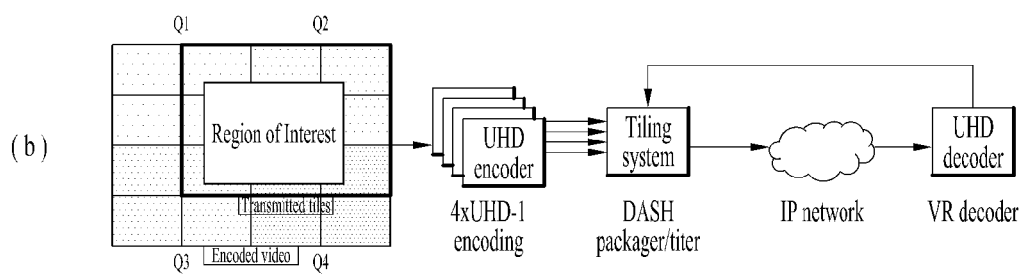

[Fig. 8]

```
.....
        <basic metadata>
unsigned    int(8)          vr_geometry;
unsigned    int(8)          projection_schme;
        <Stereoscopic related metadata>
unsigned    int(1)          is_stereoscopic;
unsigned    int(3)          stereo_mode;
        <Initial View related metadata>
signed      int(8)          initial_view_yaw_degree;
signed      int(8)          initial_view_pitch_degree;
signed      int(8)          initial_view_roll_degree;
        <ROI related metadata>
unsigned int(1)             2d_roi_range_flag;
unsigned int(1)             3d_roi_range_flag;
if (2d_roi_region_flag ==1) {
    unsigned int(16) min_top_left_x;
    unsigned int(16) max_top_left_x;
    unsigned int(16) min_top_left_y;
    unsigned int(16) max_top_left_y;
    unsigned int(16) min_width;
    unsigned int(16) max_width;
    unsigned int(16) min_height;
    unsigned int(16) max_height;
    unsigned int(16) min_x;
    unsigned int(16) max_x;
    unsigned int(16) min_y;
    unsigned int(16) max_y;
}
if (3d_roi_rcgion_flag ==1) {
    unsigned int(16) min_yaw;
    unsigned int(16) max_yaw;
    unsigned int(16) min_pitch;
    unsigned int(16) max_pitch;
    unsigned int(16) min_roll;
    unsigned int(16) max_roll;
    unsigned int(16) min_field_of_view;
    unsigned int(16) max_field_of_view;
}
        <Field Of View related metadata>
unsigned int(1)             content_fov_flag;
if (content_fov_flag == 1) {
    unsigned int(16)        content_fov;
}
        <Cropped Region related metadata>
unsigned int(1)             is_cropped_region;
if(is_cropped_region == 1) {
    unsigned int(16)        cr_region_left_top_x;
    unsigned int(16)        cr_region_left_top_y;
    unsigned int(16)        cr_region_width;
    unsigned int(16)        cr_region_height;
}
.....
```

[Fig. 9]
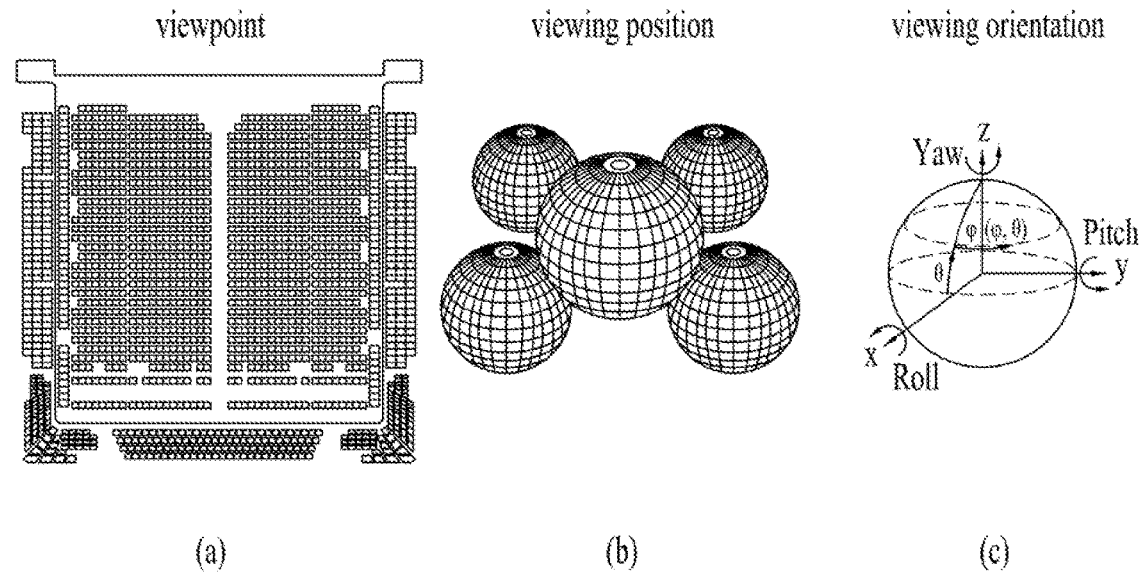
[Fig. 10]
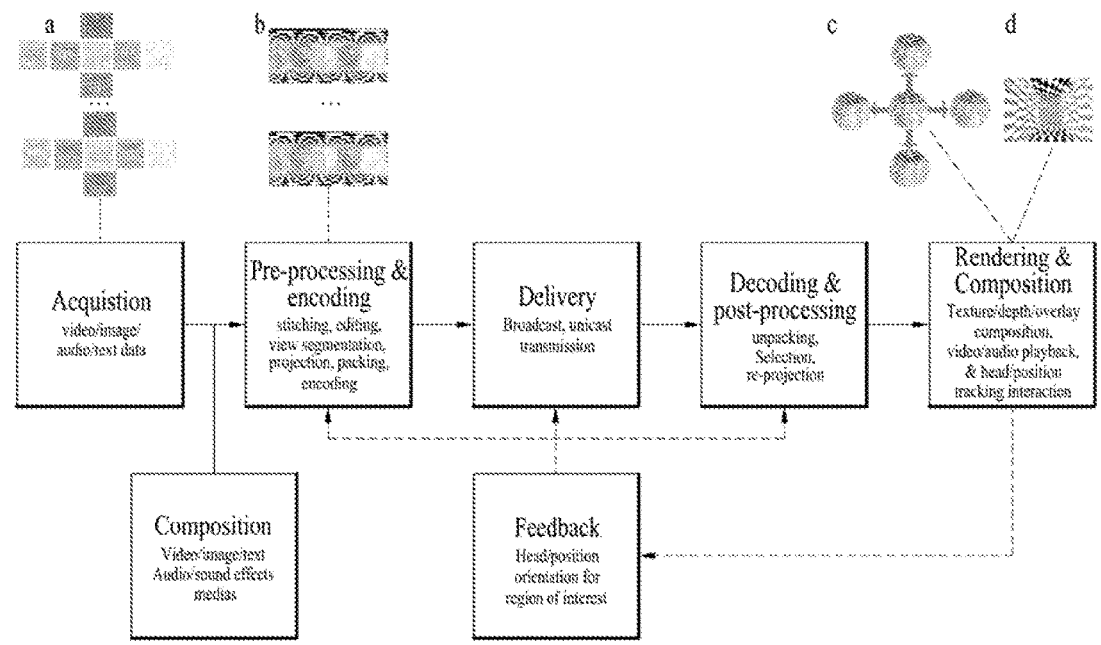

[Fig. 11]
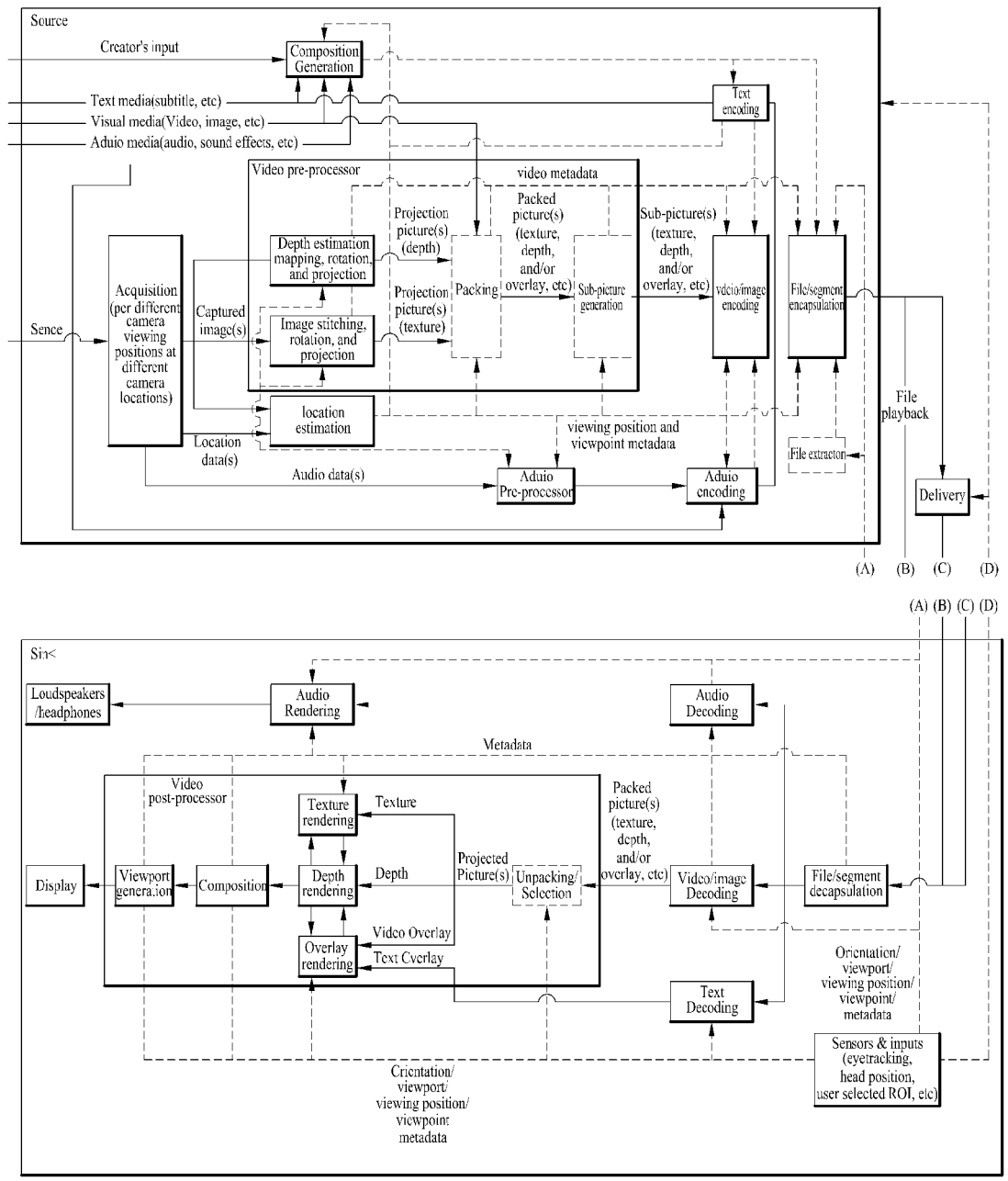

[Fig. 12]
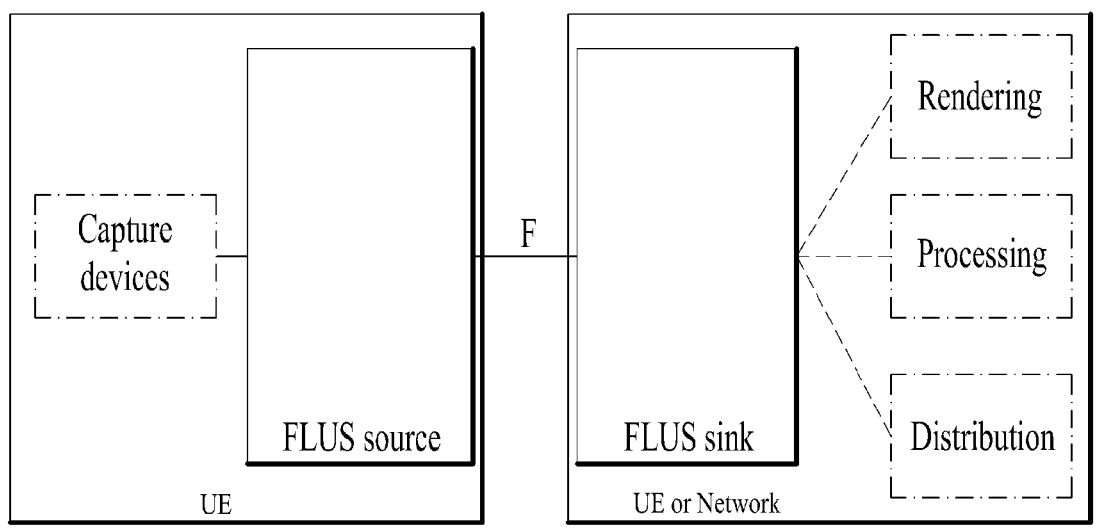

[Fig. 13]
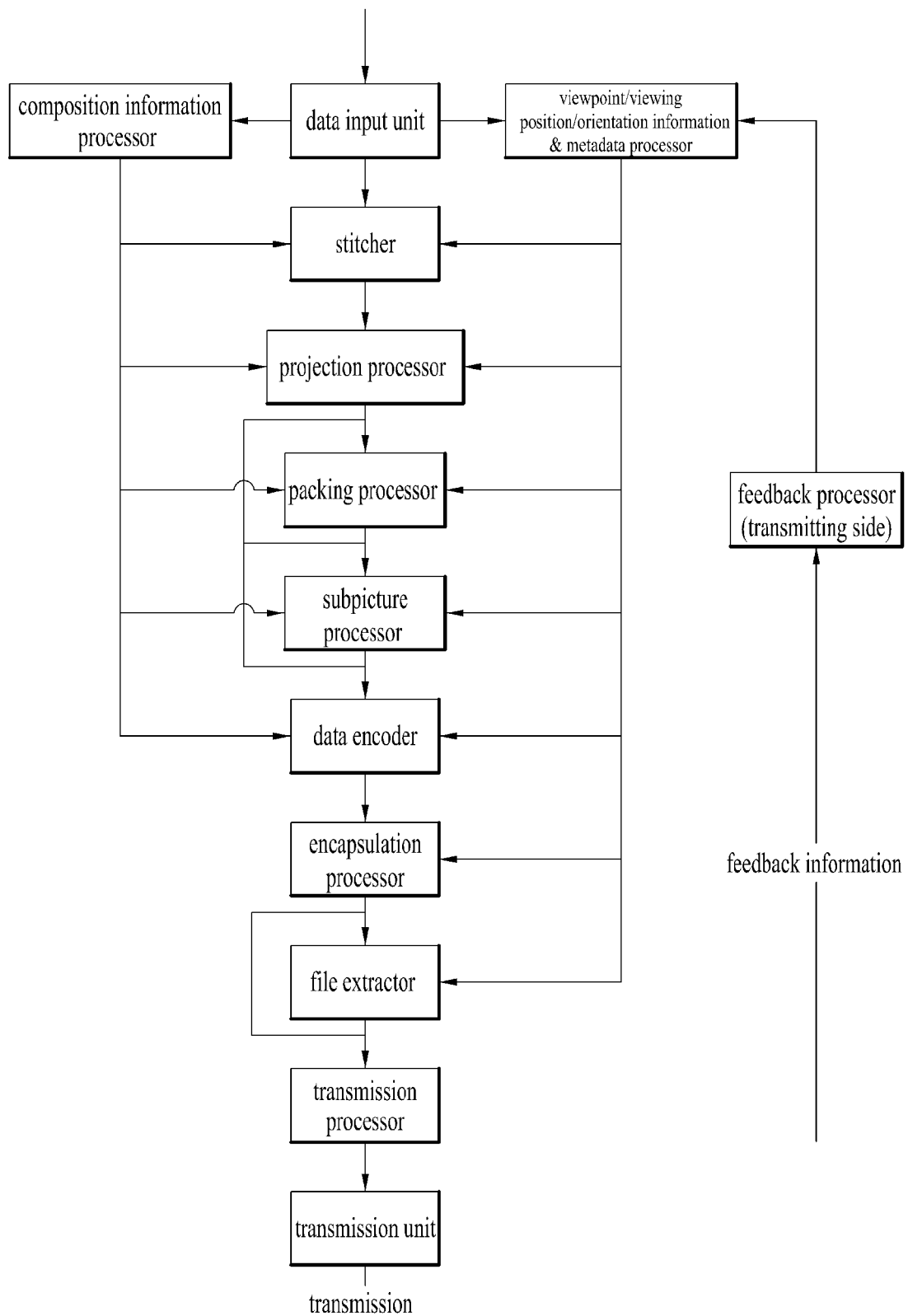

[Fig. 14]
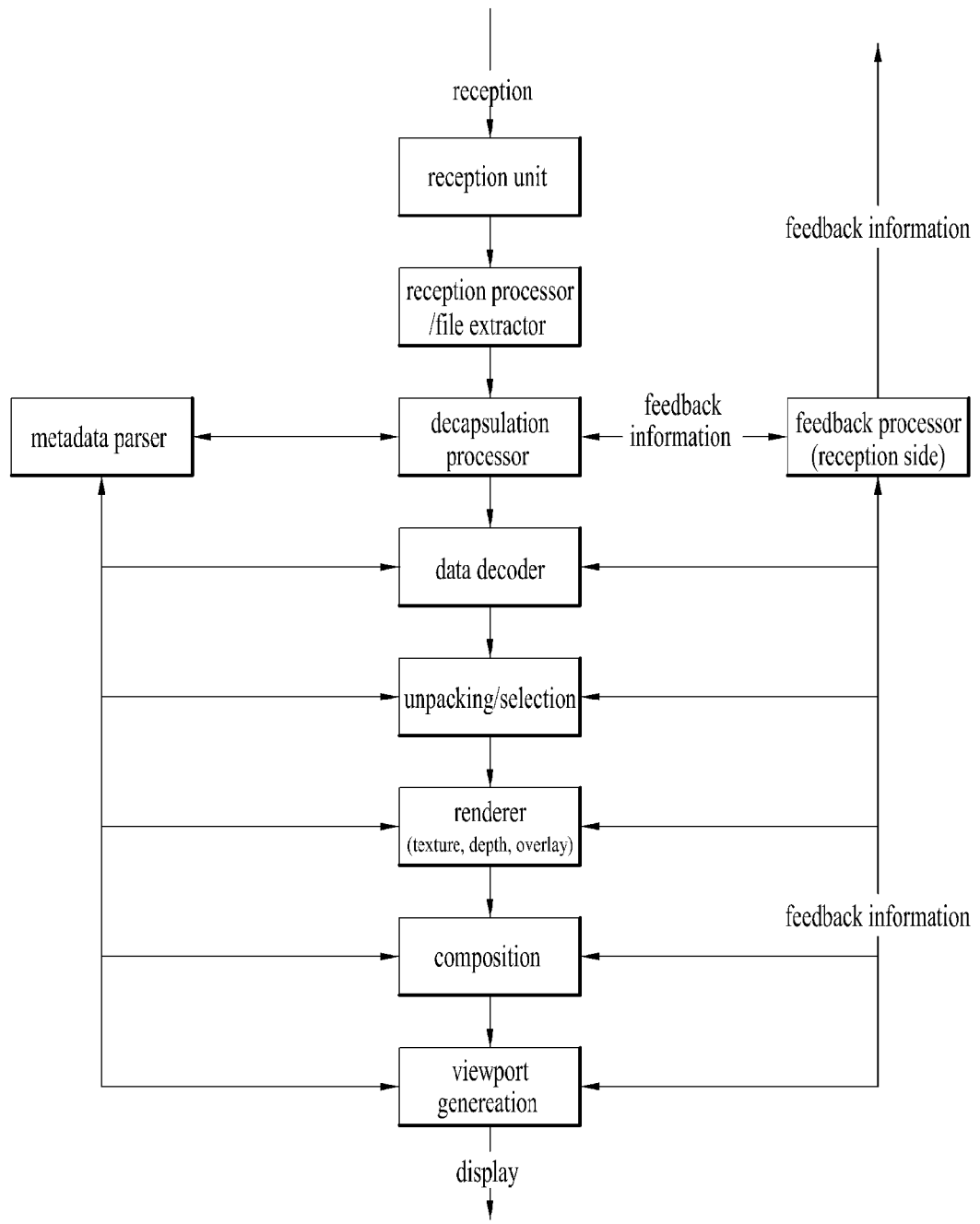

[Fig. 15]
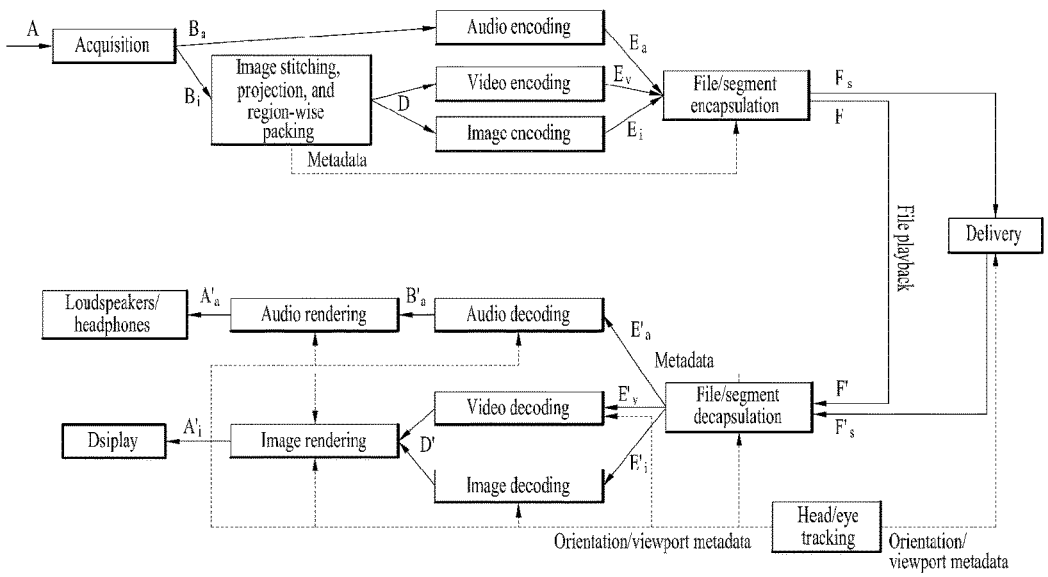
[Fig. 16]
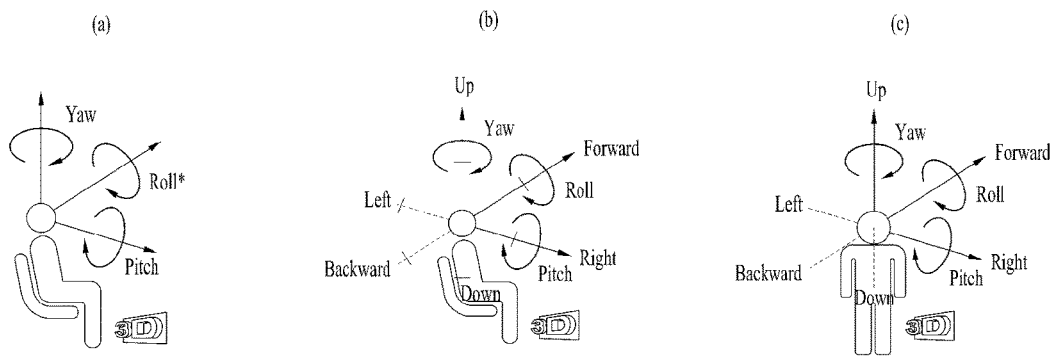
[Fig. 17]
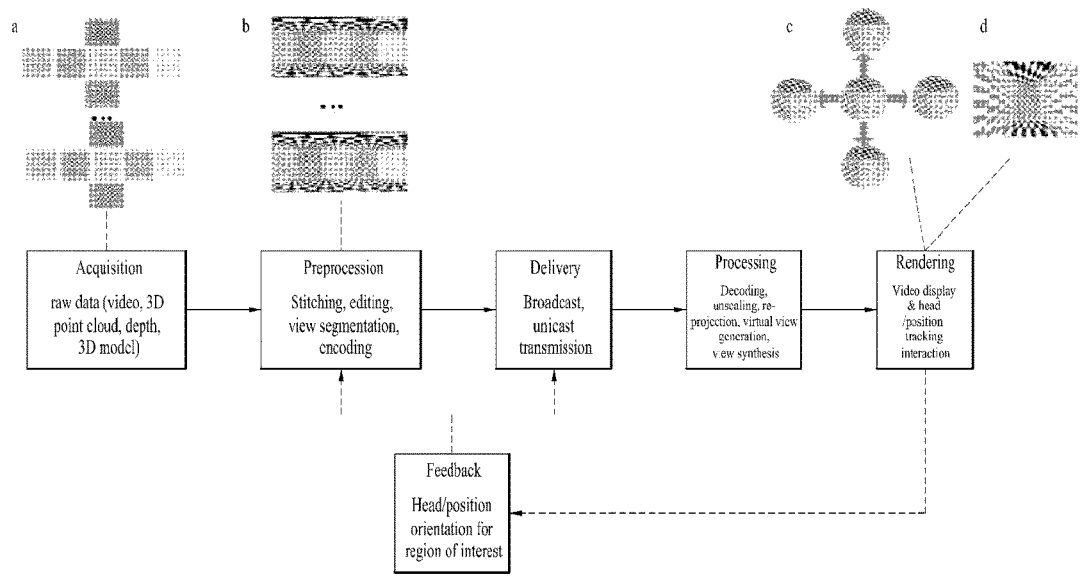

[Fig. 18]
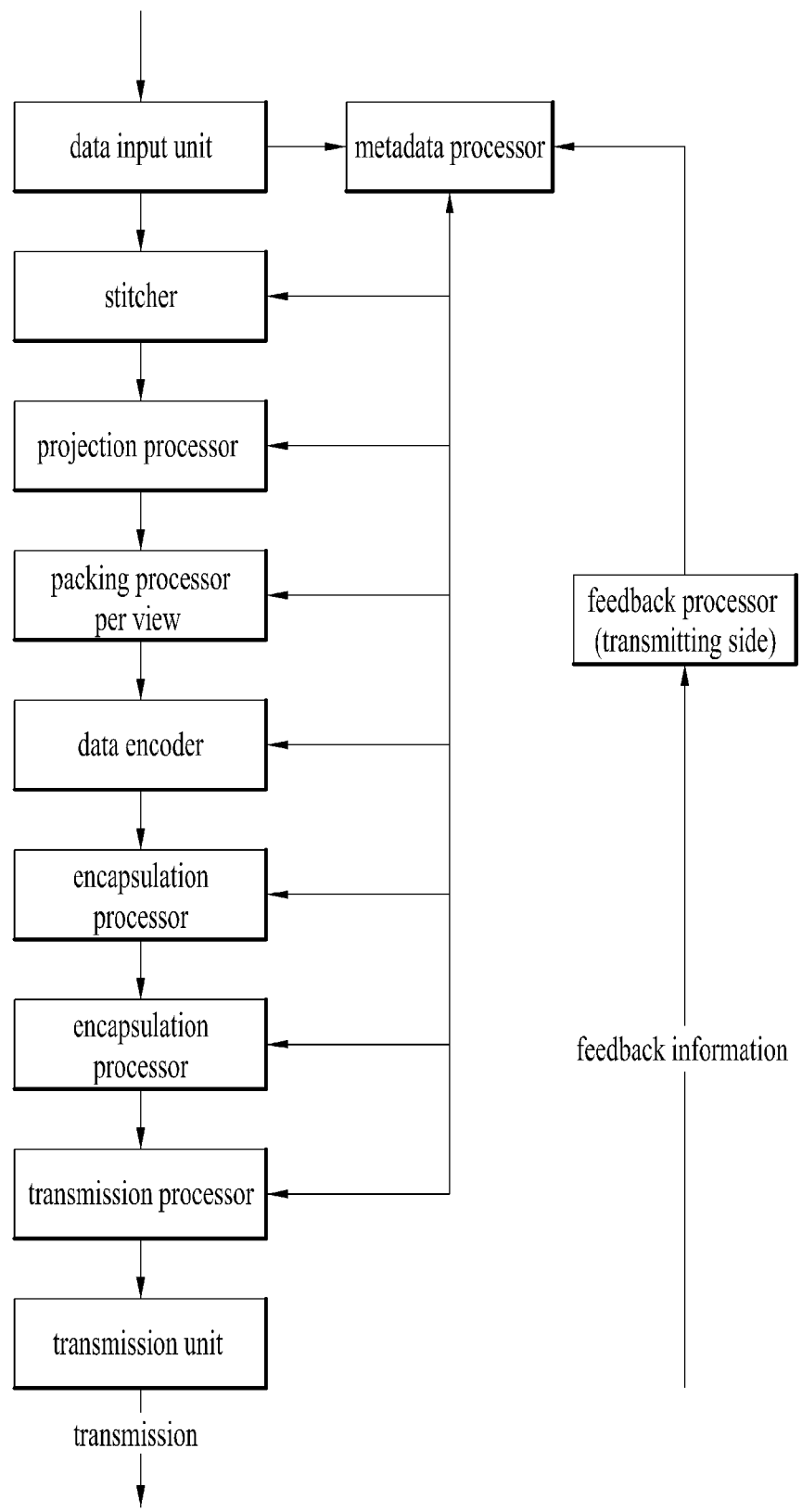

[Fig. 19]
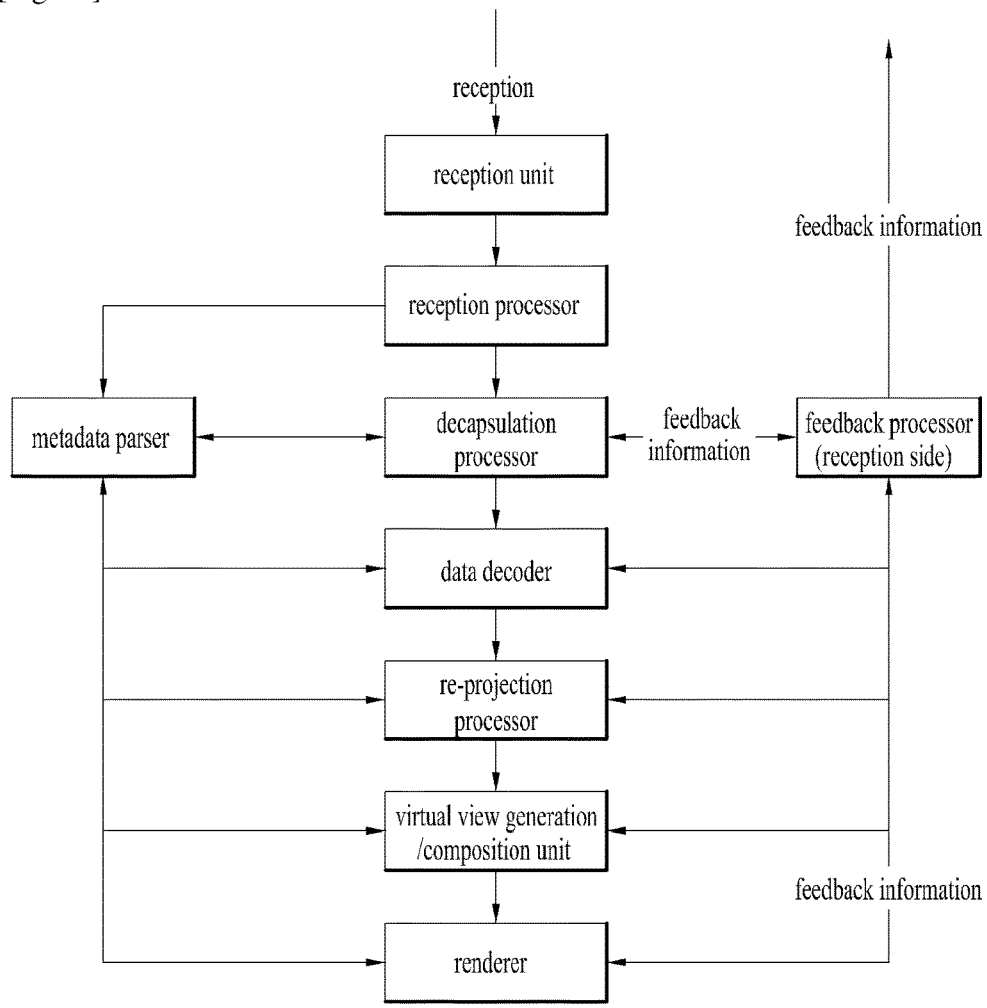
[Fig. 20]
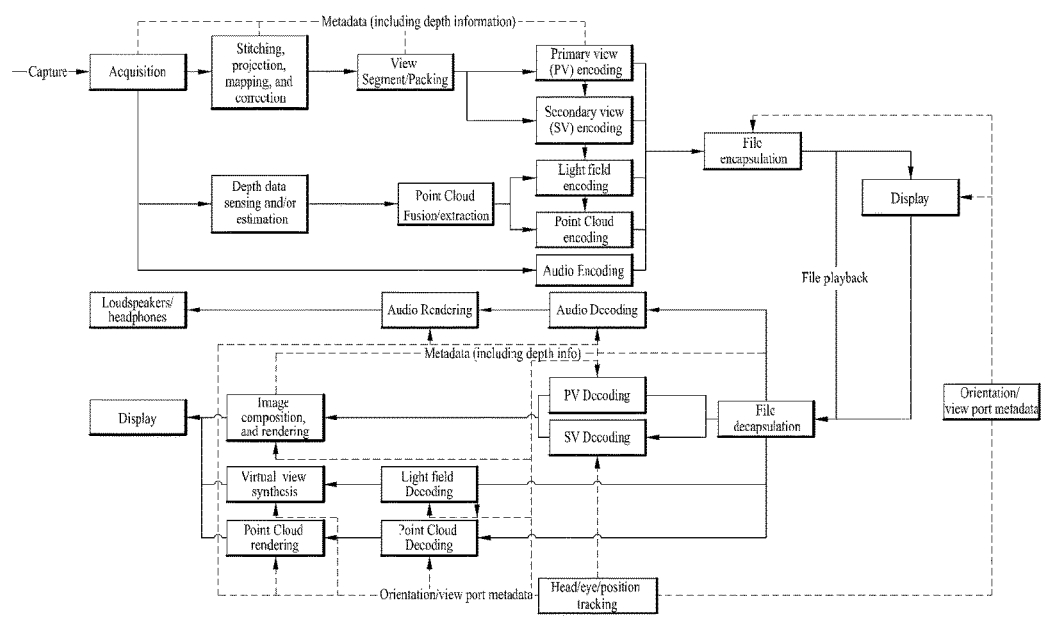

[Fig. 21]
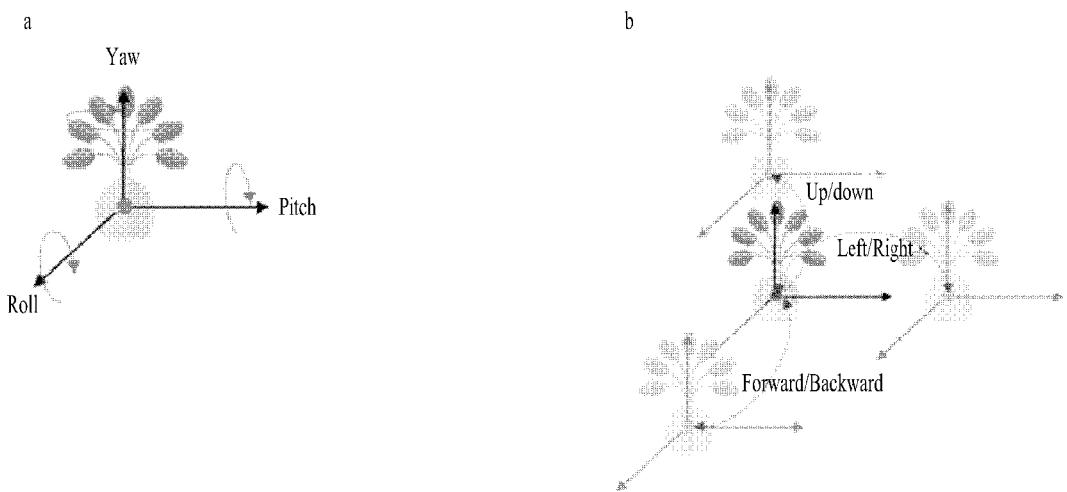
[Fig. 22]
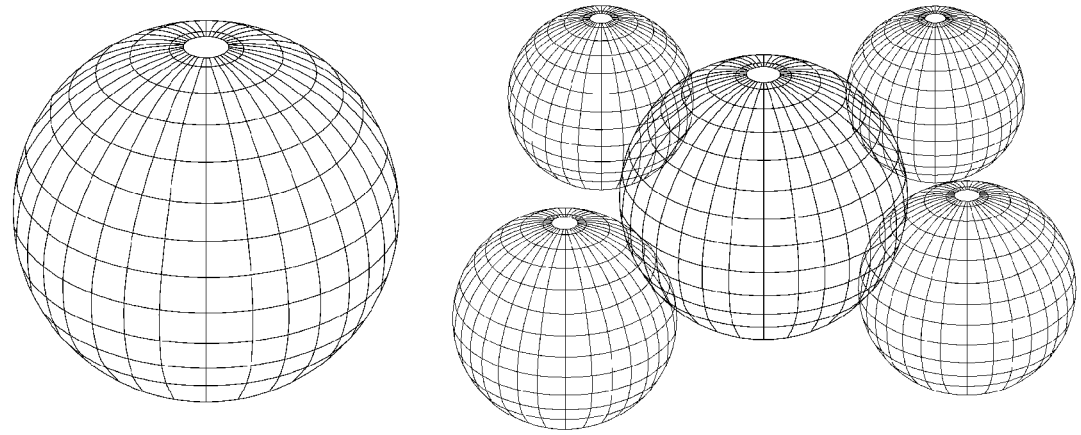
single sphere for 360 video of 3DoF     multiple spheres to support head motion parallax of 3DoF+

[Fig. 23]
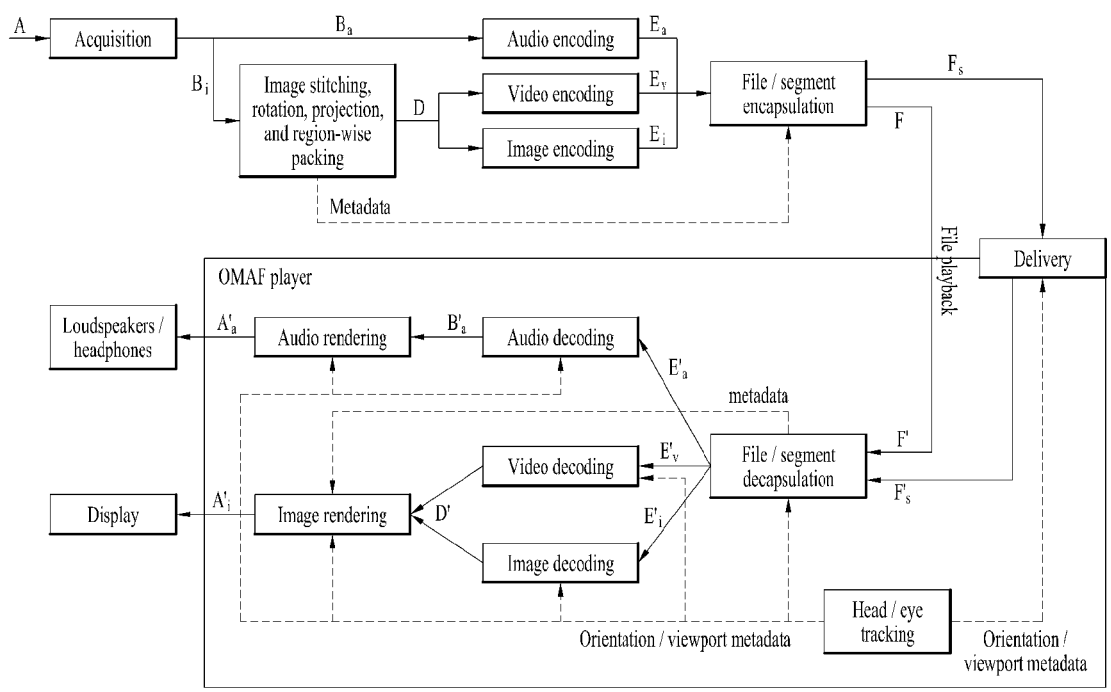

[Fig. 24]

| | Descriptor |
|---|---|
| view_regeneration_info (payloadSize) { | |
|   view_regeneration_info_id | u(11) |
|   view_regeneration_info_cancel_flag | u(1) |
|   if( ! view_regeneration_info_cancel_flag ) { | |
|     view_regeneration_info_persistence_flag | u(1) |
|     num_view_regeneration_minus1 | u(8) |
|     for( i = 0; i <= num_view_regeneration_minus1; i++ ) { | |
|       regenerated_view_id[ i ]      // target_view_id | u(8) |
|       regenerated_component_id[ i ]   // target_component_id | u(8) |
|       view_location_x[ i ] | i(32) |
|       view_location_y[ i ] | i(32) |
|       view_location_z[ i ] | i(32) |
|       view_rotation_yaw[ i ] | i(32) |
|       view_rotation_pitch[ i ] | i(32) |
|       view_rotation_roll[ i ] | i(32) |
|       picture_width[ i ] | u(8) |
|       picture_height[ i ] | u(8) |
|       projection_type[ i ] | u(8) |
|       component_type[ i ] | u(8) |
|       if(component_type[ i ] == 2 ) { | |
|         depth_near[ i ] | u(32) |
|         depth_far[ i ] | u(32) |
|       } | |
|       view_regeneration_info_flag[ i ] | u(1) |
|       reserved_zero_7bits[ i ] | u(7) |
|       if( view_regeneration_flag[ i ] ) { | |
|         patch_filling_flag[ i ] | u(1) |
|         local_disparity_compensation_flag[ i ] | u(1) |
|         block_boundary_processing_flag[ i ] | u(1) |
|         reserved_zero_5bits[ i ] | u(5) |
|         if( patch_filling_flag[ i ] ) { | |
|           num_patched_blocks[ i ] | u(8) |
|           for(j=0; j < num_patched_blocks[i]; j++ ) { | |
|             regenerated_picture_top_left_index_x[ i ][ j ] | u(16) |
|             regenerated_picture_top_left_index_y[ i ][ j ] | u(16) |
|             regenerated_picture_bottom_right_index_x[ i ][ j ] | u(16) |
|             regenerated_picture_bottom_right_index_y[ i ][ j ] | u(16) |
|             patch_view_id[ i ][ j ] | u(8) |
|             patch_component_id[ i ][ j ] | u(8) |
|             patch_top_left_index_x[ i ][ j ] | u(16) |
|             patch_top_left_index_y[ i ][ j ] | u(16) |
|             patch_bottom_right_index_x[ i ][ j ] | u(16) |
|             patch_bottom_right_index_y[ i ][ j ] | u(16) |
|           } | |
|         } | |
|         if( !local_disparity_compensation_flag[ i ] ) { | |

[Fig. 25]

| | | |
|---|---|---|
| num_blocks[ i ] | | u(8) |
| for( j=0; j < num_blocks[i]; j++ ) { | | |
| regenerated_picture_top_left_index_x[ i ][ j ] | | u(8) |
| regenerated_picture_top_left_index_y[ i ][ j ] | | u(8) |
| regenerated_picture_bottom_right_index_x[ i ][ j ] | | u(8) |
| regenerated_picture_bottom_right_index_y[ i ][ j ] | | u(8) |
| num_ref_pictures_minus1[ i ][ j ] | | u(8) |
| for( k=0; k <= num_ref_pictures_minus1[i][j]; k++ ) { | | |
| ref_view_id[ i ][ j ][ k ] | | u(8) |
| ref_component_id[ i ][ j ][ k ] | | u(8) |
| ref_top_left_index_x[ i ][ j ][ k ] | | u(8) |
| ref_top_left_index_y[ i ][ j ][ k ] | | u(8) |
| ref_bottom_right_index_x[ i ][ j ][ k ] | | u(8) |
| ref_bottom_right_index_y[ i ][ j ][ k ] | | u(8) |
| inter_picture_local_offset_x[ i ][ j ][ k ] | | u(8) |
| inter_picture_local_offset_y[ i ][ j ][ k ] | | u(8) |
| hor_scaling_factor[ i ][ j ][ k ] | | u(32) |
| ver_scaling_factor[ i ][ j ][ k ] | | u(32) |
| if( !num_ref_pictures_minus1[ i ][ j ] ) | | |
| compensation_local_weight[ i ][ j ][ k ] | | u(8) |
| } | | |
| } | | |
| } | | |
| else { | | |
| num_ref_pictures_minus1[ i ] | | u(8) |
| for( j = 0; j <= num_ref_source_views_minus1[ i ]; j++ ) { | | |
| ref_view_id[ i ][ j ] | | u(8) |
| ref_component_id[ i ][ j ] | | u(8) |
| inter_picture_global_offset_x[ i ][ j ] | | u(8) |
| inter_picture_global_offset_y[ i ][ j ] | | u(8) |
| if( !num_ref_pictures_minus1[ i ] ) | | |
| compensation_global_weight[ i ][ j ] | | u(8) |
| } | | |
| } | | |
| } | | |
| if( block_boundary_processing_flag[ i ] ) { | | |
| block_boundary_processing_type[ i ]   // blank, interpolation, duplication_left, duplication_right, uplicate_average | | u(8) |
| num_coeffs_minus1[ i ] | | u(8) |
| for( j = 0; j <= num_coeff_minus1[ i ]; j++ ) | | |
| block_boundary_filter_coeff[ i ][ j ] | | i(32) |
| } | | |
| } | | |
| } | | |
| } | | |

[Fig. 26]
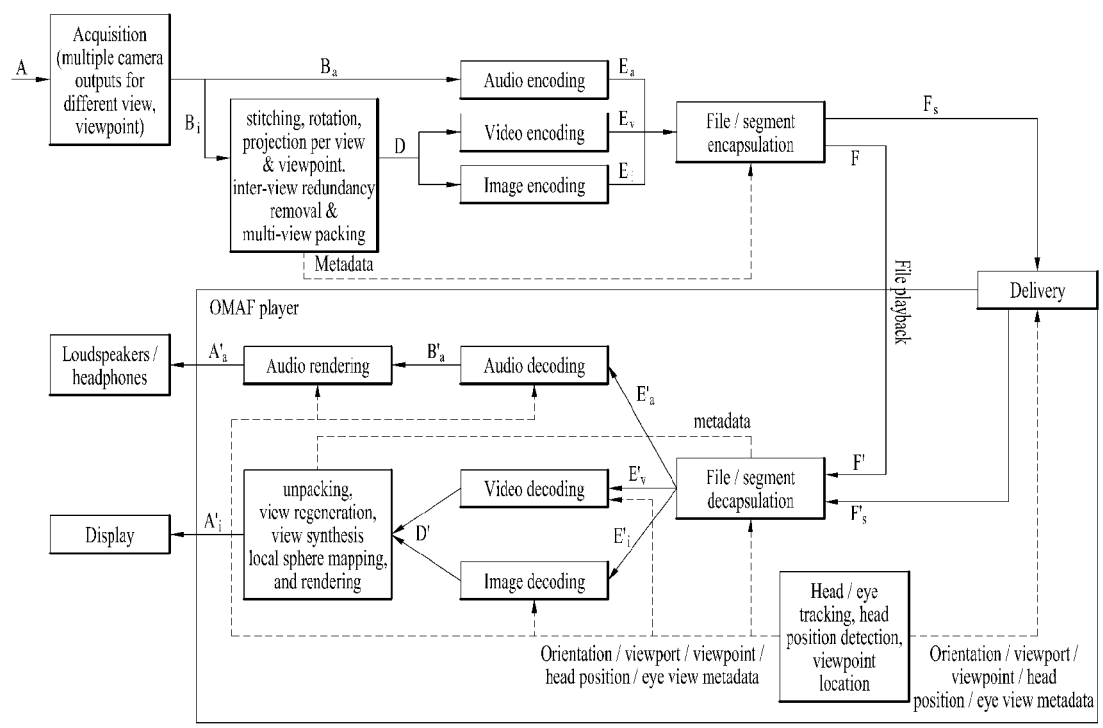

[Fig. 27]

| | Descriptor |
|---|---|
| multiview_regionwise_packing( payloadSize ) { | |
|   multiview_regionwise_packing_id | u(12) |
|   multiview_regionwise_packing_cancel_flag | u(1) |
|   if( ! multiview_regionwise_packing_cancel_flag ) { | |
|     multiview_regionwise_packing_persistence_flag | u(1) |
|     constituent_picture_matching_flag | u(1) |
|     packing_format_matching_between_views_flag | u(1) |
|     num_view_minus1 | u(8) |
|     for( i = 0; i <= num_view_minus1; i++ ) { | |
|       mrwp_view_id[ i ] | u(8) |
|       mrwp_anchor_view_flag[ i ]    // or constraint on the case j equal to 0 | u(1) |
|       mrwp_view_independent_rotation_flag[ i ] | u(1) |
|       mrwp_component_independent_rotation_flag | u(1) |
|       mrwp_all_components_packed_in_one_region_flag[ i ] | u(1) |
|       view_regeneration_flag[ i ] | u(1) |
|       mrwp_reserved_zero_3bits[ i ] | u(3) |
|       if( mrwp_anchor_view_flag[i] ) { | |
|         mrwp_location_anchor_view_x[ i ] | i(32) |
|         mrwp_location_anchor_view_y[ i ] | i(32) |
|         mrwp_location_anchor_view_z[ i ] | i(32) |
|         mrwp_rotation_anchor_view_yaw[ i ] | i(32) |
|         mrwp_rotation_anchor_view_pitch[ i ] | i(32) |
|         mrwp_rotation_anchor_view_roll[ i ] | i(32) |
|       } | |
|       else { | |
|         mrwp_location_diff_x[ i ] | i(32) |
|         mrwp_location_diff_y[ i ] | i(32) |
|         mrwp_location_diff_z[ i ] | i(32) |
|         if( mrwp_view_independent_rotation_flag[i] ) { | |
|           mrwp_rotation_diff_yaw[ i ] | i(32) |
|           mrwp_rotation_diff_pitch[ i ] | i(32) |
|           mrwp_rotation_diff_roll[ i ] | i(32) |
|         } | |
|       } | |
|       num_component_minus1[ i ] | u(8) |
|       for( j = 0; j <= num_component_minus1[i]; j++ ) { | |
|         mrwp_component_id[ i ][ j ] | u(8) |
|         mrwp_component_type[ i ][ j ]    // texture(L,R), depth, residual, alpha | u(4) |
|         mrwp_projection_type[ i ][ j ]    // erp, cmp, ... | u(4) |
|         mrwp_proj_picture_width[ i ][ j ] | u(32) |
|         mrwp_proj_picture_height[ i ][ j ] | u(32) |
|         mrwp_coverage_horizontal[ i ][ j ] | u(32) |
|         mrwp_coverage_vertical[ i ][ j ] | u(32) |
|         if( mrwp_component_type[i][j] == 2 ) { | |
|           depth_near[ i ][ j ] | u(32) |
|           depth_far[ i ][ j ] | u(32) |

[Fig. 28]

| | |
|---|---|
| } | |
| if( mrwp_component_dependent_rotation_flag[ i ] ) | |
| mrwp_rotation_component_diff_yaw[ i ][ j ] | i(32) |
| mrwp_rotation_component_diff_pitch[ i ][ j ] | i(32) |
| mrwp_rotation_component_diff_roll[ i ][ j ] | i(32) |
| } | |
| } | |
| if( mrwp_all_components_packed_in_one_region_flag[ i ] ) { | |
| mrwp_packed_region_width[ i ][ j ] | u(16) |
| mrwp_packed_region_height[ i ][ j ] | u(16) |
| mrwp_packed_region_top[ i ][ j ] | u(16) |
| mrwp_packed_region_left[ i ][ j ] | u(16) |
| } | |
| } | |
| num_packed_regions | u(8) |
| packed_picture_width | u(16) |
| packed_picture_height | u(16) |
| for( i = 0; i < num_packed_regions; i++ ) { | |
| num_view_id_minus1[ i ]   // regions sharing among diff. views | u(8) |
| for( j = 0; j < num_view_id_minus1[i]; j++ ) { | |
| view_idx[ i ][ j ]   // mrwp_view_id[ i ] | u(8) |
| num_component_id_minus1[ i ][ j ]   // region sharing between LR | u(8) |
| } | |
| if( mrwp_component_dependent_rotation_flag[ i ] ) | |
| mrwp_rotation_component_diff_yaw[ i ][ j ] | i(32) |
| mrwp_rotation_component_diff_pitch[ i ][ j ] | i(32) |
| mrwp_rotation_component_diff_roll[ i ][ j ] | i(32) |
| } | |
| } | |
| if( mrwp_all_components_packed_in_one_region_flag[ i ] ) { | |
| mrwp_packed_region_width[ i ][ j ] | u(16) |
| mrwp_packed_region_height[ i ][ j ] | u(16) |
| mrwp_packed_region_top[ i ][ j ] | u(16) |
| mrwp_packed_region_left[ i ][ j ] | u(16) |
| } | |
| } | |
| num_packed_regions | u(8) |
| packed_picture_width | u(16) |
| packed_picture_height | u(16) |
| for( i = 0; i < num_packed_regions; i++ ) { | |
| num_view_id_minus1[ i ]   // regions sharing among diff. views | u(8) |
| for( j = 0; j < num_view_id_minus1[i]; j++ ) { | |
| view_idx[ i ][ j ]   // mrwp_view_id[ i ] | u(8) |
| num_component_id_minus1[ i ][ j ]   // region sharing between LR | u(8) |

[Fig. 29]

| | | |
|---|---|---|
| rwp_guard_band_reserved_zero_3bits[ i ] | | u(3) |
| } | | |
| } | | |
| num_view_regeneration_minus1 | | u(8) |
| for( i = 0; i <= num_view_regeneration_minus1; i++ ) { | | |
| regenerated_view_id[ i ] | // target_view_id | u(8) |
| regenerated_component_id[ i ] | // target_component_id | u(8) |
| view_regeneration_info_flag[ i ] | | u(1) |
| reserved_zero_7bits[ i ] | | u(7) |
| if( view_regeneration_info_flag[ i ] ) { | | |
| patch_filling_flag[ i ] | | u(1) |
| local_disparity_compensation_flag[ i ] | | u(1) |
| block_boundary_processing_flag[ i ] | | u(1) |
| reserved_zero_5bits[ i ] | | u(5) |
| if( patch_filling_flag[ i ] ) { | | |
| num_patched_blocks[ i ] | | u(8) |
| for( j=0; j < num_patched_blocks[ i ]; j++ ) { | | |
| regenerated_picture_top_left_index_x[ i ][ j ] | | u(16) |
| regenerated_picture_top_left_index_y[ i ][ j ] | | u(16) |
| regenerated_picture_bottom_right_index_x[ i ][ j ] | | u(16) |
| regenerated_picture_bottom_right_index_y[ i ][ j ] | | u(16) |
| patch_view_id[ i ][ j ] | | u(8) |
| patch_component_id[ i ][ j ] | | u(8) |
| patch_top_left_index_x[ i ][ j ] | | u(16) |
| patch_top_left_index_y[ i ][ j ] | | u(16) |
| patch_bottom_right_index_x[ i ][ j ] | | u(16) |
| patch_bottom_right_index_y[ i ][ j ] | | u(16) |
| } | | |
| } | | |
| if( !local_disparity_compensation_flag[ i ] ) { | | |
| num_blocks[ i ] | | u(8) |
| for( j=0; j < num_blocks[ i ]; j++ ) { | | |
| regenerated_picture_top_left_index_x[ i ][ j ] | | u(8) |
| regenerated_picture_top_left_index_y[ i ][ j ] | | u(8) |
| regenerated_picture_bottom_right_index_x[ i ][ j ] | | u(8) |
| regenerated_picture_bottom_right_index_y[ i ][ j ] | | u(8) |
| num_ref_pictures_minus1[ i ][ j ] | | u(8) |
| for( k=0; k <= num_ref_pictures_minus1[ i ][ j ]; k++ ) { | | |
| ref_view_id[ i ][ j ][ k ] | | u(8) |
| ref_component_id[ i ][ j ][ k ] | | u(8) |
| ref_top_left_index_x[ i ][ j ][ k ] | | u(8) |
| ref_top_left_index_y[ i ][ j ][ k ] | | u(8) |
| ref_bottom_right_index_x[ i ][ j ][ k ] | | u(8) |
| ref_bottom_right_index_y[ i ][ j ][ k ] | | u(8) |
| inter_picture_local_offset_x[ i ][ j ][ k ] | | u(8) |
| inter_picture_local_offset_y[ i ][ j ][ k ] | | u(8) |

[Fig. 30]

| | | |
|---|---|---|
| | hor_scaling_factor[ i ][ j ][ k ] | u(32) |
| | ver_scaling_factor[ i ][ j ][ k ] | u(32) |
| | if( !num_ref_pictures_minus1[ i ][ j ] ) | |
| |    compensation_local_weight[ i ][ j ][ k ] | u(8) |
| |    } | |
| |   } | |
| |  } | |
| | else { | |
| |  num_ref_pictures_minus1[ i ] | u(8) |
| |  for( j = 0; j <= num_ref_source_views_minus1[ i ]; j++ ) { | |
| |   ref_view_id[ i ][ j ] | u(8) |
| |   ref_component_id[ i ][ j ] | u(8) |
| |   inter_picture_global_offset_x[ i ][ j ] | u(8) |
| |   inter_picture_global_offset_y[ i ][ j ] | u(8) |
| |   if( !num_ref_pictures_minus1[ i ] ) | |
| |    compensation_global_weight[ i ][ j ] | u(8) |
| |   } | |
| |  } | |
| | } | |
| | if( block_boundary_processing_flag[ i ] ) { | |
| |  block_boundary_processing_type[ i ]  // blank, interpolation, duplication_left, duplication_right, uplicate_average | u(8) |
| |  num_coeffs_minus1[ i ] | u(8) |
| |  for( j = 0; j <= num_coeff_minus1[ i ]; j++ ) | |
| |   block_boundary_filter_coeff[ i ][ j ] | i(32) |
| |  } | |
| | } | |
| | } | |
| } | | |

[Fig. 31]
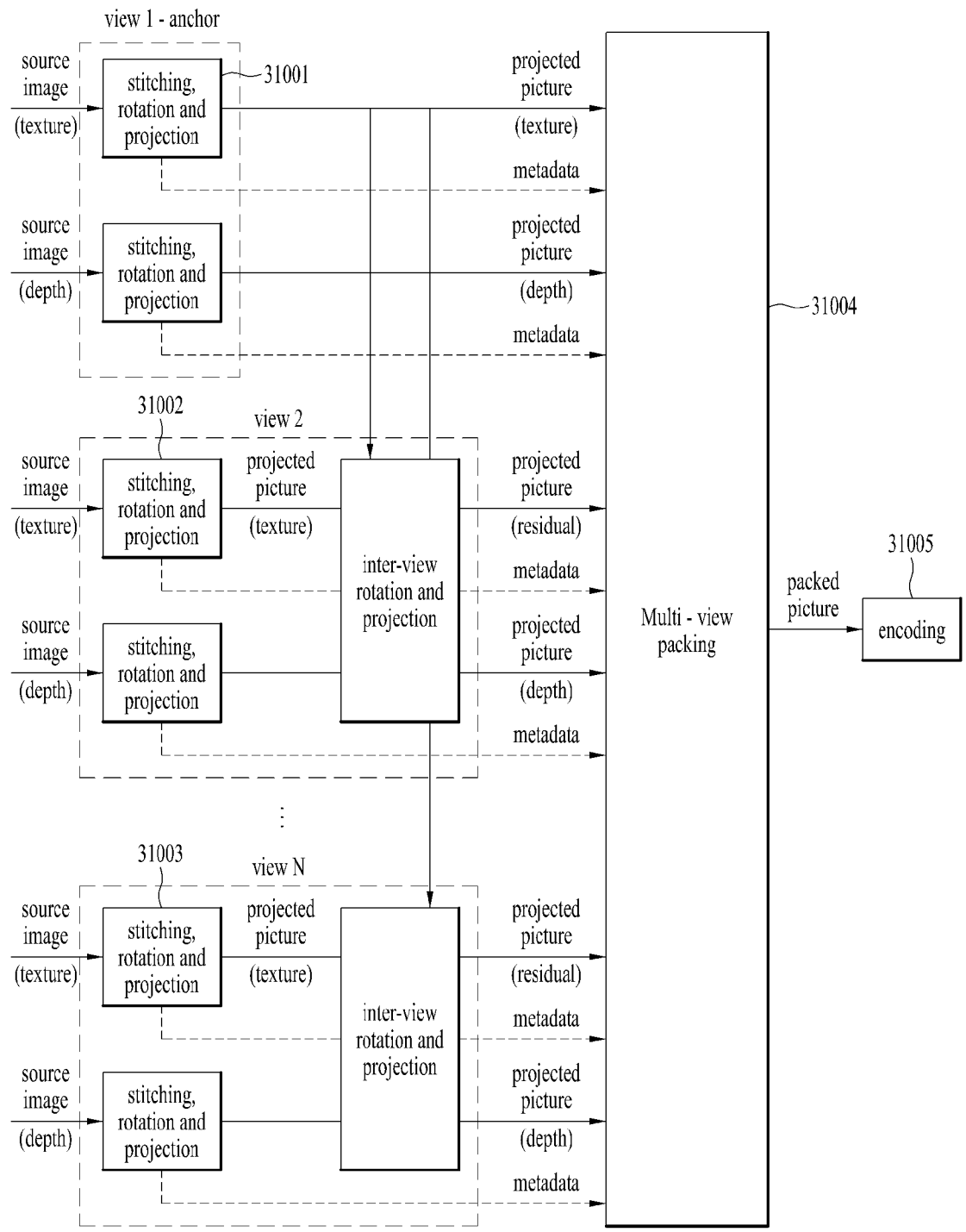

[Fig. 32]
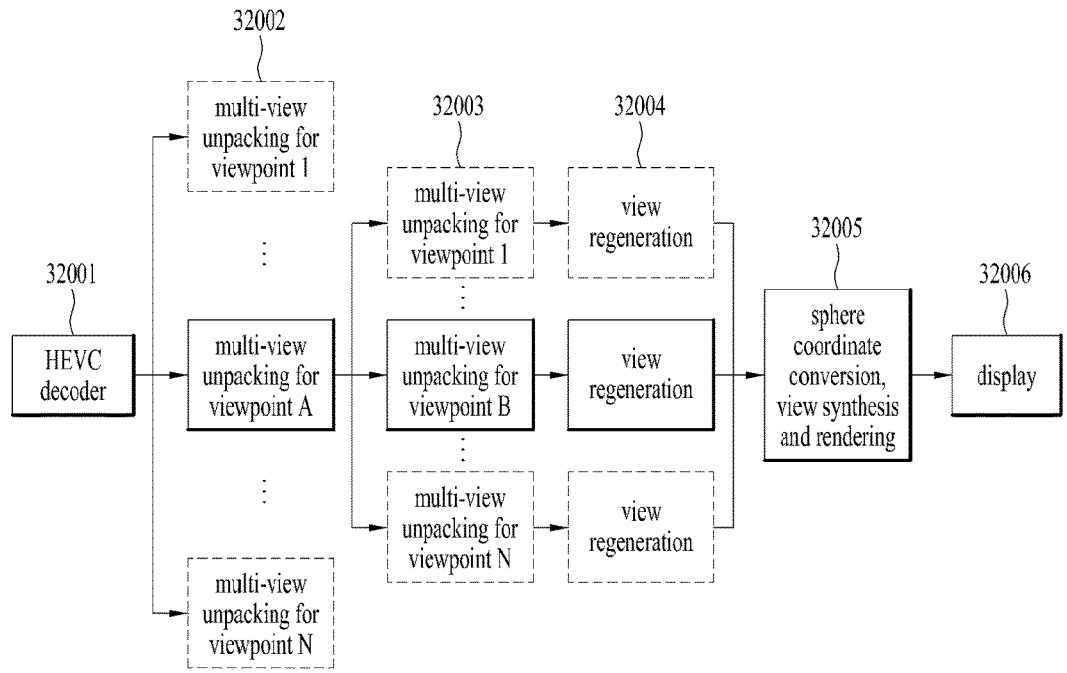
[Fig. 33]
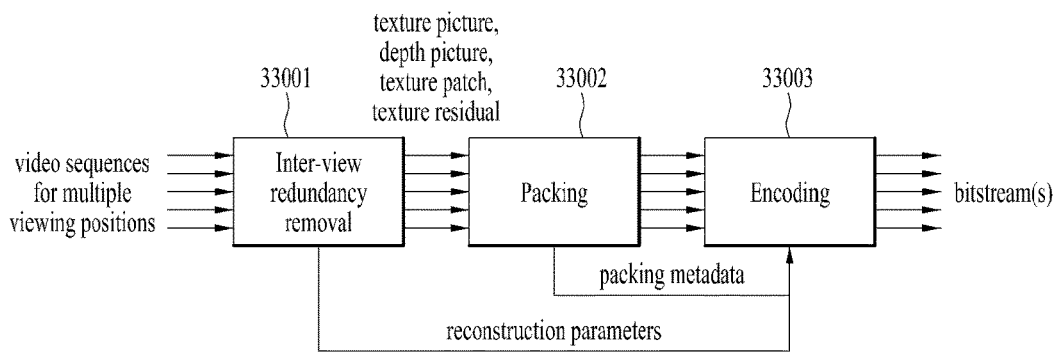
[Fig. 34]
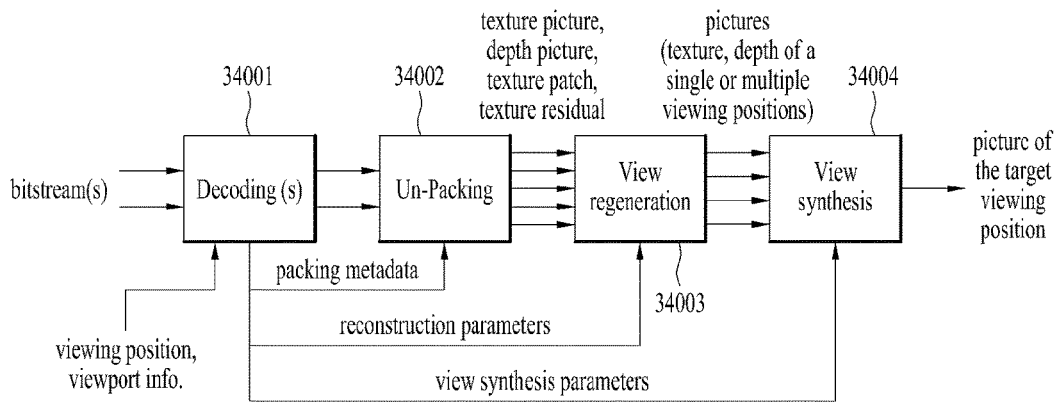

[Fig. 35]
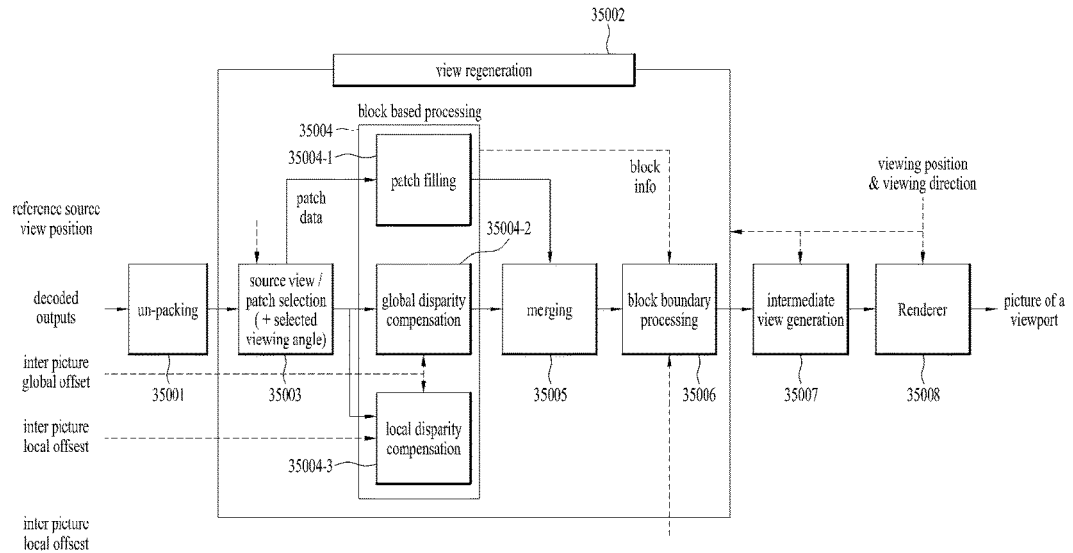
[Fig. 36]
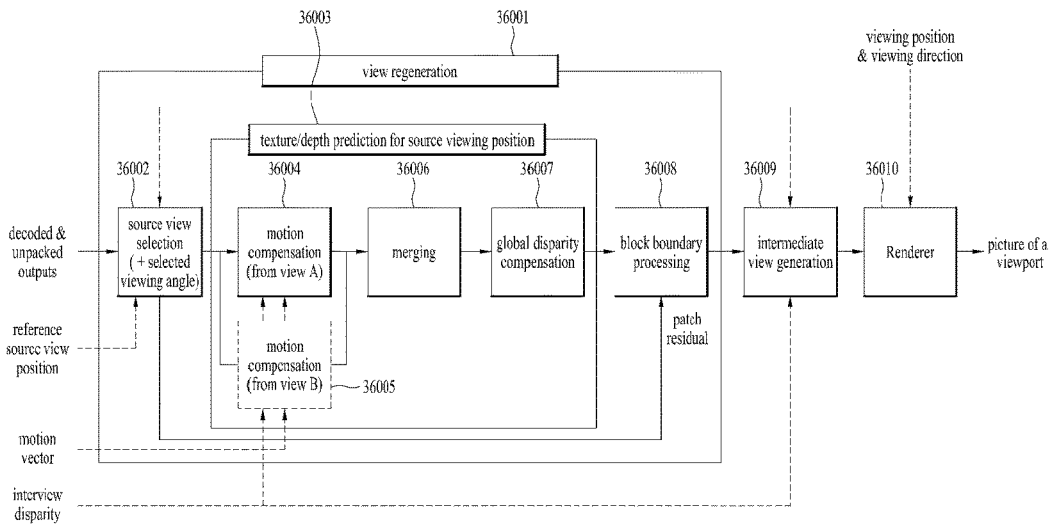
[Fig. 37]
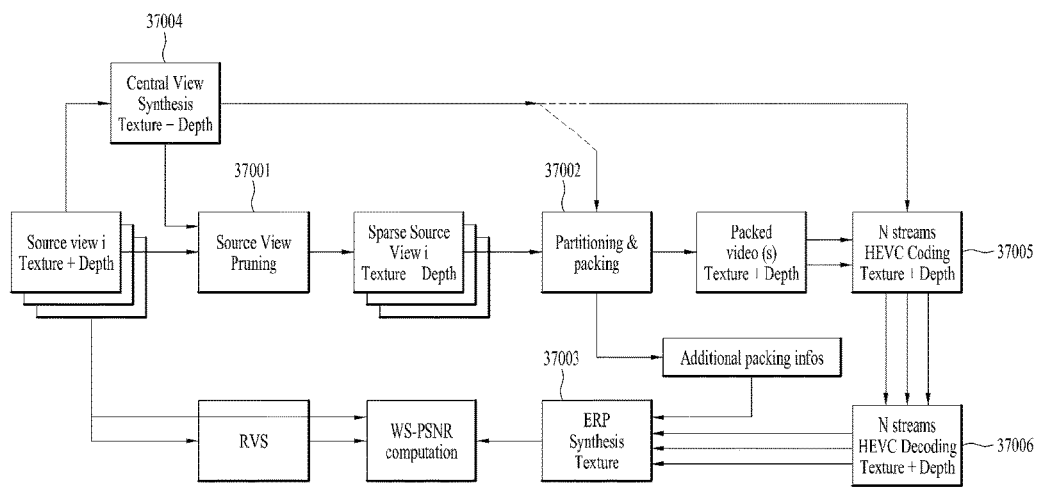

[Fig. 38]
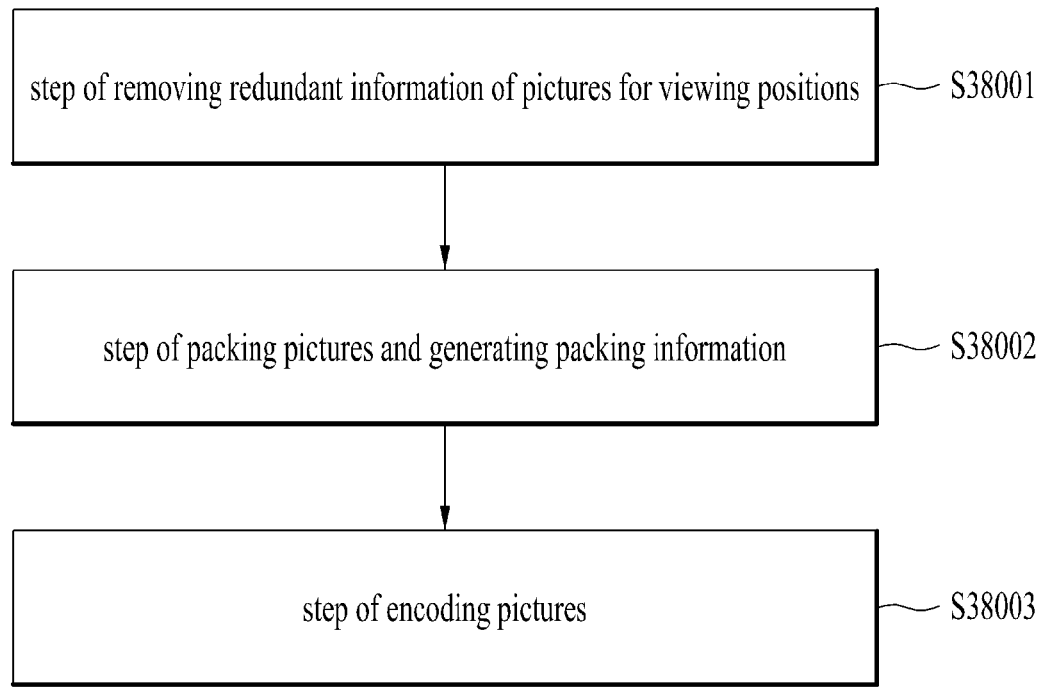

[Fig. 39]
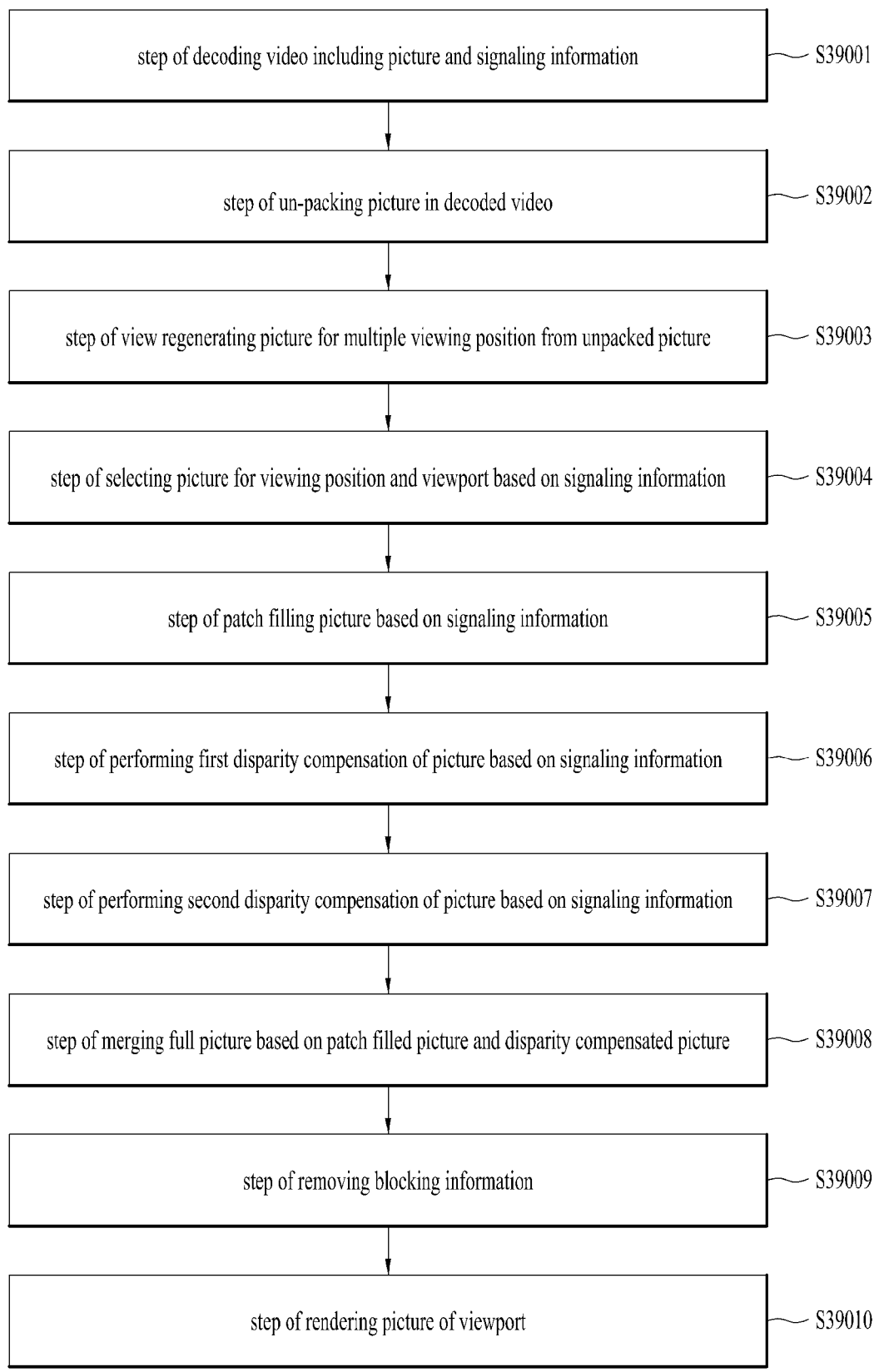

APPARATUS FOR TRANSMITTING A VIDEO, A METHOD FOR TRANSMITTING A VIDEO, AN APPARATUS FOR RECEIVING A VIDEO, AND A METHOD FOR RECEIVING A VIDEO

CROSS-REFERENCE TO RELATED APPLICATIONS

This application is a National Stage application under 35 U.S.C. § 371 of International Application No. PCT/KR2019/010183, filed on Aug. 12, 2019, which claims the benefit of U.S. Provisional Application No. 62/717,902, filed on Aug. 12, 2018. The disclosures of the prior applications are incorporated by reference in their entirety.

TECHNICAL FIELD

The present invention is related to an apparatus for transmitting a video, a method for transmitting a video, an apparatus for receiving a video, and a method for receiving a video.

BACKGROUND ART

A virtual reality (VR) system provides a user with sensory experiences through which the user may feel as if he/she were in an electronically projected environment. A system for providing VR may be further improved in order to provide higher-quality images and spatial sound. Such a VR system may enable the user to interactively enjoy VR content.

DISCLOSURE OF INVENTION

Technical Problem

VR systems need to be improved in order to more efficiently provide a user with a VR environment. To this end, it is necessary to propose plans for data transmission efficiency for transmitting a large amount of data such as VR content, robustness between transmission and reception networks, network flexibility considering a mobile reception apparatus, and efficient reproduction and signaling.

Also, since general Timed Text Markup Language (TTML) based subtitles or bitmap based subtitles are not created in consideration of 360-degree video, it is necessary to extend subtitle related features and subtitle related signaling information to be adapted to use cases of a VR service in order to provide subtitles suitable for 360-degree video.

Solution to Problem

In order to solve the technical problem, the present invention provides an apparatus for transmitting a video, a method for transmitting a video, an apparatus for receiving a video, and a method for receiving a video.

Specifically, an apparatus for transmitting a video according to embidements of the present invention comprises an inter-view redundancy remover configured to remove redundant information of pictures for viewing positions; wherein redundant pixel information between the pictures in adjacent viewing positions is removed, a packing unit configured to pack the pictures and generate packding information; and an encoder configured to encode the pictures.

In addition, the apparatus further comprises wherin the apparatus further performs multi-view packing the pictures into a packed picture and each view for the picture includes different types of a texture and a depth map, and wherein a residual of texture and a depth map are generated for a subsidiary view based on redundancy between each view.

Futhermore, the apparatus further generates signaling information for the inter-view redundancy remover, the packing unit or the multi-view packing.

More specifically, an apparatus for receiving a video according to embidiments of the present invention comprises a decoder configured to decode a video including a picture and signaling information; an un-packer configured to un-pack the picture in the decoded video; a selector configured to select a picture for a viewing position and a viewport based on the signaling information; a block processor configured to perform: patch filling of the pictures based on in the signaling information, a first disparity compensation of the picture based on the signaling information, and a second disparity compensation of the picture based on the signaling information; a merger configured to merge a full picture based on the patch filled picture and the disparity compensated picture; a block boundary processor configured to reduce blocking information for the the block processor; and a renderer configured to render a picture of a viewport.

Advantageous Effects of Invention

The apparatus for transmitting a video and the apparatus for receiving a video according to the embodiments of the present invention may provide interactivity between a viewer and a VR environment.

The apparatus for transmitting a video and the apparatus for receiving a video according to the embodiments of the present invention may provide a user with inter-activity according to different viewing positions.

The apparatus for transmitting a video and the apparatus for receiving a video according to the embodiments of the present invention may provide a user with various viewing experiences according to a head motion parallax of the user.

The apparatus for transmitting a video and the apparatus for receiving a video according to the embodiments of the present invention may provide various user actions in a VR environment.

The apparatus for transmitting a video and the apparatus for receiving a video according to the embodiments of the present invention may provide multiple spheres according to a change of a head motion and a processing method according to the multiple spheres.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates an architecture for providing 360 video according to the present invention.

FIG. 2 illustrates a 360 video transmission apparatus according to one aspect of the present invention.

FIG. 3 illustrates a 360 video reception apparatus according to another aspect of the present invention.

FIG. 4 illustrates a 360 video transmission apparatus/360 video reception apparatus according to another embodiment of the present invention.

FIG. 5 illustrates the concept of aircraft principal axes for describing a 3D space of the present invention.

FIG. 6 illustrates projection schemes according to an embodiment of the present invention.

FIG. 7 illustrates tiles according to an embodiment of the present invention.

FIG. 8 illustrates 360 video related metadata according to an embodiment of the present invention.

FIG. 9 is a view showing a viewpoint and viewing position additionally defined in a 3DoF+VR system;

FIG. 10 is a view showing a method for implementing 360-degree video signal processing and related transmission apparatus/reception apparatus based on 3DoF+ system;

FIG. 11 is a view showing an architecture of a 3DoF+ end-to-end system;

FIG. 12 is a view showing an architecture of a Frame for Live Uplink Streaming (FLUS);

FIG. 13 is a view showing a configuration of 3DoF+ transmission side;

FIG. 14 is a view showing a configuration of 3DoF+ reception side;

FIG. 15 is a view showing an OMAF structure;

FIG. 16 is a view showing a type of media according to movement of a user;

FIG. 17 is a view showing the entire architecture for providing 6DoF video;

FIG. 18 is a view showing a configuration of a transmission apparatus for providing 6DoF video services;

FIG. 19 is a view showing a configuration of 6DoF video reception apparatus;

FIG. 20 is a view showing a configuration of 6DoF video transmission/reception apparatus;

FIG. 21 is a view showing 6DoF space; FIG. 22 illustrates conceptual comparison of 3DoF VR/AR video without/with head motion parallax.

FIG. 23 illustrates content flow process for omnidirectional media with projected video of 3DoF.

FIGS. 24-25 illustrate a view regeneration information SEI message syntax.

FIG. 26 illustrates an example end-to-end flow chart of multi-view 3DoF+ video.

FIGS. 27-30 illustrate a Multiview Packing and View Regeneration information SEI message syntax.

FIG. 31 illustrates Aa example implementation of pre-encoding process for multi-views 3DoF+ video.

FIG. 32 illustrates an example implementation of post-decoder process for multi-views 3DoF+ video.

FIG. 33 illustrates example block diagram of encoder pre-processing modules.

FIG. 34 illustrates example block diagram of decoder post-processing modules.

FIG. 35 illustrates example of view regeneration in the decoder post-processing;

FIG. 36 illustrates an example of view regeneration in the decoder post-processing.

FIG. 37 illustrates a block diagram of 3DoF+ SW platform.

FIG. 38 illustrates a method for transmitting a video according to embodiments of the present invention.

FIG. 39 illustrates a method for receiving a video according to embodiments of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

FIG. 1 illustrates an architecture for providing 360 video according to the present invention. The present invention provides a method for providing 360 content to provide VR (Virtual Reality) to users. VR refers to a technique or an environment for replicating an actual or virtual environment. VR artificially provides sensuous experiences to users, and users can experience electronically projected environments.

360 content refers to convent for realizing and providing VR and may include 360 video and/or 360 audio. 360 video may refer to video or image content which is necessary to provide VR and is captured or reproduced in all directions (360 degrees). 360 video can refer to video or image represented on 3D spaces in various forms according to 3D models. For example, 360 video can be represented on a spherical plane. 360 audio is audio content for providing VR and can refer to spatial audio content which can be recognized as content having an audio generation source located on a specific space. 360 content can be generated, processed and transmitted to users, and users can consume VR experiences using the 360 content.

The present invention proposes a method for effectively providing 360 video. To provide 360 video, first, 360 video can be captured using one or more cameras. The captured 360 video is transmitted through a series of processes, and a receiving side can process received data into the original 360 video and render the 360 video. Accordingly, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of views through one or more cameras. The shown image/video data t1010 can be generated through the capture process. Each plane of the shown image/video data t1010 can refer to an image/video for each view. The captured images/videos may be called raw data. In the capture process, metadata related to capture can be generated.

For capture, a special camera for VR may be used. When 360 video with respect to a virtual space generated using a computer is provided in an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, each image/video may pass through a stitching process. The stitching process may be a process of connecting captured images/videos to create a single panorama image/video or a spherical image/video.

Then, the stitched images/videos may pass through a projection process. In the projection process, the stitched images/videos can be projected on a 2D image. This 2D image may be called a 2D image frame. Projection on a 2D image may be represented as mapping to the 2D image. The projected image/video data can have a form of a 2D image t1020 as shown in the figure.

The video data projected on the 2D image can pass through a region-wise packing process in order to increase video coding efficiency. Region-wise packing may refer to a process of dividing video data projected on a 2D image into regions and processing the regions. Here, regions may refer to regions obtained by dividing a 2D image on which 360 video data is projected. Such regions can be obtained by dividing the 2D image equally or arbitrarily according to an embodiment. Regions may be divided according to a projection scheme according to an embodiment. The region-wise packing process is an optional process and thus may be omitted in the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, the this process may include a process of increasing or decreasing the resolution of a specific region in order to differentiate the resolution for regions of the 360 video. For example, the resolution of regions corresponding to a relatively important part of the 360 video can be increased to higher than other regions. The video data projected on the 2D image or the region-wise packed video data can pass through an encoding process using a video codec.

According to an embodiment, the preparation process may additionally include an editing process. In this editing process, the image/video data before or after projection may be edited. In the preparation process, metadata with respect to stitching/projection/encoding/editing may be generated. In addition, metadata with respect to the initial view or ROI (region of interest) of the video data projected on the 2D image may be generated.

The transmission process may be a process of processing and transmitting the image/video data and metadata which have pass through the preparation process. For transmission, processing according to an arbitrary transmission protocol may be performed. The data that has been processed for transmission can be delivered over a broadcast network and/or broadband. The data may be delivered to a receiving side in an on-demand manner. The receiving side can receive the data through various paths.

The processing process refers to a process of decoding the received data and re-projecting the projected image/video data on a 3D model. In this process, the image/video data projected on the 2D image can be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D mode. The image/video re-projected (or rendered) on the 3D model may have a form t1030 as shown in the figure. The form t1030 corresponds to a case in which the image/video data is re-projected on a spherical 3D model. A user can view a region of the rendered image/video through a VR display or the like. Here, the region viewed by the user may have a form t1040 shown in the figure.

The feedback process may refer to a process of delivering various types of feedback information which can be acquired in the display process to a transmission side. Through the feedback process, interactivity in 360 video consumption can be provided. According to an embodiment, head orientation information, viewport information indicating a region currently viewed by a user, etc. can be delivered to the transmission side in the feedback process. According to an embodiment, a user can interact with content realized in a VR environment. In this case, information related to the interaction may be delivered to the transmission side or a service provider during the feedback process. According to an embodiment, the feedback process may not be performed.

The head orientation information may refer to information about the position, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the receiving side and the analysis result may be delivered to the transmission side through a feedback channel. An apparatus such as a VR display can extract a viewport region on the basis of the position/direction of a user's head, vertical or horizontal FOV supported by the apparatus, etc.

According to an embodiment, the aforementioned feedback information may be consumed at the receiving side as well as being delivered to the transmission side. That is, decoding, re-projection and rendering processes of the receiving side can be performed using the aforementioned feedback information. For example, only 360 video with respect to the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and can refer to a center point of a viewport region. That is, a viewport is a region based on a view, and the size and form of the region can be determined by FOV (field of view) which will be described below.

In the above-described architecture for providing 360 video, image/video data which is subjected to a series of capture/projection/encoding/transmission/decoding/re-projection/rendering processes can be called 360 video data.

The term "360 video data" may be used as the concept including metadata or signaling information related to such image/video data.

FIG. 2 illustrates a 360 video transmission apparatus according to one aspect of the present invention.

According to one aspect, the present invention can relate to a 360 video transmission apparatus. The 360 video transmission apparatus according to the present invention can perform operations related to the above-described preparation process to the transmission process. The 360 video transmission apparatus according to the present invention may include a data input unit, a stitcher, a projection processor, a region-wise packing processor (not shown), a metadata processor, a transmitter feedback processor, a data encoder, an encapsulation processor, a transmission processor and/or a transmitter as internal/external elements.

The data input unit may receive captured images/videos for respective views. The images/videos for the views may be images/videos captured by one or more cameras. In addition, the data input unit may receive metadata generated in a capture process. The data input unit may deliver the received images/videos for the views to the stitcher and deliver the metadata generated in the capture process to a signaling processor.

The stitcher may stitch the captured images/videos for the views. The stitcher can deliver the stitched 360 video data to the projection processor. The stitcher may receive necessary metadata from the metadata processor and use the metadata for stitching operation. The stitcher may deliver the metadata generated in the stitching process to the metadata processor. The metadata in the stitching process may include information indicating whether stitching has been performed, a stitching type, etc.

The projection processor can project the stitched 360 video data on a 2D image. The projection processor can perform projection according to various schemes which will be described below. The projection processor can perform mapping in consideration of the depth of 360 video data for each view. The projection processor may receive metadata necessary for projection from the metadata processor and use the metadata for the projection operation as necessary. The projection processor may deliver metadata generated in a projection process to the metadata processor. The metadata of the projection process may include a projection scheme type.

The region-wise packing processor (not shown) can perform the aforementioned region-wise packing process. That is, the region-wise packing processor can perform a process of dividing the projected 360 video data into regions, rotating or rearranging the regions or changing the resolution of each region. As described above, the region-wise packing process is an optional process, and when region-wise packing is not performed, the region-wise packing processor can be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor can process metadata which can be generated in the capture process, the stitching process, the projection process, the region-wise packing process, the encoding process, the encapsulation process and/or the processing process for transmission. The metadata processor can generate 360 video related metadata using such metadata. According to an embodiment, the metadata processor may generate the 360 video related metadata in the form of a signaling table. The 360 video related metadata may be called metadata or 360 video related signaling information according to signaling context. Furthermore, the metadata processor can deliver acquired or generated metadata to internal elements of the 360 video transmission apparatus as necessary. The metadata processor may deliver the 360 video related metadata to the data encoder, the encapsulation processor and/or the transmission processor such that the metadata can be transmitted to the receiving side.

The data encoder can encode the 360 video data projected on the 2D image and/or the region-wise packed 360 video data. The 360 video data can be encoded in various formats.

The encapsulation processor can encapsulate the encoded 360 video data and/or 360 video related metadata into a file. Here, the 360 video related metadata may be delivered from the metadata processor. The encapsulation processor can encapsulate the data in a file format such as ISOBMFF, CFF or the like or process the data into a DASH segment. The encapsulation processor may include the 360 video related metadata in a file format according to an embodiment. For example, the 360 video related metadata can be included in boxes of various levels in an ISOBMFF file format or included as data in an additional track in a file. The encapsulation processor can encapsulate the 360 video related metadata into a file according to an embodiment. The transmission processor can perform processing for transmission on the 360 video data encapsulated in a file format. The transmission processor can process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmission unit can transmit the processed 360 video data and/or the 360 video related metadata over a broadcast network and/or broadband. The transmission unit can include an element for transmission over a broadcast network and an element for transmission over a broadband.

According to an embodiment of the 360 video transmission apparatus according to the present invention, the 360 video transmission apparatus may further include a data storage unit (not shown) as an internal/external element. The data storage unit may store the encoded 360 video data and/or 360 video related metadata before delivery thereof. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and transmitted.

According to another embodiment of the 360 video transmission apparatus according to the present invention, the 360 video transmission apparatus may further include a transmitter feedback processor and/or a network interface (not shown) as internal/external elements. The network interface can receive feedback information from a 360 video reception apparatus according to the present invention and deliver the feedback information to the transmitter feedback processor. The transmitter feedback processor can deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements can reflect the feedback information in 360 video data processing.

According to another embodiment of the 360 video transmission apparatus according to the present invention, the region-wise packing processor can rotate regions and map the regions on a 2D image. Here, the regions can be rotated in different directions at different angles and mapped on the 2D image. The regions can be rotated in consideration of neighboring parts and stitched parts of the 360 video data on the spherical plane before projection. Information about rotation of the regions, that is, rotation directions and angles can be signaled using 360 video related metadata. According to another embodiment of the 360 video transmission apparatus according to the present invention, the data encoder can perform encoding differently on respective regions. The data encoder can encode a specific region with high quality and encode other regions with low quality. The feedback processor at the transmission side can deliver the feedback information received from a 360 video reception apparatus to the data encoder such that the data encoder can use encoding methods differentiated for regions. For example, the transmitter feedback processor can deliver viewport information received from a receiving side to the data encoder. The data encoder can encode regions including a region indicated by the viewport information with higher quality (UHD) than other regions.

According to another embodiment of the 360 video transmission apparatus according to the present invention, the transmission processor can perform processing for transmission differently on respective regions. The transmission processor can apply different transmission parameters (modulation orders, code rates, etc.) to regions such that data delivered to the regions have different robustnesses.

Here, the transmitter feedback processor can deliver the feedback information received from the 360 video reception apparatus to the transmission processor such that the transmission processor can perform transmission processing differentiated for respective regions. For example, the transmitter feedback processor can deliver viewport information received from the receiving side to the transmission processor. The transmission processor can perform transmission processing on regions including a region indicated by the viewport information such that the regions have higher robustness than other regions.

The internal/external elements of the 360 video transmission apparatus according to the present invention may be hardware elements realized by hardware. According to an embodiment, the internal/external elements may be modified, omitted, replaced by other elements or integrated with other elements. According to an embodiment, additional elements may be added to the 360 video transmission apparatus.

FIG. 3 illustrates a 360 video reception apparatus according to another aspect of the present invention.

According to another aspect, the present invention may relate to a 360 video reception apparatus. The 360 video reception apparatus according to the present invention can perform operations related to the above-described processing process and/or the rendering process. The 360 video reception apparatus according to the present invention may include a reception unit, a reception processor, a decapsulation processor, a data decoder, a metadata parser, a receiver feedback processor, a reprojection processor and/or a renderer as internal/external elements.

The reception unit can receive 360 video data transmitted from the 360 video transmission apparatus according to the present invention. The reception unit may receive the 360 video data through a broadcast network or a broadband according to a transmission channel.

The reception processor can perform processing according to a transmission protocol on the received 360 video data. The reception processor can perform a reverse of the process of the transmission processor. The reception processor can deliver the acquired 360 video data to the decapsulation processor and deliver acquired 360 video related metadata to the metadata parser. The 360 video related metadata acquired by the reception processor may have a form of a signaling table.

The decapsulation processor can decapsulate the 360 video data in a file format received from the reception processor. The decapsulation processor can decapsulate files in ISOBMFF to acquire 360 video data and 360 video related metadata. The acquired 360 video data can be delivered to the data decoder and the acquired 360 video related metadata can be delivered to the metadata parser. The 360 video related metadata acquired by the decapsulation processor may have a form of box or track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be delivered to the metadata parser.

The metadata parser can parse/decode the 360 video related metadata. The metadata parser can deliver the acquired metadata to the data decapsulation processor, the data decoder, the re-projection processor and/or the renderer.

The re-projection processor can re-project the decoded 360 video data. The reprojection processor can re-project the 360 video data on a 3D space. The 3D space may have different forms according to used 3D modes. The re-projection processor may receive metadata necessary for re-projection from the metadata parser. For example, the re-projection processor can receive information about the type of a used 3D model and detailed information thereof from the metadata parser. According to an embodiment, the re-projection processor may re-project only 360 video data corresponding to a specific region on the 3D space on the 3D space using the metadata necessary for re-projection.

The renderer can render the re-projected 360 video data. This may be represented as rendering of the 360 video data on a 3D space as described above. When two processes are simultaneously performed in this manner, the re-projection processor and the renderer can be integrated to perform both the processes in the renderer. According to an embodiment, the renderer may render only a region viewed by a user according to view information of the user.

A user can view part of the rendered 360 video through a VR display. The VR display is an apparatus for reproducing 360 video and may be included in the 360 video reception apparatus (tethered) or connected to the 360 video reception apparatus as a separate apparatus (un-tethered).

According to an embodiment of the 360 video reception apparatus according to the present invention, the 360 video reception apparatus may further include a (receiver) feedback processor and/or a network interface (not shown) as internal/external elements. The receiver feedback processor can acquire feedback information from the renderer, the re-projection processor, the data decoder, the decapsulation processor and/or the VR display and process the feedback information. The feedback information may include viewport information, head orientation information, gaze information, etc. The network interface can receive the feedback information from the receiver feedback processor and transmit the same to the 360 video transmission apparatus.

As described above, the feedback information may be used by the receiving side in addition to being delivered to the transmission side. The receiver feedback processor can deliver the acquired feedback information to internal elements of the 360 video reception apparatus such that the feedback information is reflected in a rendering process. The receiver feedback processor can deliver the feedback information to the renderer, the re-projection processor, the data decoder and/or the decapsulation processor. For example, the renderer can preferentially render a region viewed by a user using the feedback information. In addition, the decapsulation processor and the data decoder can preferentially decapsulate and decode a region viewed by the user or a region to be viewed by the user.

The internal/external elements of the 360 video reception apparatus according to the present invention may be hardware elements realized by hardware. According to an embodiment, the internal/external elements may be modified, omitted, replaced by other elements or integrated with other elements. According to an embodiment, additional elements may be added to the 360 video reception apparatus.

Another aspect of the present invention may relate to a method of transmitting 360 video and a method of receiving 360 video. The methods of transmitting/receiving 360 video according to the present invention can be performed by the above-described 360 video transmission/reception apparatuses or embodiments thereof.

The aforementioned embodiments of the 360 video transmission/reception apparatuses and embodiments of the internal/external elements thereof may be combined. For example, embodiments of the projection processor and embodiments of the data encoder can be combined to create as many embodiments of the 360 video transmission apparatus as the number of the embodiments. The combined embodiments are also included in the scope of the present invention.

FIG. 4 illustrates a 360 video transmission apparatus/360 video reception apparatus according to another embodiment of the present invention.

As described above, 360 content can be provided according to the architecture shown in (a). The 360 content can be provided in the form of a file or in the form of a segment based download or streaming service such as DASH. Here, the 360 content can be called VR content.

As described above, 360 video data and/or 360 audio data may be acquired.

The 360 audio data can be subjected to audio preprocessing and audio encoding. In these processes, audio related metadata can be generated, and the encoded audio and audio related metadata can be subjected to processing for transmission (file/segment encapsulation).

The 360 video data can pass through the aforementioned processes. The stitcher of the 360 video transmission apparatus can stitch the 360 video data (visual stitching). This process may be omitted and performed at the receiving side according to an embodiment. The projection processor of the 360 video transmission apparatus can project the 360 video data on a 2D image (projection and mapping (packing)).

The stitching and projection processes are shown in (b) in detail. In (b), when the 360 video data (input images) is delivered, stitching and projection can be performed thereon. The projection process can be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the receiving side.

The 2D image may also be called a projected frame (C). Region-wise packing may be optionally performed on the 2D image. When region-wise packing is performed, the positions, forms and sizes of regions can be indicated such that the regions on the 2D image can be mapped on a packed frame (D). When region-wise packing is not performed, the projected frame can be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data can be image-encoded or video-encoded. Since the same content can be present for different viewpoints, the same content can be encoded into different bit streams. The encoded 360 video data can be processed into a file format such as ISOBMFF according to the aforementioned encapsulation processor. Alternatively, the encapsulation processor can process the encoded 360 video data into segments. The segments may be included in an individual track for DASH based transmission.

Along with processing of the 360 video data, 360 video related metadata can be generated as described above. This metadata can be included in a video stream or a file format and delivered. The metadata may be used for encoding, file format encapsulation, processing for transmission, etc.

The 360 audio/video data can pass through processing for transmission according to the transmission protocol and then can be transmitted. The aforementioned 360 video reception apparatus can receive the 360 audio/video data over a broadcast network or broadband.

In (a), a VR service platform may correspond to an embodiment of the aforementioned 360 video reception apparatus. In (a), loudspeakers/headphones, display and head/eye tracking components are performed by an external apparatus or a VR application of the 360 video reception apparatus. According to an embodiment, the 360 video reception apparatus may include all of these components. According to an embodiment, the head/eye tracking component may correspond to the aforementioned receiver feedback processor.

The 360 video reception apparatus can perform processing for reception (file/segment decapsulation) on the 360 audio/video data. The 360 audio data can be subjected to audio decoding and audio rendering and provided to a user through a speaker/headphone.

The 360 video data can be subjected to image decoding or video decoding and visual rendering and provided to the user through a display. Here, the display may be a display supporting VR or a normal display.

As described above, the rendering process can be regarded as a process of reprojecting 360 video data on a 3D space and rendering the re-projected 360 video data. This may be represented as rendering of the 360 video data on the 3D space.

The head/eye tracking component can acquire and process head orientation information, gaze information and viewport information of a user. This has been described above.

A VR application which communicates with the aforementioned processes of the receiving side may be present at the receiving side.

FIG. 5 illustrates the concept of aircraft principal axes for describing a 3D space of the present invention.

In the present invention, the concept of aircraft principal axes can be used to represent a specific point, position, direction, spacing and region in a 3D space.

That is, the concept of aircraft principal axes can be used to describe a 3D space before projection or after re-projection and to signal the same. According to an embodiment, a method using X, Y and Z axes or a spherical coordinate system may be used.

An aircraft can feely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis can refer to an axis connected between wings of the aircraft.

The yaw axis may refer to a reference axis of a direction in which the front end of the aircraft rotates to the left/right. In the shown concept of aircraft principal axes, the yaw axis can refer to an axis connected from the top to the bottom of the aircraft.

The roll axis may refer to an axis connected from the front end to the tail of the aircraft in the shown concept of aircraft principal axes, and rotation in the roll direction can refer to rotation based on the roll axis.

As described above, a 3D space in the present invention can be described using the concept of the pitch, yaw and roll.

FIG. 6 illustrates projection schemes according to an embodiment of the present invention.

As described above, the projection processor of the 360 video transmission apparatus according to the present invention can project stitched 360 video data on a 2D image. In this process, various projection schemes can be used.

According to another embodiment of the 360 video transmission apparatus according to the present invention, the projection processor can perform projection using a cubic projection scheme. For example, stitched video data can be represented on a spherical plane. The projection processor can segment the 360 video data into a cube and project the same on the 2D image. The 360 video data on the spherical plane can correspond to planes of the cube and be projected on the 2D image as shown in (a).

According to another embodiment of the 360 video transmission apparatus according to the present invention, the projection processor can perform projection using a cylindrical projection scheme. Similarly, if stitched video data can be represented on a spherical plane, the projection processor can segment the 360 video data into a cylinder and project the same on the 2D image. The 360 video data on the spherical plane can correspond to the side, top and bottom of the cylinder and be projected on the 2D image as shown in (b).

According to another embodiment of the 360 video transmission apparatus according to the present invention, the projection processor can perform projection using a pyramid projection scheme. Similarly, if stitched video data can be represented on a spherical plane, the projection processor can regard the 360 video data as a pyramid form and project the same on the 2D image. The 360 video data on the spherical plane can correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions can refer to regions obtained by dividing a 2D image on which 360 video data is projected. Such regions need not correspond to respective sides of the 2D image projected according to a projection scheme. However, regions may be divided such that the sides of the projected 2D image correspond to the regions and region-wise packing may be performed according to an embodiment. Regions may be divided such that a plurality of sides may correspond to one region or one side may correspond to a plurality of regions according to an embodiment. In this case, the regions may depend on projection schemes. For example, the top, bottom, front, left, right and back sides of the cube can be respective regions in (a). The side, top and bottom of the cylinder can be respective regions in (b). The front, left top, left bottom, right top and right bottom sides of the pyramid can be respective regions in (c).

FIG. 7 illustrates tiles according to an embodiment of the present invention.

360 video data projected on a 2D image or region-wise packed 360 video data can be divided into one or more tiles. (a) shows that one 2D image is divided into 16 tiles. Here, the 2D image may be the aforementioned projected frame or packed frame. According to another embodiment of the 360 video transmission apparatus according to the present invention, the data encoder can independently encode the tiles.

The aforementioned region-wise packing can be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted or consumed to or by a receiving side on a limited bandwidth. Through tiling, a limited bandwidth can be used more efficiently and the receiving side can reduce computational load compared to a case in which the entire 360 video data is processed simultaneously.

A region and a tile are discriminated from each other and thus they need not be identical. However, a region and a tile may refer to the same area according to an embodiment. Region-wise packing can be performed to tiles and thus regions can correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

ROI (Region of Interest) may refer to a region of interest of users, which is provided by a 360 content provider. When 360 video is produced, the 360 content provider can produce the 360 video in consideration of a specific region which is expected to be a region of interest of users. According to an embodiment, ROI may correspond to a region in which important content of the 360 video is reproduced.

According to another embodiment of the 360 video transmission/reception apparatuses according to the present invention, the receiver feedback processor can extract and collect viewport information and deliver the same to the transmitter feedback processor. In this process, the viewport information can be delivered using network interfaces of both sides. In the 2D image shown in (a), a viewport t6010 is displayed. Here, the viewport may be displayed over nine tiles of the 2D images.

In this case, the 360 video transmission apparatus may further include a tiling system. According to an embodiment, the tiling system may be located following the data encoder (b), may be included in the aforementioned data encoder or transmission processor, or may be included in the 360 video transmission apparatus as a separate internal/external element.

The tiling system may receive viewport information from the transmitter feedback processor. The tiling system can select only tiles included in a viewport region and transmit the same. In the 2D image shown in (a), only nine tiles including the viewport region t6010 among 16 tiles can be transmitted. Here, the tiling system can transmit tiles in a unicast manner over a broadband because the viewport region is different for users.

In this case, the transmitter feedback processor can deliver the viewport information to the data encoder. The data encoder can encode the tiles including the viewport region with higher quality than other tiles.

Furthermore, the transmitter feedback processor can deliver the viewport information to the metadata processor. The metadata processor can deliver metadata related to the viewport region to each internal element of the 360 video transmission apparatus or include the metadata in 360 video related metadata.

By using this tiling method, transmission bandwidths can be saved and processes differentiated for tiles can be performed to achieve efficient data processing/transmission.

The above-described embodiments related to the viewport region can be applied to specific regions other than the viewport region in a similar manner. For example, the aforementioned processes performed on the viewport region can be performed on a region determined to be a region in which users are interested through the aforementioned gaze analysis, ROI, and a region (initial view, initial viewpoint) initially reproduced when a user views 360 video through a VR display.

According to another embodiment of the 360 video transmission apparatus according to the present invention, the transmission processor may perform processing for transmission differently on tiles. The transmission processor can apply different transmission parameters (modulation orders, code rates, etc.) to tiles such that data delivered for the tiles has different robustnesses.

Here, the transmitter feedback processor can deliver feedback information received from the 360 video reception apparatus to the transmission processor such that the transmission processor can perform transmission processing differentiated for tiles. For example, the transmitter feedback processor can deliver the viewport information received from the receiving side to the transmission processor. The transmission processor can perform transmission processing such that tiles including the corresponding viewport region have higher robustness than other tiles.

FIG. 8 illustrates 360 video related metadata according to an embodiment of the present invention.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata can be included in various levels such as a file, fragment, track, sample entry, sample, etc. and can include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present invention may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present invention may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata can include a vr geometry field, a projection scheme field, etc. According to an embodiment, the basic metadata may further include additional information.

The vr geometry field can indicate the type of a 3D model supported by the corresponding 360 video data. When the 360 video data is re-projected on a 3D space as described above, the 3D space can have a form according to a 3D model indicated by the vr geometry field. According to an embodiment, a 3D model used for rendering may differ from the 3D model used for re-projection, indicated by the vr geometry field. In this case, the basic metadata may further include a field which indicates the 3D model used for rendering. When the field has values of 0, 1, 2 and 3, the 3D space can conform to 3D models of a sphere, a cube, a cylinder and a pyramid. When the field has the remaining values, the field can be reserved for future use. According to an embodiment, the 360 video related metadata may further include detailed information about the 3D model indicated by the field. Here, the detailed information about the 3D model can refer to the radius of a sphere, the height of a cylinder, etc. for example. This field may be omitted.

The projection scheme field can indicate a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field can be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related properties of the 360 video data. The stereoscopic related metadata may include an is stereoscopic field and/or a stereo_mode field. According to an embodiment, the stereoscopic related metadata may further include additional information.

The is stereoscopic field can indicate whether the 360 video data supports 3D. When the field is 1, the 360 video data supports 3D. When the field is 0, the 360 video data does not support 3D. This field may be omitted.

The stereo_mode field can indicate 3D layout supported by the corresponding 360 video. Whether the 360 video supports 3D can be indicated only using this field. In this case, the is stereoscopic field can be omitted. When the field is 0, the 360 video may be a mono mode. That is, the projected 2D image can include only one mono view. In this case, the 360 video may not support 3D.

When this field is 1 and 2, the 360 video can conform to left-right layout and top-bottom layout. The left-right layout and top-bottom layout may be called a side-by-side format and a top-bottom format. In the case of the left-right layout, 2D images on which left image/right image are projected can be positioned at the left/right on an image frame. In the case of the top-bottom layout, 2D images on which left image/right image are projected can be positioned at the top/bottom on an image frame. When the field has the remaining values, the field can be reserved for future use.

The initial view/initial viewpoint related metadata may include information about a view (initial view) which is viewed by a user when initially reproducing 360 video. The initial view/initial viewpoint related metadata may include an initial view yaw degree field, an initial view pitch degree field and/or an initial view roll degree field. According to an embodiment, the initial view/initial viewpoint related metadata may further include additional information.

The initial view yaw degree field, initial view pitch degree field and initial view roll degree field can indicate an initial view when the 360 video is reproduced. That is, the center point of a viewport which is initially viewed when the 360 video is reproduced can be indicated by these three fields. The fields can indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view can be determined through FOV. That is, the 360 video reception apparatus can provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user can change for each scene of the 360 video. In this case, the initial view/initial viewpoint related metadata can indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields can indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata can include a min_top_left_x field, a max_top_lef_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field can represent minimum/maximum values of the coordinates of the left top end of the ROI. These fields can sequentially indicate a minimum x coordinate, a maximum x coordinate, a minimum y coordinate and a maximum y coordinate of the left top end.

The min width field, max_width field, min height field and max_height field can indicate minimum/maximum values of the width and height of the ROI. These fields can sequentially indicate a minimum value and a maximum value of the width and a minimum value and a maximum value of the height.

The min_x field, max_x field, min_y field and max_y field can indicate minimum and maximum values of coordinates in the ROI. These fields can sequentially indicate a minimum x coordinate, a maximum x coordinate, a minimum y coordinate and a maximum y coordinate of coordinates in the ROI. These fields can be omitted.

When ROI related metadata includes fields which indicate ROI on the basis of coordinates on a 3D rendering space, the ROI related metadata can include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field can indicate a region occupied by ROI on a 3D space using minimum/maximum values of yaw, pitch and roll. These fields can sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field can indicate minimum/maximum values of FOV of the corresponding 360 video data. FOV can refer to the range of view displayed at once when 360 video is reproduced. The min_field_of_view field and max_field_of_view field can indicate minimum and maximum values of FOV. These fields can be omitted. These fields may be included in FOV related metadata which will be described below.

The FOV related metadata can include the aforementioned FOV related information.

The FOV related metadata can include a content_fov_flag field and/or a content_fov field. According to an embodiment, the FOV related metadata may further include additional information such as the aforementioned minimum/maximum value related information of FOV.

The content fov flag field can indicate whether corresponding 360 video includes information about FOV intended when the 360 video is produced. When this field value is 1, a content_fov field can be present.

The content_fov field can indicate information about FOV intended when the 360 video is produced. According to an embodiment, a region displayed to a user at once in the 360 video can be determined according to vertical or horizontal FOV of the 360 video reception apparatus. Alternatively, a region displayed to a user at once in the 360 video may be determined by reflecting FOV information of this field according to an embodiment.

Cropped region related metadata can include information about a region including 360 video data in an image frame. The image frame can include a 360 video data projected active video area and other areas. Here, the active video area can be called a cropped region or a default display region. The active video area is viewed as 360 video on an actual VR display and the 360 video reception apparatus or the VR display can proces/display only the active video area. For example, when the aspect ratio of the image frame is 4:3, only an area of the image frame other than an upper part and a lower part of the image frame can include 360 video data. This area can be called the active video area.

The cropped region related metadata can include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception apparatus or the VR display. That is, this field can indicate whether the entire image frame indicates an active video area. When only part of the image frame is an active video area, the following four fields may be added.

A cr_region_left_top_x field, a cr_region_left_top_y field, a cr_region_width field and a cr_region_height field can indicate an active video area in an image frame. These fields can indicate the x coordinate of the left top, the y coordinate of the left top, the width and the height of the active video area. The width and the height can be represented in units of pixel.

FIG. 9 is a view showing a viewpoint and viewing position additionally defined in a 3DoF+ VR system.

The 360-degree video based VR system of the present invention may provide visual/auditory experiences for different viewing orientations based on a position of a user for 360-degree video. This method may be referred to as 3DoF (three degree of freedom) plus. In detail, the VR system that provides visual/auditory experiences for different orientations in a fixed position of a user may be referred to as a 3DoF based VR system.

Meanwhile, the VR system that may provide extended visual/auditory experiences for different orientations in different viewpoints and different viewing positions at the same time zone may be referred to as a 3DoF+ or 3DoF plus based VR system.

1) Supposing a space such as (a) (example of art center), different positions (example of art center marked with a red circle) may be considered as the respective viewpoints. At this time, video/audio provided by the respective viewpoints existing in the same space as example may have the same time flow.

2) In this case, different visual/auditory experiences may be provided in accordance with a viewpoint change (head motion) of a user in a specific position. That is, spheres of various viewing positions may be assumed as shown in (b) for a specific viewpoint, and video/audio/text information in which a relative position of each viewpoint is reflected may be provided.

3) Meanwhile, visual/auditory information of various orientations such as the existing 3DoF may be delivered at a specific viewpoint of a specific position as shown in (c). In this case, additional various sources as well as main sources (video/audio/text) may be provided in combination, and this may be associated with a viewing orientation of a user or information may be delivered independently.

FIG. 10 is a view showing a method for implementing 360-degree video signal processing and related transmission apparatus/reception apparatus based on 3DoF+system.

FIG. 10 is an example of 3DoF+ end-to-end system flow chart including video acquisition, pre-processing, transmission, (post)processing, rendering and feedback processes of 3DoF+.

1) Acquisition: may mean a process of acquiring 360-degree video through capture, composition or generation of 360-degree video. Various kinds of video/audio information according to head motion may be acquired for a plurality of positions through this process. In this case, video information may include depth information as well as visual information (texture). At this time, a plurality of kinds of information of different viewing positions according to different viewpoints may be acquired like example of video information of a.

2) Composition: may define a method for composition to include video (video/image, etc.) through external media, voice (audio/effect sound, etc.) and text (caption, etc.) as well as information acquired through the video/audio input module in user experiences.

3) Pre-processing: is a preparation (pre-processing) process for transmission/delivery of the acquired 360-degree video, and may include stitching, projection, region wise packing and/or encoding process. That is, this process may include pre-processing and encoding processes for modifying/complementing data such as video/audio/text information in accordance with a producer's intention. For example, the pre-processing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video in accordance with a region, and encoding for compressing video information. A plurality of projection videos of different viewing positions according to different viewpoints may be generated like example in view of video of B.

4) Delivery: may mean a process of processing and transmitting video/audio data and metadata subjected to the preparation process (pre-processing). As a method for delivering a plurality of video/audio data and related metadata of different viewing positions according to different viewpoints, a broadcast network or a communication network may be used, or unidirectional delivery method may be used.

5) Post-processing & composition: may mean a post-processing process for decoding and finally reproducing received/stored video/audio/text data. For example, the post-processing process may include unpacking for unpacking a packed video and reprojection for restoring 2D projected image to 3D sphere image as described above.

6) Rendering: may mean a process of rendering and displaying re-projected image/video data on a 3D space. In this process, the process may be reconfigured to finally output video/audio signals. A viewing orientation, viewing position/head position and viewpoint, in which a user's region of interest exists, may be subjected to tracking, and necessary video/audio/text information may selectively be used in accordance with this information. At this time, in case of video signal, different viewing positions may be selected in accordance with the user's region of interest as shown in c, and video in a specific orientation of a specific viewpoint at a specific position may finally be output as shown in d.

7) Feedback: may mean a process of delivering various kinds of feedback information, which can be acquired during a display process, to a transmission side. In this embodiment, a viewing orientation, a viewing position, and a viewpoint, which corresponds to a user's region of interest, may be estimated, and feedback may be delivered to reproduce video/audio based on the estimated result.

FIG. 11 is a view showing an architecture of a 3DoF+ end-to-end system.

FIG. 11 is an example of a 3DoF+ end-to-end system architecture. As described in the architecture of FIG. 11, 3DoF+ 360 contents may be provided.

The 360-degree video transmission apparatus may include an acquisition unit for acquiring 360-degree video (image)/audio data, a video/audio pre-processor for processing the acquired data, a composition generation unit for composing additional information an encoding unit for encoding text, audio and projected 360-degree video, and an encapsulation unit for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception apparatus through a digital storage medium. Although not shown explicitly, the encoded data may be subjected to processing for transmission through the transmission-processor and then transmitted through a broadcast network or a broadband, as described above.

The data acquisition unit may simultaneously or continuously acquire different kinds of information in accordance with sensor orientation (viewing orientation in view of video), information acquisition timing of a sensor (sensor position, or viewing position in view of video), and information acquisition position of a sensor (viewpoint in case of video). At this time, video, image, audio and position information may be acquired.

In case of video data, texture and depth information may respectively be acquired, and video pre-processing may be performed in accordance with characteristic of each component. For example, in case of the text information, 360-degree omnidirectional video may be configured using videos of different orientations of the same viewing position, which are acquired at the same viewpoint using image sensor position information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video pre-processing end is delivered as video metadata.

If video/audio/text information additionally given in addition to the acquired data (or data for main service) are together served, it is required to provide information for composing these kinds of information during final reproduction. The composition generation unit generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis in accordance with application. At this time, only necessary information may be extracted (file extractor) in accordance with a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing position information according to each viewpoint (viewing position and viewpoint metadata), etc. This information may be processed through a separate metadata processor.

The 360-degree video reception apparatus may include a file/segment decapsulation unit for decapsulating a received file and segment, a decoding unit for generating video/audio/text information from bitstreams, a post-processor for reconfiguring the video/audio/text in the form of reproduction, a tracking unit for tracking a user's region of interest, and a display which is a reproduction unit.

The bitstreams generated through decapsulation may be segmented into video/audio/text in accordance with types of data and separately decoded to be reproduced.

The tracking unit generates viewpoint of a user's region of interest, viewing position at the corresponding viewpoint, and viewing orientation information at the corresponding viewing position based on a sensor and the user's input information. This information may be used for selection or extraction of a region of interest in each module of the 360-degree video reception apparatus, or may be used for a post-processing process for emphasizing information of the region of interest. Also, if this information is delivered to the 360-degree video transmission apparatus, this information may be used for file selection (file extractor) or subpicture selection for efficient bandwidth use, and may be used for various video reconfiguration methods based on a region of interest (viewport/viewing position/viewpoint dependent processing).

The decoded video signal may be processed in accordance with various processing methods of the video configuration method. If image packing is performed in the 360-degree video transmission apparatus, a process of reconfiguring video is required based on the information delivered through metadata. In this case, video metadata generated by the 360-degree video transmission apparatus may be used. Also, if videos of a plurality of viewpoints or a plurality of viewing positions or various orientations are included in the decoded video, information matched with viewpoint, viewing position, and orientation information of the user's region of interest, which are generated through tracking, may be selected and processed. At this time, viewing position and viewpoint metadata generated at the transmission side may be used. Also, if a plurality of components are delivered for a specific position, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated in accordance with the user's region of interest.

The decoded audio signal may be generated as an audio signal capable of being reproduced, through an audio renderer and/or the post-processing process. At this time, information suitable for the user's request may be generated based on the information on the user's region of interest and the metadata delivered to the 360-degree video reception apparatus.

The decoded text signal may be delivered to an overlay renderer and processed as overlay information based on text such as subtitle. A separate text post-processing process may be included if necessary.

FIG. 12 is a view showing an architecture of a Frame for Live Uplink Streaming (FLUS).

The detailed blocks of the transmission side and the reception side may be categorized into functions of a source and a sink in FLUS (Framework for Live Uplink Streaming). In this case, the information acquisition unit may implement the function of the source, implement the function of the sink on a network, or implement source/sink within a network node, as follows. The network node may include a user equipment (UE). The UE may include the aforementioned 360-degree video transmission apparatus or the aforementioned 360-degree reception apparatus.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

FIG. 13 is a view showing a configuration of 3DoF+ transmission side.

The transmission side (360-degree video transmission apparatus) may perform stitching for sphere image configuration per viewpoint/viewing position/component if input data are images output through a camera. If sphere images per viewpoint/viewing position/component are configured, the transmission side may perform projection for coding in 2D image. The transmission side may generate a plurality of images as sub-pictures of a packing or segmented region for making an integrated image in accordance with application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed in accordance with application or request of the system. The generated bitstreams may be converted to the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

FIG. 14 is a view showing a configuration of 3DoF+ reception side.

The reception side (360-degree video reception apparatus) may extract a necessary file after receiving the bitstreams delivered from the transmission side. The reception side may select bitstreams in the generated file format by using the viewpoint/viewing position/orientation information delivered from the feedback processor and reconfigure the selected bitstreams as image information through the decoder. The reception side may perform unpacking for the packed image based on packing information delivered through the metadata. If the packing process is omitted in the transmission side, unpacking of the reception side may also be omitted. Also, the reception side may perform a process of selecting images suitable for the viewpoint/viewing position/orientation information delivered from the feedback processor and necessary components if necessary. The reception side may perform a rendering process of reconfiguring texture, depth and overlay information of images as a format suitable for reproduction. The reception side may perform a composition process for composing information of different layers before generating a final image, and may generate and reproduce an image suitable for a display viewport.

FIG. 15 is a view showing an OMAF structure.

The 360-degree video based VR system may provide visual/auditory experiences for different viewing orientations based on a position of a user for 360-degree video based on the 360-degree video processing process. A service for providing visual/auditory experiences for different orientations in a fixed position of a user with respect to 360-degree video may be referred to as a 3DoF based service. Meanwhile, a service for providing extended visual/auditory experiences for different orientations in a random viewpoint and viewing position at the same time zone may be referred to as a 6DoF (six degree of freedom) based service.

A file format for 3DoF service has a structure in which a position of rendering, information of a file to be transmitted, and decoding information may be varied depending on a head/eye tracking module as shown in FIG. 15. However, this structure is not suitable for transmission of a media file of 6DoF in which rendering information/transmission details and decoding information are varied depending on a viewpoint or position of a user, correction is required.

FIG. 16 is a view showing a type of media according to movement of a user.

The present invention proposes a method for providing 6DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which can provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6DoF video and 6DoF audio for providing corresponding contents, wherein 6DoF video may mean video or image required to provide realistic media contents and captured or reproduced as 3DoF or 360-degree video newly formed during every movement. 6DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6DoF audio is an audio content for providing a content to allow a user to experience realistic media, and may mean contents for newly forming and consuming a spatial audio according to movement of a position where sound is consumed.

The present invention proposes a method for effectively providing 6DoF video. The 6DoF video may be captured at different positions by two or more cameras. The captured video may be transmitted through a series of processes, and the reception side may process and render some of the received data as 360-degree video having an initial position of the user as a starting point. If the position of the user moves, the reception side may process and render new 360-degree video based on the position where the user has moved, whereby the 6DoF video may be provided to the user.

Hereinafter, a transmission method and a reception method for providing 6DoF video services will be described.

FIG. 17 is a view showing the entire architecture for providing 6DoF video.

A series of the processes described above will be described in detail based on FIG. 17. First of all, as an acquisition step, HDCA(High Density Camera Array), Lenslet (microlens) camera, etc. may be used to capture 6DoF contents, and 6DoF video may be acquired by a new device designed for capture of the 6DoF video. The acquired video may be generated as several image/video data sets generated in accordance with a position of a camera, which is captured as shown in a of FIG. 17. At this time, metadata such as internal/external setup values of the camera may be generated during the capturing process. In case of image generated by a computer not the camera, the capturing process may be replaced. The pre-processing process of the acquired video may be a process of processing the captured image/video and the metadata delivered through the capturing process. This process may correspond to all of types of preprocessing steps such as a stitching process, a color correction process, a projection process, a view segmentation process for segmenting views into a primary view and a secondary view to enhance coding efficiency, and an encoding process.

The stitching process may be a process of making image/video by connecting image captured in the direction of 360-degree in a position of each camera with image in the form of panorama or sphere based on the position of each camera. Projection means a process of projecting the image resultant from the stitching process to a 2D image as shown in b of FIG. 17, and may be expressed as mapping into 2D image. The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may newly be generated by the receiver as virtual information as the case may be.

In some embodiments, the pre-processing process may further include an editing process. In this process, editing for image/video data may further be performed before and after projection, and metadata may be generated even during the pre-processing process. Also, when the image/video are provided, metadata for an initial view to be first reproduced and an initial position and a region of interest (ROI) of a user may be generated.

The media transmission step may be a process of processing and transmitting the image/video data and metadata acquired during the pre-processing process. Processing according to a random transmission protocol may be performed for transmission, and the pre-processed data may be delivered through a broadcast network and/or a broadband. The pre-processed data may be delivered to the reception side in an on demand manner.

The processing process may include all steps before image is generated, wherein all steps may include decoding the received image/video data and metadata, re-projection which may be called mapping or projection into a 3D model, and a virtual view generation and composition process. The 3D model which is mapped or a projection map may include a sphere, a cube, a cylinder or a pyramid like the existing 360-degree video, and may be a modified type of a projection map of the existing 360-degree video, or may be a projection map of a free type as the case may be.

The virtual view generation and composition process may mean a process of generating and composing the image/video data to be reproduced when the user moves between the primary view and the secondary view or between the primary view and the primary view. The process of processing the metadata delivered during the capture and pre-processing processes may be required to generate the virtual view. As the case may be, some of the 360-degree images/videos not all of the 360-degree images/videos may be generated/composed.

In some embodiments, the processing process may further include an editing process, an up scaling process, and a down scaling process. Additional editing required before reproduction may be applied to the editing process after the processing process. The process of up scaling or down scaling the received images/videos may be performed if necessary.

The rendering process may mean a process of rendering image/video, which is reprojected by being transmitted or generated, to be displayed. As the case may be, rendering and re-projection process may be referred to as rendering. Therefore, the rendering process may include the re-projection process. A plurality of re-projection results may exist in the form of 360-degree video/image based on the user and 360-degree video/image formed based on the position where the user moves in accordance with a moving direction as shown in c of FIG. 17. The user may view some region of the 360-degree video/image in accordance with a device to be displayed. At this time, the region viewed by the user may be a form as shown in d of FIG. 17. When the user moves, the entire 360-degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which can be acquired during the display process, to the transmission side. Interactivity between 6DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

FIG. 18 is a view showing a configuration of a transmission apparatus for providing 6DoF video services.

The present invention at the transmission side may be related to the 6DoF video transmission apparatus. The 6DoF video transmission apparatus may perform the aforementioned preparation processes and operations. The 6DoF video/image transmission apparatus according to the present invention may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmission unit as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360-degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results in accordance with a scheme, and the corresponding scheme may similar to the projection scheme of the existing 360-degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception side.

The data encoder may encode the 6DoF video data projected on the 2D image frame and/or the view/regionwise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission-processor may perform additional processing for transmission on the encapsulated video data in accordance with the format. The corresponding processing may be performed using the metadata received from the metadata processor. The transmission unit may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception apparatus, which will be described later, and may deliver the feedback information to the feedback processor (transmission side). The feedback processor may deliver the information received from the reception side to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment of the present invention, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission apparatus may be hardware components implemented by hardware. In some embodiments, the respective components may be modified or omitted or new components may be added thereto, or may be replaced with or incorporated into the other components.

FIG. 19 is a view showing a configuration of 6DoF video reception apparatus.

The present invention may be related to the reception apparatus. According to the present invention, the 6DoF video reception apparatus may include a reception unit, a reception processor, a decapsulation-processor, a metadata parser, a feedback processor, a data decoder, a re-projection processor, a virtual view generation/composition unit and/or a renderer as components.

The reception unit may receive video data from the aforementioned 6DoF transmission apparatus. The reception unit may receive the video data through a broadcast network or a broadband in accordance with a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. As needed, the decapsulation-processor may receive metadata necessary for decapsulation from the metadata parser.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the re-projection processor, the virtual view generation/composition unit and/or the renderer.

The re-projection processor may re-project the decoded 6DoF video data. The re-projection processor may re-project the 6DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generation/composition unit may generate video data, which are not included in the 6DoF video data re-projected by being transmitted and received on the 3D space but need to be reproduced, in a virtual view area by using given data, and may compose video data in a new view/position based on the virtual view. The virtual view generation/composition unit may use data of the depth information processor (not shown) when generating video data of a new view. The virtual view generation/composition unit may generate/compose the specific area received from the metadata parser and a portion of a peripheral virtual view area, which is not received. The virtual view generation/composition unit may selectively be performed, and is performed when there is no video information corresponding to a necessary view and position.

The renderer may render the 6DoF video data delivered from the re-projection unit and the virtual view generation/composition unit. As described above, all the processes occurring in the re-projection unit or the virtual view generation/composition unit on the 3D space may be incorporated within the renderer such that the renderer can perform these processes. In some embodiments, the renderer may render only a portion that is being viewed by a user and a portion on a predicted path in accordance with the user's view/position information.

In the present invention, the feedback processor (reception side) and/or the network interface (not shown) may be included as additional components. The feedback processor of the reception side may acquire and process feedback information from the renderer, the virtual view generation/composition unit, the re-projection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmission unit. The feedback information may be consumed in each component of the reception side. For example, the decapsulation processor may receive position/viewpoint information of the user from the feedback processor, and may perform decapsulation, decoding, re-projection and rendering for corresponding position information if there is the corresponding position information in the received 6DoF video. If there is no corresponding position information, the 6DoF video located near the corresponding position may be subjected to decapsulation, decoding, re-projection, virtual view generation/composition, and rendering.

The components of the aforementioned 6DoF video reception apparatus may be hardware components implemented by hardware. In some embodiments, the respective components may be modified or omitted or new components may be added thereto, or may be replaced with or incorporated into the other components.

FIG. 20 is a view showing a configuration of 6DoF video transmission/reception apparatus.

6DoF contents may be provided in the form of file or segment based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio Encoding: 6DoF audio data may be subjected to audio pre-processing and encoding. In this process, metadata may be generated, and related metadata may be subjected to encapsulation/encoding for transmission.

Stitching, Projection, mapping, and correction: 6DoF video data may be subjected to editing, stitching and projection of the image acquired at various positions as described above. Some of these processes may be performed in accordance with the embodiment, or all of the processes may be omitted and then may be performed by the reception side.

View segmentation/packing: As described above, the view segmentation/packing processor may segment images of a primary view (PV), which are required by the reception side, based on the stitched image and pack the segmented images and then perform pre-processing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point Cloud Fusion/extraction: a process of modifying a previously acquired depth map to data capable of being encoded may be performed. For example, a pre-processing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed to segments.

Metadata(including depth information): Like the 6DoF vide data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception side. The reception side may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception apparatus may perform processing for 6DoF video/audio data reception.

Audio decoding/Audio rendering/Loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point Cloud rendering: when captured video/image data are re-projected on a 3D space, a 3D spatial position is configured, and a process of generating a 3D space of a virtual view to which a user can move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or composition process may be omitted.

Image composition, and rendering: as a process of rendering image based on a user's position, video data decoded in accordance with the user's position and eyes may be used or video and image near the user, which are made by the virtual view generation/composition, may be rendered.

FIG. 21 is a view showing 6DoF space.

In the present invention, a 6DoF space before projection or after re-projection will be described and the concept of FIG. 21 may be used to perform corresponding signaling.

The 6DoF space may categorize an orientation of movement into two types, rational and translation, unlike the case that the 360-degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present invention proposes an architecture for 6DoF video service and streaming, and also proposes basic metadata for file storage and signaling for future use in the invention for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): region may mean a region where 360-degree video data projected on 2D image are located in a packed frame through region-wise packing. In this case, the region may mean a region used in region-wise packing in accordance with the context. As described above, regions may be identified by equally dividing 2D image, or may be identified by being randomly divided in accordance with a projection scheme.

Region (general meaning): unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: picture may mean the entire 2D image in which 360-degree video data are projected. In some embodiments, a projected frame or a packed frame may be the picture.

Sub-picture: sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: tile is a lower concept of a sub-picture, and the sub-picture may be used as a tile for tiling. That is, the sub-picture and the tile in tiling may be the same concept. In detail, the tile may be a tool enabling parallel decoding or a tool for independent decoding in VR. In VR, tile may mean MCTS (Motion Constrained Tile Set) that restricts a range of temporal inter prediction to a current tile internal range. Therefore, the tile herein may be called MCTS.

Spherical region: spherical region or sphere region may mean one region on a spherical surface when 360-degree video data are rendered on a 3D space (for example, spherical surface) at the reception side. In this case, the spherical region is regardless of the region in the region-wise packing. That is, the spherical region does not need to mean the same region defined in the region-wise packing. The spherical region is a terminology used to mean a potion on a rendered spherical surface, and in this case, 'region' may mean 'region' as a dictionary definition. In accordance with the context, the spherical region may simply be called region.

Face: face may be a terminology for each face in accordance with a projection scheme. For example, if cube map projection is used, a front face, a rear face, side face, an upper face, or a lower face may be called face.

FIG. 22 illustrates conceptual comparison of 3DoF VR/AR video without/with head motion parallax.

The apparatus for transmitting a video and the apparatus for receiving a video according to embodiments of the present invention have purpose as follows. The present invention addresses packing, coding, and delivery of multiple videos sources which constitutes a video content/service such as 3DoF (degrees of freedom) and 6DoF omnidirectional video/service. As an example of the 3DoF and 6DoF omnidirectional videos, the multiple videos could represent different views at a location, which receivers could generate a video with head motion parallax and/or binocular disparity, or different viewpoints, which receivers could generate interactive video with changing locations.

Following is focused on a format of SEI message syntax elements and semantics for MPEG video codec. However, other formats of video level, e.g., parameters sets, and/or future or current video codecs, system level, e.g., file format, DASH, MMT, and 3GPP, or digital interfaces, e.g., HDMI, DisplayPort, and VESA, could be possible with the same features described below.

The apparatus for transmitting a video and the apparatus for receiving a video according to embodiments of the present invention may solve technical problems as follows.

In a typical content flow process for an omnidirectional media application with projected video of 3DoF, the captured images compose a sphere, which provides viewport from a static viewpoint. Since the viewing position is assumed to be unchanged so it is not easy to provide interactivity between viewer and the VR environment. To provide different viewing experience with viewer's action in the VR environment, changing viewing position with a limitation of viewing boundary should be considered. The different view due to the different viewing position is called head motion parallax.

As described above, the head motion parallax could provide viewers certain degree of freedom of head motion with realistic viewing experience. To support the feature, the ideal content is consist of multiple spheres adjacent to the anchor (or center) sphere while the current content for 3DoF only considers a single sphere. As additional spherical information should be considered for subsidiary viewing positions, the current content work flow of 3DoF service which is based on the single sphere content should be changed, such as image capture, projection, packing format, file encapsulation, delivery, file decapsulation, rendering process might be changed.

The apparatus for transmitting a video and the apparatus for receiving a video according to embodiments of the present invention may process 360 video data of 3DoF and 3DoF+. The 360 video of 3DoF may be represented on a single sphere and the 360 video of 3DoF+ may be represented on multiple spheres to support head motion parallax.

FIG. 23 illustrates content flow process for omnidirectional media with projected video of 3DoF.

In the following, the content flow process for omnidirectional media with projected video of conventional 3DoF service is described.

A real-world audio-visual scene (A) is captured by audio sensors as well as a set of cameras or a camera device with multiple lenses and sensors. The acquisition results in a set of digital image/video ($B_i$) and audio ($B_a$) signals. The cameras/lenses typically cover all directions around the centre point of the camera set or camera device, thus the name of 360-degree video.

The images ($B_i$) of the same time instance are stitched, possibly rotated, projected, and mapped onto a packed picture (D).

The packed pictures (D) are encoded as coded images ($E_i$) or a coded video bitstream ($E_v$). The captured audio ($B_a$) is encoded as an audio bitstream ($E_a$). The coded images, video, and/or audio are then composed into a media file for file playback (F) or a sequence of an initialization segment and media segments for streaming ($F_s$), according to a particular media container file format. In this document, the media container file format is the ISO Base Media File Format specified in ISO/IEC 14496-12. The file encapsulator also includes metadata into the file or the segments, such as projection and region-wise packing information assisting in rendering the decoded packed pictures.

The segments $F_s$ are delivered using a delivery mechanism to a player.

The file that the file encapsulator outputs (F) is identical to the file that the file de-capsulator inputs (F'). A file decapsulator processes the file (F') or the received segments ($F'_s$) and extracts the coded bitstreams ($E'_a$, $E'_v$, and/or $E'_i$) and parses the metadata. The audio, video, and/or images are then decoded into decoded signals ($B'_a$ for audio, and D' for images/video). The decoded packed pictures (D') are projected onto the screen of a head-mounted display or any other display device based on the current viewing orientation or viewport and the projection, spherical coverage, rotation, and region-wise packing metadata parsed from the file. Likewise, decoded audio ($B'_a$) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used by the video and audio decoders for decoding optimization.

The process described above is applicable to both live and on-demand use cases.

4. Detailed Description of the Invention

The configuration, operation and other features of the present invention will be understood by the embodiments of the present invention described with reference to the accompanying drawings.

In the following, multiple methodologies to support efficient delivery of multiple spherical images which represent different viewing position of a viewpoint are provided. The detailed description includes the view regeneration information SEI message or Multiview packing and view regeneration information SEI message.

In the specification, the viewport menas location of a body of a user and the viewing position means location of a header of a user.

FIGS. 24-25 illustrate a view regeneration information SEI message syntax.

An apparatus for transmitting a video and an apparatus for receiving a video according to embodiments of the present invention uses view regeneration information which also refers to signaling information in the specification. Details of the view regernation information can be described as follows.

The view regeneration information SEI message provides information to enable regeneration of the pictures for a viewing positions derived from pictures from other viewing positions and partial region or information from the viewing position.

view regeneration info id contains an identifying number that may be used to identify the purpose of view regeneration. The value of view regeneration info id may be used to indicate the different use cases of this SEI message, to support different receiver capabilities, etc.

When more than one view regeneration information SEI message is present with the same value of view regeneration info id, the content of these view regeneration information SEI messages shall be the same. When view regeneration information SEI messages are present that have more than one value of view_regeneration_info_id, this may indicate that the information indicated by the different values of view_regeneration_info_id are alternatives that are provided for different purposes, for different component (such as texture, depth, etc) or that a cascading of correction. The value of view_regeneration_info_id shall be in the range of 0 to $2^{12}1$, inclusive.

view_regeneration_info_cancel_flag equal to 1 indicates that the view regeneration information SEI message cancels the persistence of any previous view regeneration information SEI message in output order that applies to the current layer. view_regeneration_info_cancel_flag equal to 0 indicates that view regeneration information follows.

view_regeneration_info_persistence_flag specifies the persistence of the view regeneration information SEI message for the current layer.

view_regeneration_info_persistence_flag equal to 0 specifies that the camera lens information applies to the current decoded picture only.

Let picA be the current picture. view_regeneration_info_persistence_flag to 1 specifies that the view regeneration information SEI message persists for the current layer in output order until any of the following conditions are true:

A new CLVS of the current layer begins.

The bitstream ends.

A picture picB in the current layer in an access unit containing a view regeneration information SEI message that is applicable to the current layer is output for which PicOrderCnt(picB) is greater than PicOrderCnt (picA), where PicOrderCnt(picB) and PicOrderCnt (picA) are the PicOrderCntVal values of picB and picA, respectively, immediately after the invocation of the decoding process for the picture order count of picB.

num_view_regeneration_minus1 plus 1 specifies the number of pictures which are to be regenerated by the SEI message.

regenerated_view_id specifies the i-th identifying number of the viewing position or head position of the regeneration process. This value should be one of the pre-defined identifying number of a viewing positions of a 3DoF+ video specified in the same or in the other SEI message, such as mrwp_view_id specified in the multiview region-wise packing SEI message.

regenerated_view_id according to embodiments can represent an identifier of a target view.

regenerated_component_id specifies the i-th identifying number of a component of a viewing position or head position of the regeneration process. This value should be one of the pre-defined identifying number of a component that belongs to a viewing positions of a 3DoF+ video specified in the same or in the other SEI message, such as mrwp_component_id specified in the multiview region-wise packing SEI message.

regenerated_component_id according to embodiemnts can represent an identifier of a target component for a target view.

view_location_x[i], view location y[i] and view location z[i] indicate the location of a viewing position in the units of $2^{-16}$ millimeters, respectively. The range of view_location_x[i], view_location_y[i] and view_location_z[i] shall be in the range of $-32\,768*2^{16}-1$ (i.e., $-2\,147\,483\,647$) to $32\,768*2^{16}$ (i.e., $2\,147\,483\,648$), inclusive.

view_rotation_yaw[i], view_rotation_pitch[i], and view_rotation_roll[i] indicate the yaw, pitch, and roll rotation angles, respectively, that is applied to the unit sphere of a viewing posotion head position related to view_location x[i], view_location_y[i] and view_location_z[i] to convert the local coordinate axes to the global coordinate axes, in units of $2^{-16}$ degrees. The value of view_rotation_yaw[i] shall be in the range of $-180*2^{16}$ (i.e., $-11\,796\,480$) to $180*2^{16}-1$ (i.e., $11\,796\,479$), inclusive, the value of view rotation pitch[i] shall be in the range of $-90*2^{16}$ (i.e., $-5\,898\,240$) to $90*2^{16}$ (i.e., $5\,898\,240$), inclusive, and the value of view_rotation_roll[i] shall be in the range of $-180*2^{16}$ (i.e., $-11\,796\,480$) to $180*2^{16}1$ (i.e., $11\,796\,479$), inclusive. view_rotation_yaw[i], view_rotation_pitch[i], and view_rotation_roll[i] could be used to indicate azimuth, elevation, and tilt, respectively.

picture_width[i][j] and picture_height[i][j] specify the width and height, respectively, of the i-th picture that is to be regenerated, in relative projected picture sample units. The values of picture_width and picture_height shall both be greater than 0.

projection_type[i][j] specifies the type of the projection used in generating the projected picture from a 360 sphere.

projection_type[i][j] equal to 0 indicates the type of the projection is unspecified.

projection_type[i][j] equal to 1 indicates the equirectangular projection.

projection_type[i][j] equal to 2 indicates the cube map projection.

projection_type[i][j] from 3 to 15, inclusive, are reserved for future use.

component_type[i][j] specifies the type of the i-th component.

component_type[i][j] equal to 0 indicates the type of the component is unspecified.

component_type[i][j] equal to 1 indicates the component is a video or texture component component_type[i][j] equal to 2 indicates the component is a depth map.

component_type[i][j] equal to 3 indicates the component is an alpha channel.

component_type[i][j] equal to 4 indicates the component is a video or texture component of the left-eye-view.

component_type[i][j] equal to 5 indicates the component is a video or texture component of the right-eye-view.

component_type[i][j] equal to 6 indicates the component is a video or texture component of both-eye-view.

component_type[i][j] equal to 7 indicates the component is a residual video or texture component of the left-eye-view.

component_type[i][j] equal to 8 indicates the component is a residual video or texture component of the right-eye-view.

component_type[i][j] equal to 9 indicates the component is a residual video or texture component of both-eye-view.

component_type[i][j] equal to 10 indicates the component is a overlay.

component_type[i][j] from 11 to 15, inclusive, are reserved for future use.

depth_near[i] and depth_far[i] specifies the minimum and maximum distances from the image plane to objects of the i-th component, in units of $2^{-16}$ degrees, respectively.

view_regeneration_info_flag[i] equal to 1 indicate that the information for view generation process of the i-th component. view_regeneration_flag[i] equal to 0 indicate that the information for view generation process of the i-th picture is not provided.

reserved_zero_7 bits[i] shall be equal to 0 and other values for reserved_zero_7 bits[i] are reserved for future use. Decoders shall ignore the value of reserved_zero_7 bits[i].

patch_filling_flag[i] equal to 1 indicate the information for the patch filling module in the view generation process of the i-th component is present in this SEI message. patch_filling_flag[i] equal to 0 indicate the information for the patch filling module in the view generation process of the i-th component is not present in this SEI message.

local_disparity_compensation_flag[i] equal to 1 indicate the information for the local disparity compensation module in the view generation process of the i-th component is present in this SEI message. local_disparity_compensation_flag[i] equal to 1 indicate the information for the local disparity compensation module in the view generation process of the i-th component is not present in this SEI message.

block_boundary_processing_flag[i] equal to 1 indicate the information for the block boundary process module in the view generation process of the i-th component is present in this SEI message. block_boundary_processing_flag[i] equal to 1 indicate the information for the block boundary process module in the view generation process of the i-th component is not present in this SEI message.

reserved_zero_5 bits[i] shall be equal to 0 and other values for reserved_zero_5 bits[i] are reserved for future use. Decoders shall ignore the value of reserved_zero_5 bits[i].

num_patched_blocks[i] specifies the number of patches which are to be used for the view regeneration of the i-th component.

regenerated_picture_top_left_index_x[i][j], regenerated_picture_top_left_index_y[i][j], regenerated_picture_bottom_right_index_x[i][j], and regenerated_picture_bottom_right_index_y[i][j] specifies the (x, y) pixel location of the top-left and bottom-right corner of the j-th block of the i-th component of regenerated picture, in the units of luma samples. The values of regenerated_picture_top_left_index_x[i][j], regenerated_picture_top_left_index_y[i][j], regenerated_picture_bottom_right_index_x[i][j], and regenerated_picture_bottom_right_index_y[i][j] shall be in the range of 0 to 65 535, inclusive.

patch_view_id specifies the i-th identifying number of the viewing position or head position of the regeneration process. This value should be one of the pre-defined identifying number of a viewing positions of a 3DoF+ video specified in the same or in the other SEI message, such as mrwp_view_id specified in the multiview region-wise packing SEI message.

patch_component_id specifies the i-th identifying number of a component of a viewing position or head position of the regeneration process. This value should be one of the pre-defined identifying number of a component that belongs to a viewing positions of a 3DoF+ video specified in the same or in the other SEI message, such as mrwp_component_id specified in the multiview region-wise packing SEI message.

patch_top_left_index_x[i][j], patch_top_left_index_y[i][j], patch_bottom_right_index_x[i][j], and patch_bottom_right_index_y[i][j] specifies the (x, y) pixel location of the top-left and bottom-right corner of the j-th patch block for the i-th component, in the units of luma samples. The values of patch_top_left_index_x[i][j], patch_top_left_index_y[i][j], patch_bottom_right_index_x[i][j], and patch_bottom_right_index_y[i][j] shall be in the range of 0 to 65 535, inclusive.

num_blocks[i] specifies the number of patches which are to be used for the view regeneration of the i-th component.

In some applications, num_blocks[i] could represent the remaining blocks that constitute the entire picture of the i-th component except the patch blocks whose numbers are given by num_patched_blocks[i]. In other words, the i-th component is consist of patch blocks and blocks with locally disparity compensation so the the sum of num_blocks[i] and num_patched_blocks[i] equal to the total number of blocks in the i-th component. If this is the case, there should be a constraint that the whole picture shall be covered by the patch blocks and local disparity compensation blocks.

In the other applications, it could be allowed that the whole picture might is not covered by patch block and local disparity compensation blocks. In this case, the remaining regions could be covered by the global disparity compensation by allowing the signaling of global disparity compensation regardless of the value of local_disparity_compensation_flag[i].

num_ref_pictures_minus1[i][j] specifies the number of reference pictures that are used to estimate or to predict the j-th local block of the i-th component.

ref_view_id[i][j][k] specifies the identifying number of the viewing position of the k-th reference picture that is used to estimate (to regenerate, to reconstruct, or to predict) the j-th local block of the i-th component. This value should be one of the pre-defined identifying number of a viewing positions of a 3DoF+ video specified in the same or in the other SEI message, such as mrwp_view_id specified in the multiview region-wise packing SEI message.

ref_component_id[i][j][k] specifies the identifying number of the k-th component of a reference viewing position or head position that is used to estimate (to regenerate, to reconstruct, or to predict) the j-th local block of the i-th component. This value should be one of the pre-defined identifying number of a component that belongs to a viewing positions of a 3DoF+ video specified in the same or in the other SEI message, such as mrwp_component_id specified in the multiview region-wise packing SEI message.

ref_top_left_index_x[i][j][k], ref_top_left_index_y[i][j][k], ref_bottom_right_index_x[i][j][k], and ref_bottom_right_index_y [i][j][k] specifies the (x, y) pixel location of the top-left and bottom-right corner that describes the k-th region of a reference picture that is used to estimate (to regenerate, to reconstruct, or to predict) the j-th local block of the i-th component, in the units of luma samples. The values of ref_top_left_index_x[i][j][k], ref_top_left_index_y[i][j][k], ref_bottom_right_index_x[i][j][k], and ref_bottom_right_index_y[i][j][k] shall be in the range of 0 to 65 535, inclusive.

inter_picture_local_offset_x[i][j][k] and inter_picture_local_offset_y [i][j][k] specify the offset between the location of the k-th region of a reference picture specified by ref_top_left_index_x[i][j][k], ref_top_left_index_y[i][j][k], ref_bottom_right_index_x[i][j][k], and ref_bottom_right_index_y[i][j][k] from the location of the ratget block specified by ref_top_left_index_x[i][j][k], ref_top_left_index_y[i][j][k], ref_bottom_right_index_x[i][j][k], and ref_bottom_right_index_y[i][j][k], in units of luma samples.

hor_scaling_factor[i][j][k] and ver_scaling_factor[i][j][k] specify the spatial scaling factor of the k-th block of a reference picture that is used to estimate (to regenerate, to reconstruct, or to predict) the j-th local block of the i-th component, in the horizontal and vertical directions, in units of $2^{-16}$ luma samples, respectively. The values of hor_scaling_factor[i][j][k] and ver_scaling_factor[i][j][k] shall be in the ranges from 0 to $65\ 536*2^{16}-1$ (i.e., 4 294 967 295), inclusively.

compensation_local_weight[i][j][k] specifies the weight factor of the k-th region of a reference picture that is used to estimate (to regenerate, to reconstruct, or to predict) the j-th local block of the i-th component. When the value of num_ref_pictures_minus1[i][j] is above zero, the pixel values of the target region is calculated by the weighted mean of the pixel values in the corresponding pixel location in the regions of the reference pictures, where the weighting value for the k-th reference picture is given by compensation_local_weight[i][j][k]. When the value of num_ref_pictures_minus1[i][j] is equal to zero, the weight is assumed to be equal to one.

inter_picture_global_offset_x[i][j] and inter_picture_global_offset_y [i][j] specify the offset between the location of the k-th reference picture from the the i-th ratget picture for view regeneration, in units of luma samples.

compensation_global_weight[i][j] specifies the weight factor of the j-th reference picture that is used to estimate (to regenerate, to reconstruct, or to predict) the i-th component. When the value of num_ref_pictures_minus1[i] is above zero, the pixel values of the target region is calculated by the weighted mean of the pixel values in the corresponding pixel location in the regions of the reference pictures, where the weighting value for the j-th reference picture is given by compensation_global_weight[i][j]. When the value of num_ref_pictures_minus1[i] is equal to zero, the weight is assumed to be equal to one.

block_boundary_processing_type[i] specifies the type of block boundary smoothing filter used for the view regeneration process.

num_coeffs_minus1[i] specifies the number of coefficients of the block boundary processing.

block_boundary_filter_coeff[i][j] specifies the value of the filter coefficient in the units of $2^{-16}$. The value of block_boundary_filter_coeff[i][j] shall be in the range of $-32768*2^{16}-1$ (i.e., $-2147483647$) to $32768*2^{16}$ (i.e., 2147483648), inclusive.

The view regeneration information SEI message is referred to signaling information or metadata in the specification. The meaning of regeneration is similar to the meaning of reconstruction according to embodiments. The view regeneration information SEI message is generated in the apparatus for transmitting a video according to embodiments of the present invention, for example, in the inter-view redundany removal operation. In the usage of the view regeneration information SEI message, the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved at the apparatus for transmitting a video and the apparatus for receiving a video according to embodiments of the present invention.

Due to the view regeneration information SEI message, the transmitter and/or the receiver can provide multiple methodologies to support efficient delivery of multiple spherical images which represent different viewing position of a viewpoint are provided.

FIG. 26 illustrates an example end-to-end flow chart of multi-view 3DoF+ video.

An apparatus for transmitting a video and an apparatus for receiving a video can be represented from end to end system point of view as depicted in FIG. 26.

An example usage of view regeneration information is VR/AR applications for 3DoF, 3DoF+ or higher. End-to-end flow chart of multi-view 3DoF+ video is described which is composed by multi-view packing and inter-view redundancy removal before the encoding process and unpacking and view regeneration after the decoding process, including selection. In each process, the view regeneration information can be generated or used.

A real-world audio-visual scene (A) is captured by audio sensors as well as a set of cameras or a camera device with multiple lenses and sensors. The acquisition results in a set of digital image/video ($B_i$) and audio ($B_a$) signals. The cameras/lenses typically cover all directions around the centre point of the camera set or camera device, thus the name of 360-degree video.

The images (Bi) captured by texture/depth camera lenses at the same time instance and/or different head position and/or different viewpoint are stitched, possibly rotated, projected per view and/or viewpoint. In addition, to increase the bit efficiency of the encoded videos, inter-view redundancy due to the adjacent views are removed and then mapped onto a packed picture (D).

The inter-view redundancy removal and multi-view packing is specifically descriebd in FIG. 33. The encoder or the transmitter according to embodiments of the present invention can provide effects that the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved.

The packed pictures (D) are encoded as coded images ($E_i$) or a coded video bitstream ($E_v$). The captured audio ($B_a$) is encoded as an audio bitstream ($E_a$). The coded images, video, and/or audio are then composed into a media file for file playback (F) or a sequence of an initialization segment and media segments for streaming ($F_s$), according to a particular media container file format. The media container file format might be the ISO Base Media File Format. The file encapsulator also includes metadata into the file or the segments, such as view regeneration information and multi-view region-wise packing information assisting in rendering the decoded packed pictures.

The metadata in the file includes:

the location and rotation of a local sphere coordinate representing a view or a head position, the location and rotation difference of a local sphere of a view or a head position from the anchor view, the projection format of the projected picture of a view or a head position, the coverage of the projected picture of a view or a head position, multi-view region-wise packing information, view regeneration information and region-wise quality ranking.

The segments $F_s$ are delivered using a delivery mechanism to a player.

The file that the file encapsulator outputs (F) is identical to the file that the file decapsulator inputs (F'). A file decapsulator processes the file (F) or the received segments ($F'_s$) and extracts the coded bitstreams ($E'_a$, $E'_v$, and/or $E'_i$) and parses the metadata. The audio, video, and/or images are then decoded into decoded signals ($B'_a$ for audio, and D' for images/video). The decoded packed pictures (D') are unpacked to each viewing position and then reconstruct each view with view regeneration process. Then a view which corresponding to the viewer's viewing position is constructed with view synthesizer. The generated view is then projected onto the screen of a head-mounted display or any other display device based on the current viewing orientation or viewport and/or view (head position) and/or viewpoint and the projection, spherical coverage, rotation. Likewise, decoded audio ($B'_a$) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used by the video and audio decoders for decoding optimization.

The unpacking, view regeneration, view synthesis are specifically described in FIG. 34. The dencoder or the receiver according to embodiments of the present invention can provide effects that the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved.

Details of the Embodiments

In this embodiment, another example of defining view regeneration information with the multi-view packing information.

FIGS. 27-30 illustrate a Multiview Packing and View Regeneration information SEI message syntax.

An apparatus for transmitting a video and an apparatus for receiving a video according to embodiments of the present invention can generate or use the multiview packing and view regerneaion information. The view regeneration information as mentioned above can be generaged or delivered with the multiview packing information as FIGS. 27-30. Also, the multivew packding and view regeneration information can refer to signaling informaiton in the specification.

The multiview packing and view regeneration SEI message provides information to enable remapping of the colour samples of a region in the cropped decoded pictures onto projected pictures for different viewing positions as well as information on the location and size of the guard bands, if any. In addition, this SEI message provides information to enable regeneration of the pictures for a viewing positions derived from pictures from other viewing positions and partial region or information from the viewing position.

view_regeneration_flag[i] equal to 1 indicate that the i-th picture is not a full picture so view regeneration process is needed in the decoder post-process to show or use the viewing position. view_regeneration_flag[i] equal to 0 indicate that the i-th picture is a full picture so the view regeneration process could be skipped in the decoder post-process.

quality_index[i][j][k] specify the quality of the region. For example, the value quality_index[i][j][k] could indicate the QP value of the region which could be utilized in the view regeneration process or block boundary filtering process, etc.

The other semantics follows the definitions of Multiview Region-wise packing SEI message and View regeneration information SEI message semantics.

The multiview region-wise packing SEI message provides information to enable remapping of the colour samples of the cropped decoded pictures onto projected pictures as well as information on the location and size of the guard bands, if any.

multiview_regionwise_packing_id contains an identifying number that may be used to identify the purpose of the multiview region-wise packing. The value of multiview_regionwise_packing_id may be used to indicate the different use cases of this SEI message, to support different receiver capabilities, or to indicate sub-pictures which could be used to construct sphere image, panoramic image, multiview image, or multi-viewpoint image, etc.

When more than one multiview region-wise packing SEI message is present with the same value of multiview_regionwise_packing_id, the content of these multiview region-wise packing SEI messages shall be the same. When multiview regionwise packing SEI messages are present that have more than one value of multiview_regionwise_packing_id, this may indicate that the information indicated by the different values of multiview_regionwise_packing_id are alternatives that are provided for different purposes or that a cascading of correction or projection is to be applied in a sequential order (an order might be specified depending on the application). The value of multiview_regionwise_packing_id shall be in the range of 0 to $2^{12}1$, inclusive.

multiview_regionwise_packing_cancel_flag equal to 1 indicates that the multiview region-wise packing SEI message cancels the persistence of any previous multiview region-wise packing SEI message in output order that applies to the current layer. Multiview_regionwise_packing_cancel_flag equal to 0 indicates that multiview region-wise packing information follows.

multiview_regionwise_packing_persistence_flag specifies the persistence of the multiview region-wise packing SEI message for the current layer.

multiview_regionwise_packing_persistence_flag equal to 0 specifies that the camera lens information applies to the current decoded picture only.

Let picA be the current picture. multiview_regionwise_packing_persistence_flag to 1 specifies that the multiview region-wise packing SEI message persists for the current layer in output order until any of the following conditions are true:

A new CLVS of the current layer begins.

The bitstream ends.

A picture picB in the current layer in an access unit containing a multiview regionwise packing SEI message that is applicable to the current layer is output for which PicOrderCnt(picB) is greater than PicOrderCnt (picA), where PicOrderCnt(picB) and PicOrderCnt (picA) are the PicOrderCntVal values of picB and picA, respectively, immediately after the invocation of the decoding process for the picture order count of picB.

constituent_picture_matching_flag equal to 1 specifies that the projected region information, packed region information, and guard band region information in this SEI message apply individually to each constituent picture and that the packed picture and the projected picture have the same stereoscopic frame packing format indicated by the frame packing arrangement SEI message. constituent_picture_matching_flag equal to 0 specifies that the projected region information, packed region information, and guard band region information in this SEI message apply to the projected picture.

When StereoFlag is equal to 0, or StereoFlag is equal to 1 and frame_packing_arrangement_type is equal to 5, the value of constituent_picture_matching_flag shall be equal to 0.

packing_format_matching_between_views_flag equal to 1 specifies that the packed picture have the same packing format per viewing position or head position where the projection format is indicated by mrwp_projection_type. packing_format_matching_between_views_flag equal to 0 specifies that the different projection format is used for each viewing position.

num_view_minus1 plus 1 specifies the number of view or head position considered in the SEI message.

mrwp_view_id contains an identifying number that may be used to identify the view or head position. The value of mrwp_view_id[i] may be used to indicate the i-th view or head position. mrwp_view_id[i] could be used to indicate one or multiple regions for specific purposes, e.g., indication of sub-pictures corresponding to a head location that causes head motion parallax, or indication of sub-picture pair supporting binocular disparity of a head location, etc.

mrwp_anchor_view_flag equal to 1 indicate that the i-th view or head position with the i-th mrwp_view_id is the anchor (or center or representative) view or head position.

mrwp_anchor_view_flag equal to 0 indicate that the i-th view or head position is periperal view or head position.

mrwp_view_independent_rotation_flag equal to 1 indicate that the rotation of the i-th view or head position is different from the rotation of the center or anchor view or head position. mrwp_view_independent_rotation_flag equal to 0 indicate that the rotation of the i-th view or head position is identical to the rotation of the center or anchor view or head position.

mrwp_all_components_in_one_packedregion_flag equal to 1 indicate that the packed regions that consist the projected picture corresponds to the i-th view or head position are packed exclusively in a rectangular region. mrwp_exclusive_packing_flag equal to 0 indicate that the packed regions that corresponds to the i-th view or head position are not packed within a rectangular region.

mrwp_reserved_zero_5 bits shall be equal to 0 and other values for mrwp_reserved_zero_5 bits[i] are reserved for future use. Decoders shall ignore the value of mrwp_reserved_zero_5 bits[i].

mrwp_location_anchor_view_x[i], mrwp_location_anchor_view_y[i] and mrwp_location_anchor_view_z[i] indicate the location of head position related to mrwp_view_id [i] in the units of $2^{-16}$ millimeters. The range of mrwp_location_anchor_view_x[i], mrwp_location_anchor_view_y[i] and mrwp_location_anchor_view_z[i] shall be in the range of $-32768*2^{16}-1$ (i.e., $-2147483647$) to $32768*2^{16}$ (i.e., $2147483648$), inclusive.

mrwp_rotation_anchor_view_yaw[i], mrwp_rotation_anchor_view_pitch [i], and mrwp_rotation_anchor_view_roll [i] indicate the yaw, pitch, and roll rotation angles, respectively, that is applied to the unit sphere of head position related to mrwp_view_id[i], mrwp_location_anchor_view_x[i], mrwp_location_anchor_view_y[i], and mrwp_location_anchor_view_z[i] to convert the local coordinate axes to the global coordinate axes, in units of $2^{-16}$ degrees. The value of mrwp_rotation_anchor_view_yaw[i] shall be in the range of $-180*2^{16}$ (i.e., $-11796480$) to $180*2^{16}-1$ (i.e., $11796479$), inclusive, the value of mrwp_rotation_anchor_view_pitch[i] shall be in the range of $-90*2^{16}$ (i.e., $-5898240$) to $90*2^{16}$ (i.e., $5898240$), inclusive, and the value of mrwp_rotation_anchor_view_roll[i] shall be in the range of $-180*2^{16}$ (i.e., $-11796480$) to $180*2^{16}-1$ (i.e., $11796479$), inclusive. mrwp_rotation_anchor_view_yaw[i], mrwp_rotation_anchor_view_pitch[i], and mrwp_rotation_anchor_view_roll[i] could be used to indicate azimuth, elevation, and tilt, respectively.

mrwp_location_diff_x[i], mrwp_location_diff_y[i] and mrwp_location_diff_z[i] indicate the location of the i-th view or head position relative to the location of the view or head position of the anchor view in the units of $2^{-16}$ millimeters. The (x,y,z) location of the i-th view could be calculated by adding mrwp_location_anchor_view_x[i] and mrwp_location_diff_x[i], mrwp_location_anchor_view_y[i] and mrwp_location_diff_y[i], and mrwp_location_anchor_view_z[i] and mrwp_location_diff_z[i], respectively. The range of mrwp_location_diff_x[i], mrwp_location_diff_y[i] and mrwp_location_diff_z[i] shall be in the range of $-32768*2^{16}-1$ (i.e., $-2147483647$) to $32768*2^{16}$ (i.e., $2147483648$), inclusive.

mrwp_rotation_diff_yaw[i], mrwp_rotation_diff_pitch[i], and mrwp_rotation_diff_roll[i] indicate the yaw, pitch, and roll rotation angle of the i-th view relative to the anchor view in units of $2^{-16}$ degrees, respectively. The yaw, pitch, and roll rotation angles of the i-th view relative to the global coordinate could be calculated by adding mrwp_rotation_diff_yaw[i] and mrwp_rotation_anchor_view_yaw [i], mrwp_rotation_diff_pitch[i] and mrwp_rotation_anchor_view_pitch[i], and mrwp_rotation_diff_roll[i] and mrwp_rotation_anchor_view_roll[i], respectively. They are applied to the unit sphere of head position related to mrwp_view_id[i], mrwp_location_anchor_view_x[i], mrwp_location_anchor_view_y[i], and mrwp_location_anchor_view_z[i] to convert the local coordinate axes to the global coordinate axes.

The value of mrwp_rotation_diff_yaw[i] shall be in the range of $-180*2^{16}$ (i.e., $-11796480$) to $180*2^{16}-1$ (i.e., $11796479$), inclusive, the value of camera_rotation_diff_pitch[i] shall be in the range of $-90*2^{16}$ (i.e., $-5898240$) to $90*2^{16}$ (i.e., $5898240$), inclusive, and the value of mrwp_rotation_diff_roll[i] shall be in the range of $-180*2^{16}$ (i.e., $-11796480$) to $180*2^{16}-1$ (i.e., $11796479$), inclusive. mrwp_rotation_diff_yaw[i], mrwp_rotation_diff_pitch[i], and mrwp_rotation_diff_roll[i] could be used to indicate azimuth, elevation, and tilt, respectively.

num_component_minus1[i] plus 1 specifies the number of components in the i-th view considered in the SEI message.

mrwp_component_id[i][j] specifies an identifying number that may be used to identify the j-th component of the i-th view.

mrwp_component_type[i][j] specifies the type of the j-th component of the i-th view.
- mrwp_component_type[i][j] equal to 0 indicates the type of the component is unspecified.
- mrwp_component_type[i][j] equal to 1 indicates the component is a video component
- mrwp_component_type[i][j] equal to 2 indicates the component is a depth map.
- mrwp_component_type[i][j] equal to 3 indicates the component is an alpha channel.
- mrwp_component_type[i][j] equal to 4 indicates the component is a video component of the left-eye-view.
- mrwp_component_type[i][j] equal to 5 indicates the component is a video component of the right-eye-view.
- mrwp_component_type[i][j] equal to 6 indicates the component is a video component of both-eye-view.
- mrwp_component_type[i][j] equal to 7 indicates the component is a residual video component of the left-eye-view.
- mrwp_component_type[i][j] equal to 8 indicates the component is a residual video component of the right-eye-view.
- mrwp_component_type[i][j] equal to 9 indicates the component is a residual video component of both-eye-view.
- mrwp_component_type[i][j] from 10 to 15, inclusive, are reserved for future use.

mrwp_projection_type[i][j] specifies the type of the projection used in generating the projected picture from a 360 sphere.
- mrwp_projection_type[i][j] equal to 0 indicates the type of the projection is unspecified.
- mrwp_projection_type[i][j] equal to 1 indicates the equirectangular projection.
- mrwp_projection_type[i][j] equal to 2 indicates the cube map projection.
- mrwp_projection_type[i][j] from 3 to 15, inclusive, are reserved for future use.

mrwp_proj_picture_width[i][j] and mrwp_proj_picture_height[i][j] specify the width and height, respectively, of the j-th component of the i-th projected picture, in relative projected picture sample units. The values of mrwp_proj_picture_width and mrwp_proj_picture_height shall both be greater than 0.

mrwp_coverage_horizontal[i][j] and mrwp_coverage_vertical[i][j] specifies the horizontal and vertical ranges of the coverage of the j-th component of the i-th view or head position, in units of $2^{-16}$ degrees, respectively.

depth_near[i][j] and depth far[i][j] specifies the minimum and maximum distances from the image plane to objects of the j-th component of the i-th view or head position, in units of $2^{-16}$ degrees, respectively.

mrwp_rotation_component_diff_yaw[i][j], mrwp_rotation_component_diff_pitch[i][j], mrwp_rotation_component_diff_roll[i][j] indicate the yaw, pitch, and roll rotation angle difference of the j-th component of the i-th view relative to the reference rotation angle of the i-th view in units of $2^{-16}$ degrees, respectively. The yaw, pitch, and roll rotation angles of the j-th component of the i-th view relative to the global coordinate could be calculated by adding each difference values and the reference rotation angles, respectively.

The value of mrwp_rotation_component_diff_yaw[i] shall be in the range of $-180*2^{16}$ (i.e., −11796480) to $180*2^{16}-1$ (i.e., 11796479), inclusive, the value of camera rotation component diff pitch[i] shall be in the range of $-90*2^{16}$ (i.e., −5898240) to $90*2^{16}$ (i.e., 5898240), inclusive, and the value of mrwp_rotation_component_diff_roll [i] shall be in the range of $-180*2^{16}$ (i.e., −11796480) to $180*2^{16}-1$ (i.e., 11796479), inclusive. mrwp_rotation_component_diff_yaw[i], mrwp_rotation_component_diff_pitch[i], and mrwp_rotation_component_diff_roll[i] could be used to indicate azimuth, elevation, and tilt, respectively.

mrwp_packed_region_width[i][j], mrwp_packed_region_height[i][j], mrwp_packed_region_top [i][j] and mrwp_packed_region_left[i][j] specify the width, height, top sample row, and the left-most sample column, respectively, of the j-th component of the i-th projected region in relative packed picture sample units, either within the packed picture (when constituent_picture_matching_flag is equal to 0) or within the constituent picture of the packed picture (when constituent_picture_matching_flag is equal to 1).

num_packed_regions specifies the number of packed regions when constituent_picture_matching_flag is equal to 0. The value of num_packed_regions shall be greater than 0. When constituent_picture_matching_flag is equal to 1, the total number of packed regions is equal to num_packed_regions*2, and the information in each entry of the loop of num_packed_regions entries applies to each constituent picture of the projected picture and the packed picture.

packed_picture_width and packed_picture_height specify the width and height, respectively, of the packed picture, in relative packed picture sample units.

The values of packed_picture_width and packed_picture_height shall both be greater than 0.

It is a requirement of bitstream conformance that packed_picture_width and packed_picture_height shall have such values that packed_picture_width is an integer multiple of cropPicWidth and packed_picture_height is an integer multiple of cropPicHeight, where cropPicWidth and cropPicHeight are the width and height, respectively, of the cropped decoded picture.

num_view_id_minus1[i] plus 1 specifies the number of view indicators describing the i-th packed region. num_view_id_minus1[i] greater than 1 could represent that the i-th packed region is shared with the different views.

view_idx[i][j] specifies the j-th view indicator which describes the view information and projected picture information with regard to the i-th packed region. The value of view_idx[i][j] shall be match with one of the values of mrwp_view_id defined in the current SEI messege.

num_component_id_minus1[i][j] plus 1 specifies the number of the component view indicators describing the i-th packed region. num_component_id_minus1[i][j] greater than 1 could represent that the i-th packed region is shared amog the components of the j-th view.

component_idx[i][j][k] specifies the k-th component indicator of the j-th view which describes the component type, projection type and the size of the projected picture with regard to the i-th packed region. The value of component_idx[i][j][k] shall be match with one of the values of mrwp_component_id defined in the current SEI messege.

proj_region_width[i][j][k], proj_region_height[i][j][k], proj_region_top[i][j][k] and proj_region_left[i][j][k] specify the width, height, top sample row, and the left-most sample column, respectively, of the i-th projected region, either within the projected picture (when constituent_picture_matching_flag is equal to 0) or within the constituent picture of the projected picture (when constituent_picture_matching_flag is equal to 1). For this extension, the projected picture represents the projected picture of the component of the viewing position indicated by component_idx and view_idx.

proj_region_width[i][j][k], proj_region_height[i][j][k], proj_region_top[i][j][k], and proj_region_left[i][j][k] are indicated in relative projected picture sample units.

NOTE 1—Two projected regions may partially or entirely overlap with each other.

rwp_reserved_zero_4 bits[i] shall be equal to 0 in bitstreams conforming to this version of this Specification. Other values for rwp_reserved_zero_4 bits[i] are reserved for future use by ITU-T I ISO/IEC. Decoders shall ignore the value of rwp_reserved_zero_4 bits[i].

rwp_transform_type[i] specifies the rotation and mirroring to be applied to the i-th packed region to remap to the i-th projected region. When rwp_transform_type[i] specifies both rotation and mirroring, rotation applies before mirroring. The values of rwp_transform_type[i] are specified as follows.

rwp_transform_type[i] equal to 0 indicates that no transformation is used for the i-th packed region rwp_transform_type[i] equal to 1 indicates mirroring horizontally for the i-th packed region rwp_transform_type[i] equal to 2 indicates rotation by 180 degrees (anticlockwise) for the i-th packed region rwp_transform_type[i] equal to 3 indicates rotation by 180 degrees (anticlockwise) after mirroring horizontally for the i-th packed region rwp_transform_type[i] equal to 4 indicates rotation by 90 degrees (anticlockwise) before mirroring horizontally for the i-th packed region rwp_transform_type[i] equal to 5 indicates rotation by 90 degrees (anticlockwise) for the i-th packed region rwp_transform_type[i] equal to 6 indicates rotation by 270 degrees (anticlockwise) before mirroring horizontally for the i-th packed region rwp_transform_type[i] equal to 7 indicates rotation by 270 degrees (anticlockwise) for the i-th packed region rwp_guard_band_flag[i] equal to 0 specifies that the i-th packed region does not have a guard band. rwp_guard_band_flag[i] equal to 1 specifies that the i-th packed region has a guard band.

packed_region_width[i], packed_region_height[i], packed_region_top[i], and packed_region_left[i] specify the width, height, the top luma sample row, and the left-most luma sample column, respectively, of the packed region, either within the region-wise packed picture (when constituent_picture_matching_flag is equal to 0) or within each constituent picture of the region-wise packed picture (when constituent_picture_matching_flag is equal to 1).

packed_region_width[i], packed_region_height[i], packed_region_top[i], and packed_region_left[i] are indicated in relative region-wise packed picture sample units. packed_region_width[i], packed_region_height[i], packed_region_top[i], and packed_region_left[i] shall represent integer horizontal and vertical coordinates of luma sample units within the cropped decoded pictures.

NOTE 2—Two packed regions may partially or entirely overlap with each other.

rwp_left_guard_band_width[i] specifies the width of the guard band on the left side of the i-th packed region in relative region-wise packed picture sample units. When chroma_format_idc is equal to 1 (4:2:0 chroma format) or 2 (4:2:2 chroma format), rwp_left_guard_band_width[i] shall correspond to an even number of luma samples within the cropped decoded picture.

rwp_right_guard_band_width[i] specifies the width of the guard band on the right side of the i-th packed region in relative region-wise packed picture sample units. When chroma_format_idc is equal to 1 (4:2:0 chroma format) or 2 (4:2:2 chroma format), rwp_right_guard_band_width[i] shall correspond to an even number of luma samples within the cropped decoded picture.

rwp_top_guard_band_height[i] specifies the height of the guard band above the i-th packed region in relative region-wise packed picture sample units. When chroma_format_idc is equal to 1 (4:2:0 chroma format), rwp_top_guard_band_height[i] shall correspond to an even number of luma samples within the cropped decoded picture.

rwp_bottom_guard_band_height[i] specifies the height of the guard band below the i-th packed region in relative region-wise packed picture sample units. When chroma_format_idc is equal to 1 (4:2:0 chroma format), rwp_bottom_guard_band_height[i] shall correspond to an even number of luma samples within the cropped decoded picture.

When rwp_guard_band_flag[i] is equal to 1, rwp left guard band width[i], rwp_right_guard_band_width[i], rwp_top_guard_band_height[i], or rwp_bottom_guard_band_height[i] shall be greater than 0.

The i-th packed region as specified by this SEI message shall not overlap with any other packed region specified by the same SEI message or any guard band specified by the same SEI message.

The guard bands associated with the i-th packed region, if any, as specified by this SEI message shall not overlap with any packed region specified by the same SEI message or any other guard bands specified by the same SEI message.

rwp_guard_band_not_used_for_pred_flag[i] equal to 0 specifies that the guard bands may or may not be used in the inter prediction process. rwp_guard_band_not_used_for_pred_flag[i] equal to 1 specifies that the sample values of the guard bands are not used in the inter prediction process.

NOTE 3—When rwp_guard_band_not_used_for_pred_flag[i] is equal to 1, the sample values within guard bands in cropped decoded pictures can be rewritten even if the cropped decoded pictures were used as references for inter prediction of subsequent pictures to be decoded. For example, the content of a packed region can be seamlessly expanded to its guard band with decoded and re-projected samples of another packed region.

rwp_guard_band_type[i][j] indicates the type of the guard bands for the i-th packed region as follows, with j equal to 0, 1, 2, or 3 indicating that the semantics below apply to the left, right, top, or bottom edge, respectively, of the packed region:

rwp_guard_band_type[i][j] equal to 0 indicates that the content of the guard bands in relation to the content of the packed regions is unspecified. When rwp_guard_band_not_used_for_pred_flag[i] is equal to 0, rwp_guard_band_type[i][j] shall not be equal to 0.

rwp_guard_band_type[i][j] equal to 1 indicates that the content of the guard bands suffices for interpolation of sample values at sub-pel sample fractional locations within the packed region and less than one sample outside of the boundary of the packed region.

NOTE 4—rwp_guard_band_type[i][j] equal to 1 can be used when the boundary samples of a packed region have been copied horizontally or vertically to the guard band.

rwp_guard_band_type[i][j] equal to 2 indicates that the content of the guard bands represents actual picture content that is spherically adjacent to the content in the packed region and is on the surface of the packed region at a quality that gradually changes from the picture quality of the packed region to that of the spherically adjacent packed region.

rwp_guard_band_type[i][j] equal to 3 indicates that the content of the guard bands represents actual picture content that is spherically adjacent to the content in the packed region and is on the surface of the packed region at a similar picture quality as within the packed region.

rwp_guard_band_type[i][j] values greater than 3 are reserved for future use by ITU-T|ISO/IEC. Decoders shall treat the value of rwp guard band type[i][j] when the value is greater than 3 as equivalent to the value 0.

rwp_guard_band_reserved_zero_3 bits[i] shall be equal to 0 in bitstreams conforming to this version of this Specification. Other values for rwp_guard_band_reserved_zero_3 bits[i] are reserved for future use by ITU-T|ISO/IEC. Decoders shall ignore the value of rwp_guard_band_reserved_zero_3 bits[i].

The variables NumPackedRegions, PackedRegionLeft[n], PackedRegionTop[n], PackedRegionWidth[n], PackedRegionHeight[n], ProjRegionLeft[n], ProjRegionTop[n], ProjRegionWidth[n], ProjRegionHeight[n], and TransformType[n] are derived as follows:

For n in the range of 0 to num_packed_regions—1, inclusive, the following applies:

PackedRegionLeft[n] is set equal to packed_region_left[n].

PackedRegionTop[n] is set equal to packed_region_top[n].

PackedRegionWidth[n] is set equal to packed_region_width[n].

PackedRegionHeight[n] is set equal to packed_region_height[n].

ProjRegionLeft[n] is set equal to proj_region_left[n].

ProjRegionTop[n] is set equal to proj_region_top[n].

ProjRegionWidth[n] is set equal to proj_region_width[n].

ProjRegionHeight[n] is set equal to proj_region_height[n].

TransformType[n] is set equal to rwp_transform_type[n].

If constituent_picture_matching_flag is equal to 0, the following applies:

NumPackedRegions is set equal to num_packed_regions.

Otherwise (constituent_picture_matching_flag is equal to 1), the following applies:

NumPackedRegions is set equal to 2*num_packed_regions.

When TopBottomFlag is equal to 1, the following applies:

projLeftOffset and packedLeftOffset are both set equal to 0.

projTopOffset is set equal to proj_picture_height/2 and packedTopOffset is set equal to packed_picture_height/2.

When SideBySideFlag is equal to 1, the following applies:

projLeftOffset is set equal to proj_picture_width/2 and packedLeftOffset is set equal to packed_picture_width/2.

projTopOffset and packedTopOffset are both set equal to 0.

For n in the range of NumPackedRegions/2 to NumPackedRegions—1, inclusive, the following applies:

nIdx is set equal to n—NumPackedRegions/2.

PackedRegionLeft[n] is set equal to packed_region_left[nIdx]+packedLeftOffset.

PackedRegionTop[n] is set equal to packed region top[nIdx]+packedTopOffset.

PackedRegionWidth[n] is set equal to packed_region_width[nIdx].

PackedRegionHeight[n] is set equal to packed_region_height[nIdx].

ProjRegionLeft[n] is set equal to proj_region_left[nIdx]+projLeftOffset.

ProjRegionTop[n] is set equal to proj_region_top[nIdx]+projTopOffset.

ProjRegionWidth[n] is set equal to proj_region_width[nIdx].

ProjRegionHeight[n] is set equal to proj_region_height[nIdx].

TransformType[n] is set equal to rwp_transform_type[nIdx].

For each value of n in the range of 0 to NumPackedRegions—1, inclusive, the values of ProjRegionWidth[n], ProjRegionHeight[n], ProjRegionTop[n], and ProjRegionLeft[n] are constrained as follows:

ProjRegionWidth[n] shall be in the range of 1 to proj_picture_width, inclusive.

ProjRegionHeight[n] shall be in the range of 1 to proj_picture_height, inclusive.

ProjRegionLeft[n] shall be in the range of 0 to proj_picture_width—1, inclusive.

ProjRegionTop[n] shall be in the range of 0 to proj_picture_height—1, inclusive.

If ProjRegionTop[n] is less than proj_picture_height/VerDiv1, the sum of ProjRegionTop[n] and ProjRegionHeight[n] shall be less than or equal to proj_picture_height/VerDiv1. Otherwise, the sum of ProjRegionTop[n] and ProjRegionHeight[n] shall be less than or equal to proj_picture_height/VerDiv1*2.

For each value of n in the range of 0 to NumPackedRegions—1, inclusive, the values of PackedRegionWidth[n], PackedRegionHeight[n], PackedRegionTop[n], and PackedRegionLeft[n] are constrained as follows:

PackedRegionWidth[n] shall be in the range of 1 to packed picture width, inclusive.

ProjRegionHeight[n] shall be in the range of 1 to packed picture height, inclusive.

PackedRegionLeft[n] shall be in the range of 0 to packed picture width—1, inclusive.

PackedRegionTop[n] shall be in the range of 0 to packed picture height—1, inclusive.

If PackedRegionLeft[n] is less than packed picture width/HorDiv1, the sum of PackedRegionLeft[n] and PackedRegionWidth[n] shall be less than or equal to packed picture width/HorDiv1. Otherwise, the sum of PackedRegionLeft[n] and PackedRegionWidth[n] shall be less than or equal to packed picture width/HorDiv1*2.

If PackedRegionTop[n] is less than packed picture height/VerDiv1, the sum of PackedRegionTop[n] and PackedRegionHeight[n] shall be less than or equal to packed picture height/VerDiv1. Otherwise, the sum of PackedRegionTop[n] and PackedRegionHeight[n] shall be less than or equal to packed picture height/VerDiv1*2.

When chroma format idc is equal to 1 (4:2:0 chroma format) or 2 (4:2:2 chroma format), PackedRegionLeft[n] shall correspond to an even horizontal coordinate value of luma sample units, and PackedRegionWidth[n] shall correspond to an even number of luma samples, both within the decoded picture.

When the chroma format idc is equal to 1 (4:2:0 chroma format), PackedRegionTop[n] shall correspond to an even vertical coordinate value of luma sample units, and ProjRegionHeight[n] shall correspond to an even number of luma samples, both within the decoded picture.

In the usage of signaling information as mendtioned above, the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved at the apparatus for transmitting a video and the apparatus for receiving a video according to embodiments of the present invention.

FIG. 31 illustrates Aa example implementation of pre-encoding process for multi-views 3DoF+ video.

An example pre-encoding processing for the multi-view video for 3DoF+ or head motion parallax is described. As shown in the figure, each view could be composed by different components, texture and depth map, which are produced into a projected picture of each component of each view by stitching, rotation, projection and multi-view packing process. In addition, using redundancy between views, for example between anchor view and the right head motion view, the residual of texture, also depth or other components if possible, could be generated for subsidiary views. This could increase bit efficiency by eliminating redundant information between views. Ones the projected pictures of each view including texture, residual, and depth, they are packed into a single 2D image plane and then the video is encoded using single layer video encoder, such as HEVC or future video codec.

The apparatus for transmitting a video according to the present invention performs multi-view packing the pictures into a packed picture and each view for the picture includes different types of a texture and a depth map, and a residual of texture and a depth map are generated for a subsidiary view based on redundancy between each view.

The Multi-view packding(31004) packs the multi-viwes. The multi-views include the view 1(31001), the view 2(31002), . . . , the view N(31003). The view 1 can be an anchor view.

The view 1(31001) includes a texture and/or a depth which correspond to the soruce image. The stitching, rotation and projection are performed on each image. The projected picture and the metadata are generated.

The view2(31002) includes a texture and/or a depth. The stitching, rotation and projection are performed on the texture and/or the depth. The inter-view redundancy removal removes the redundancy for the inter-view, for example, between the view1(31001) and the view 2(31002). The projected picture which can correspond to the residual is generated for the texture.

The viewN(31003) includes a texture and/or a depth. The stitching, rotation and projection are performed on the texture and/or the depth. The projected pictures (the texture and the depth) and metadata are generated. The inter-view redundancy removal removes the redundancy for the inter-view. The projected picture(residual) and the projected picture(depth) are generated.

The encoding(31005) encodes the packed picture from the multi-view packing.

FIG. 32 illustrates an example implementation of post-decoder process for multi-views 3DoF+ video.

A concept of post-decoder process of multi-views 3DoF+ video is described. After decoding, the decoder post-processor could generate multiple projected pictures per view for each viewpoint. However, since not all the images are played on the display device, target projected pictures could be generated based on the viewer's viewpoint and viewing position. In this example, view B of viewpoint A is assumed to be selected and the related projected pictures, such as texture, residual, and depth map, could be inputs to the renderer before display. When the selected view is not a full view, view regeneration process is performed to reconstruct a view from the given pictures and additional information from patch or residual.

HEVC decoder(32001) decodes bitstream including pictures for multi viewpoints(viewpoint 1, . . . , viewpoint N) of multi views(view1, . . . , view N).

The multi-view unpacking for viewpoint(s)(32002) performs unpacking for each viewpoint. For example, with respect to the viewpoint A, pictures for the viewpoint A include pictures for multi views(view 1, . . . , viewN).

The multi-view unpacking for view(s)(32003) unpacks pictures for each view.

View regeneration(32004) regenerates a full picture from the given pictures and additional information from patch or residual.

Sphere coordinate conversion, view synthesis and rendering(32005) converts pictures into sphere coordinate data and synthesizes a view in order to render the view.

Display(32006) displays the view.

FIG. 33 illustrates example block diagram of encoder pre-processing modules.

Block diagram of encoder pre-processing for multi-views 3DoF+ video is described. Based on the high correlation between pictures in the adjacent viewing positions, the redundant pixel information between pictures is removed. After this process, less number of pictures which are used to estimate the removed pixel information is preserved while partial regions or residual of the regions which could not be predicted by the reserved pictured are remained with reduced size of data. The information which viewing position is reserved for full picture, which kind of information is remained in the other viewing positions, how the removed information could be derived, and how the picture of the viewing position could be regenerated is delivered with reconstruction parameter, such as view regeneration information SEI message. When the redundancy is removed, the remaining picture, patches, and residuals, etc are paced into one or multiple pictures. The packing information, such as the location and size of the the picture, patches, and residuals, the type of the pixels in the region, the location and size of the region in the original picture, the size of the original picture, etc are delivered with the packing metadata, such as Multiview region-wise packing information SEI message.

An apparatus for transmitting a video according to the present invention includes an inter-view redundancy remover, a packing unit, and/or an encoder.

The inter-view redundancy remover(33001) removes redundant information of pictures for viewing positions. Redundant pixel information between the pictures in adjacent viewing positions is removed.

The packing unit(33002) packs the pictures and generate packding information. In the packding process, similar video data can be packed.

The encoder(33003) encodes the pictures.

In other words, The encoder or the transmitter according to embodiemtns can process video sequecnes for multiple viewing positions so as to reduece redundancy in adjacent video sequences and pack video data which are similar to each other so as to increase the encoding performance and the encoding efficiency. Signaling information can be generated in each process, encoded, and transmitted.

FIG. 34 illustrates example block diagram of decoder post-processing modules.

Block diagram of decoder post-processing for multi-views 3DoF+ video is described. When the bitstreams are decoded, the decoded output picture are unpacked by using the packing metadata. In the metadata, the size, type, and the viewing position of the target picture, the size, type, location of each region are described. After the unpacking process, pictures in the missing viewing position are restored by the view regeneration process in aid of the reconstruction parameters. In this metadata, the size and the location of the patches and residuals, the method of estimating the removed pixel values, how to regenerate the missing pixel values, and post-filtering parameters for block boundary removal is described. With the regenerated and delivered pictures for multiple viewing positions, a single view corresponding to the viewer's viewing position is synthesized by view synthesis module.

The apparatus for receiving a video performs decoding(s), un-packing, view regeneration, and/or view synthesis.

The decoding(s)(34001) receives data from the apparatus for transmitting a video and decodes the data.

The un-packing(34002) performs an inverse operation of packding of the apparatus for transmitting a video. The un-packiing un-packs packed pictures in the decoded data. The un-packding may include un-packing for a full view, un-packding for a part of a viewport, and/or un-packing for related views. The un-packing may un-packing data based on packing metadata which is included in the decoded data.

The un-packding(or unpacking) generates a view including at least one of a texture picture, a depth picture, a texture patch, and/or a texture residual, for example, which are included in video data. Furthermore, a video seucqnece can include plurality of views in the specification. The views can be packed or unpacked so as to decreae the complexity of the ecoder and the decoder. As the redundancy for video data is removed at a transmitter, the decoder or the receiver according to embodiments needs to reconstruct or estimate video data.

The view regenerating(34003) regernates picture for multiple viewing position from the unpacked picture.

Specifically, the view regenerating includes selecting a picture for a viewing position and a viewport based on the signaling information, patch filling the picture based on the signaling information, performing a first disparity compensation of the picture based on the signaling information, and performing a second disparity compensation of the picture based on the signaling information. merging a full picture based on the patch filled picture and the disparity compensated picture, reducing blocking information, and/or rendering a picture of a viewport.

After the view regernationg process, the spheres or the views corresponding to each viewing position are generated. The spheres or the views are synthesized in the view synthesis process(34004).

For example, between a first view for first location and a second view for second location, a third view for third location which is middle location between the first location and the second location can be synthesized.

FIG. 35 illustrates example of view regeneration in the decoder post-processing.

The detailed flow chart of the decoder and the decoder post-process is described. In this example, HEVC single layer decoder is assumed but other codecs, such as AVC, SVC, MV-HEVC, could be used. After decoded picture is generated by HEVC decoder, packed regions corresponding to the target view and viewpoint are selected and projected pictures of each component, such as texture, residual, and depth map, are produced. If the generated projected pictures contain residual picture, the missing pixels values for a view shall be regenerated by using the given reference pictures of reference viewing positions. After having projected picture of texture of a target view, and also that of depth, each projected pictures are mapped onto a sphere coordinate and align the rotation of each sphere if needed. If the target view is not exactly match with the pictured provided in the decoded picture, views could be synthesized by using texture and depth map of adjacent existing view or views.

In each step, the following syntax elements described in the previous section is used.

Un-packing(35001): The syntax elements in the Multiview region-wise packing SEI message are used to fine the location, size, type of the regions corresponding to the view_id and component_id.

View regeneration process(35002): Source view/patch selection

For the pictures of the viewing positions whose view_regeneration_flag[i] equal to 0, the pictures could be directly delivered to view synthesizer or could be a candidate for the reference picture of the View regeneration process: Block based processing (35004)

Patch filling(35004-1): When patch filling flag[i] equal to 1, patch filling process is performed. The target region in the regenerated picture is described regenerated_picture_top_left_index_x[i][j], regenerated_picture_top_left_index_y[i][j], regenerated_picture_bottom_right_index_x[i][j], and regenerated_picture_bottom_right_index_y[i][j]. Also, the pixels which will fill in the target are described by patch_top_left_index_x[i][j], patch_top_left_index_y[i][j], patch_bottom_right_index_x[i][j], and patch_bottom_right_index_y[i][j] in the picture indicated by patch_component_id[i][j] of the viewing position patch_view_id[i][j].

Global disparity compensation(35004-2): When local_disparity_compensation_flag[i] equal to 0, global disparity compensation is performed. The reference picture and its viewing position is presented by ref_component_id[i][j] and ref_view_id[i][j]. The spatial offset of the reference picture from the target picture is given by inter_picture_global_offset_x[i][j][k] and inter_picture_global_offset_y[i][j][k]. When the multiple regions from reference pictures are used, the pixel value in each corresponding positions are averaged with weights given by compensation_global_weight[i][j][k].

Local disparity compensation(35004-3): When local_disparity_compensation_flag[i] equal to 1, local disparity compensation is performed. The target region in the regenerated picture is described regenerated_picture_top_left_index_x[i][j], regenerated_picture_top_left_index_y[i][j], regenerated_picture_bottom_right_index_x[i][j], and regenerated_picture_bottom_right_index_y[i][j]. Also, the pixels which will fill in the target are derived from a region described by ref_bottom_right_index_x[i][j][k], ref_bottom_right_index_y[i][j][k], inter_picture_local_offset_x[i][j][k], and inter_picture_local_offset_y[i][j][k] in the reference pictures indicated by ref_component_id[i][j][k] of a viewing position given by ref_view_id[i][j][k]. When the horizontal or vertical size of the regions are not match, the size of the region in the reference picture is scaled by hor_scaling_factor[i][j][k] and ver_scaling_factor[i][j][k]. Also the spatial offset of the region in the reference picture from the target region is given by inter_picture_local_offset_x[i][j][k] and inter_picture_local_offset_y[i][j][k]. When the multiple regions from reference pictures are used, the pixel value in each corresponding positions are averaged with weights given by compensation_local_weight[i][j][k]. In some cases, rotation of the region might be useful to estimate the missing pixel values from the reference pictures.

The block based processing means the view regeneration processing can be performed by accessing video data based on blocks.

View regeneration process: Merging(35005)

Generate a full picture: In one example, when there are patches that substitute a part of a regenerated picture, other empty regions could be filled with the estimated pixels from global or local disparity compensation or both or combination of them. In the other example, when there are residuals of a part of a regenerated picture, the region could be reconstructed by adding the residual with the estimated pixels from global or local disparity compensation, or both or combination of them. In the other example, both patches and residuals could be used to reconstruct a picture. In this case, the above to approaches, substitution by the patch and add the estimated region with the residual could be used according to the characteristics of the information.

View regeneration process: Block boundary processing (35006)

Based on the block boundary processing type given by block_boundary_processing_type[i] and the filter coefficient block_boundary_filter_coeff[i][j], the blocking artifact due to the different processes in the adjacent blocks or different directions of the offsets between the adjacent blocks are reduced.

Intermediate view generation(35007): Based on the viewer's viewing direction and viewing position, intermediate view is synthesized by using view synthesizer.

The viewing position and the viewing direction can be provided to the renderer(35008), the intermediate view generator, and/or the view regernator so that the receiver can generate a specific picture of a viewport, a full picture, a specific picture that a user is interested in.

For example, on the assumption that there are 24 views, the transmitter can transmit 12 views and the receiver can receive 12 views and estimate 12 views. In this regards, the transmitter can generate signaling information representing views to be estimated.

Accoridng to embodiments, a view can be divided into patches. The receiver needs to merge the patches to generate the view.

The Un-packing receives the decoded outputs. The decoded outputs means decoded pictures. The un-packing unpacket pictures packed at a transmitter side.

The soruce view/patch selection or the source view/patch selection with the selected viewing angle may generated patch data from the unpacked pictures based on referecen source view position.

The block based processing includes the patch filling, the global disparity compensation, and/or the local disparity compensation.

In the patch filling, a target region or target picture is filled with the patch data that is indicated by the signaling information with repect to viewing position which is processed by the block-based process. Also, the pixcels can fill in the target based on the signaling information.

In the global disparity compensation, the reference picture and its viewing position are presented by the signaling information. By using the offset information or the inter picture global offset, regions in the reference picture or the reference picture is compensated based on the offset information. The selected pictures can mean reference pictures.

In the local disparity compensation, target region in the regenerated picture or the selected pictures is presented by the signaling information. the pixels can fill in the target based on the signaling information or the inter picture local offset.

The merging merges the patch filled pictures, the global disparity compensated picutres, and/or the local disparity compensated picutres in order to a full picture as mentioned above.

The block boundary processing redueces the blocking artifact due to the different processes in the adjacent blocks or different directions of the offsets between the adjacent blocks based on the block information in the signaling information from the block based processing and/or the filter coefficient information in the signalgin information.

The intermediate view generation synthesizes the intermediate view, by using view synthesizer, based on the viewer's viewing direction and viewing position which can be acquired from a user side or the signaling information.

The renderer renders a picture of a viewport based on the viewer's viewing direction and viewing position which can be acquired from a user side or the signaling information.

Each operation of the view regeneration is performed based on the signaling information.

FIG. 36 illustrates an example of view regeneration in the decoder post-processing.

Other receiver implementation including the view regeneration is decribed.

The view regeneration(36001) may include the texture/depth prediction for source viewing position(36003).

The source view selection with the selected view angle (36002) can be corresponding to The source view selection in FIG. 35.

The texture/depth prediction for source viewing position includes the motion compensation (from view A)(36004), the motion compensation(from view B)(36005), the merging and/or the post-processing.

The motion compensation(36004, 36005) performs compensating data due to motion from view A by using a motion vector. Furthermore, data due to motion from view B also can be compensated based on the motion vector. Each the motion compensation is performed based on inter-view disparity information.

The merging(36006) merges the selected source view(or with the selected viewing angle) which is generated by the reference source view position, the viewing position and the viewing direction from pictures in the decoded and unpacted outputs and the motion-compensated data in order to generate a picture(s).

The post-processing(36007) can include the post-processing of FIG. 35.

The occlusion enhancement(36008) can process occlution based on the patch residual, The occlusion can be present because of the selected source view, the selected viewing angle, the viewing position, viewing direction and/or the reference soruce view position.

The intermediate view generation(36009) can generate an interdiate view from the pictures based on the interview disparity, the viewing position and/or the viewing direction.

The renderer(36010) renders the picture of a viewport based on the viewing positon and/or the viewing direction, Each operation of the view regeneration is performed based on the signaling information.

FIG. 37 illustrates a block diagram of 3DoF+ SW platform.

Each module of the block diagram can be corresponding to a softwate, a hardware or a processor. Central View Synthesis module:

This module will generate a plain and full ERP (texture+ depth) view in charge of conveying most of the visual information. The parameters of this module will be at minimum: 1) Resolution of the related stream, 2) Exact position of the central view Source View Pruning module(37001):

This module will make use of the depth buffer output by the Central View Synthesis module, and discard any pixel already projected. The parameters of this module will be at minimum: 1) Resolution of the related stream, 2) QP for the texture and QP for the depth Partitioning & packing module(37002):

When activated, this module browses the totality of the sparse source views, and implements the following 1) partitions each sparse source views, 2) discards empty partitions, packs them in a patch atlas on one or more streams, and generates additional informations accordingly.

View synthesis module(37003):

This module generates the final viewport just as RVS does, but accepts as input a heterogeneous set of texture+ depth videos complemented with the previously generated additional informations. It then synthetizes the view in ERP or perspective mode.

The central view synthesis(37004) can synthesis the central view from source view(s) including pictures. Each pictured includes a texture, a depth, and/or the texture and the depth.

The soruce view pruning(37001) can perform pruning on the soruce view from the soruce view(s) based on the central view.

The partitioning and packding(37002) generates packed video(s) which consists of a texture and/or a depth as mentioned above. The sparse view(s) includes a texture, a depth, and/or the texture and the depth.

The N streams HEVC coding(37005) performs coding streams including the packed video(s) based on a HEVC scheme.

The encoder or the transmitter transmits the coded data to the decoder or the receiver.

The N streams HEVC decoding(37006) performs decoding streams based on a HEVC scheme.

The ERP synthesis(37003) can synthesis the picture including the texture and/or the depth for the viewport.

The invention specifically explains the video pre-process including the image stitching, rotation and projection,the packing, the video metadata and the video post-process including the unpackding, the selection, the texture rendering, the depth rendering, and the metadata as mentioned above. The invention can be combined with each operation of the video pre-process and the video post-process.

FIG. 38 illustrates a method for transmitting a video according to embodiments of the present invention.

The method for transmitting a video according to embodiments of the present invention includes (S38001) removing redundant information of pictures for viewing positions, (S38002) packing the pictures and generate packding information, and/or (S38003) encoding the pictures as depicted in FIGS. 31 and 33.

FIG. 39 illustrates a method for receiving a video according to embodiments of the present invention.

The method for receiving a video according to embodiments of the present invention includes (S39001) decoding a video including a picture and signaling information, (S39002) un-packing the picture in the decoded video, and/or (S39003) view regenerating picture for multiple viewing position from the unpacked picture as dipicted in FIGS. 24-25, 35.

Specifically, the view regenerating includes (S39004) selecting a picture for a viewing position and a viewport based on the signaling information, (S39005) patch filling the picture based on the signaling information, (S39006) performing a first disparity compensation of the picture based on the signaling information, (S39007) performing a second disparity compensation of the picture based on the signaling information, (S39008) merging a full picture based on the patch filled picture and the disparity compensated picture, (S39009) reducing blocking information, and/or (S39010) rendering a picture of a viewport.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or."

For instance, the expression "A or B" may comprise 1) only A, 2) only B, and/or 3) both A and B. In other words, the term "or" in this document should be interpreted to indicate "additionally or alternatively."

The apparatus for transmitting a video, the apparatus for receiving a video according to embodiments of the present invention and/or internal modules/blocks thereof may perform the above-described embodiments.

A description will be given of the apparatus and/or the method according to embodiments of the present invention The internal blocks/modules, etc. of the apparatus and/or the method described above may correspond to processors that execute continuous operations stored in a memory, or hardware elements positioned inside/outside the apparatuses according to a given embodiment, or software elements.

The above-described modules may be omitted according to a given embodiment or replaced by other modules that perform similar/the same operations.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

MODE FOR THE INVENTION

Various embodiments have been described in the best mode for carrying out the invention.

INDUSTRIAL APPLICABILITY

The present invention is available in a series of VR fields.

The invention claimed is:

1. A method for transmitting a video, the method comprising:
removing inter-view redundancy of multi views for the video;
packing the video;
generating signaling information for the video; and
encoding the video and the signaling information,
wherein the signaling information includes an index of a reference view for a source view for the video,
wherein the signaling information further includes quality information for the video,
wherein the signaling information further includes position information of a patch for a view,
wherein the signaling information further includes an identifier of the view related to the patch,
wherein the signaling information further includes size information of the patch, and
wherein the signaling information further includes information for a view synthesis.

2. The method of claim 1, wherein the packing of the video includes multi-view packing pictures of the video into a packed picture and each view for the picture includes different types of a texture and a depth map, and
wherein a residual of texture and a depth map are generated for a subsidiary view based on redundancy between each view.

3. The method of claim 1, wherein the signaling information further includes information for inter-view redundancy removal and the multi-view packing, and
wherein the signaling information further includes depth information representing a range of depth for the view.

4. An apparatus for transmitting a video, the apparatus comprising:
a remover configured to remove inter-view redundancy of multi views for the video;
a packing module that includes a processor and that is configured to pack the video;
a metadata processor that is configured to generate signaling information for the video; and
an encoder configured to encode the video and the signaling information,
wherein the signaling information includes an index of a reference view for a source view for the video,
wherein the signaling information further includes quality information for the video,
wherein the signaling information further includes position information of a patch for a view,
wherein the signaling information further includes an identifier of the view related to the patch,
wherein the signaling information further includes size information for the patch, and
wherein the signaling information further includes information for a view synthesis.

5. The apparatus of claim 4, wherein the packing module performs multi-view packing pictures of the video into a packed picture and each view for the picture includes different types of a texture and a depth map, and
wherein a residual of texture and a depth map are generated for a subsidiary view based on redundancy between each view.

6. The apparatus of claim 5,
wherein the signaling information further includes information for an inter-view redundancy removal and the multi-view packing, and
wherein the signaling information further includes depth information representing a range of depth for the view.

7. A method for receiving a video, the method comprising:
receiving a video and signaling information for the video;
decoding the video and the signaling information;
un-packing the video based on the signaling information,
wherein the signaling information includes an index of a reference view for a source view for the video,
wherein the signaling information further includes quality information for the video,
wherein the signaling information further includes position information of a patch for a view,
wherein the signaling information further includes an identifier of the view related to the patch,
wherein the signaling information further includes size information for the patch, and
wherein the signaling information further includes information for a view synthesis;
view regenerating the un-packed video based on the signaling information, wherein inter-view redundancy is removed from the unpacked video; and
view synthesizing the view regenerated video.

8. The method of claim 7,
wherein the regenerating includes:
selecting a picture for a viewing position and a viewport based on the signaling information,
patch filling the picture based on the signaling information,
performing a first disparity compensation of the picture based on the signaling information,
performing a second disparity compensation of the picture based on the signaling information,
merging a full picture based on the patch filled picture and the disparity compensated picture,
reducing blocking information, and
rendering a picture of a viewport.

9. The method of claim 8,
wherein regions for a target view and view point in the picture are selected and a picture for a texture, residual and depth map are generated, and
wherein the signaling information includes depth information representing a range of depth for the view.

10. The method of claim 8,
wherein a target region is represented by the signaling information in the patch filling,
wherein a reference picture and a viewing position for the reference picture is represented by the signaling information in the first disparity compensation, and
wherein a target region is represented by the signaling information in the second disparity compensation.

11. An apparatus for receiving a video, the apparatus comprising:
a reception unit configured to receive the video and signaling information for the video;
a decoder configured to decode the video and the signaling information;
an un-packing module that includes a processor and that is configured to un-pack the video based on the signaling information, wherein the signaling information includes an index of a reference view for a source view for the video, wherein the signaling information further includes quality information for the video, wherein the signaling information further includes position information of a patch for a view, wherein the signaling information further includes an identifier of the view related to the patch, wherein the signaling information further includes size information for the patch, and wherein the signaling information further includes information for a view synthesis;

a view regenerator configured to regenerate the unpacked video based on the signaling information, wherein inter-view redundancy is removed from the unpacked video; and a renderer configured to render the video.

12. The apparatus of claim 11, wherein the view regenerator includes:

a selector that includes a processor and that is configured to select a picture for a viewing position and a viewport based on the signaling information;

a block processor configured to perform:

patch filling of the picture based on the signaling information, a first disparity compensation of the picture based on the signaling information, and a second disparity compensation of the picture based on the signaling information;

wherein the apparatus further comprises:

a merger configured to merge a full picture based on the patch filled picture and the disparity compensated picture; and a block boundary processor configured to reduce blocking information for the block processor.

13. The apparatus of claim 11, wherein regions for a target view and view point in a picture of the video are selected and a picture for a texture, residual, and depth map are generated, and wherein the signaling information further includes depth information representing a range of depth for a view.

14. The apparatus of claim 12, wherein a target region is represented by the signaling information in the patch filling, wherein a reference picture and a viewing position for the reference picture is represented by the signaling information in the first disparity compensation, and wherein a target region is represented by the signaling information in the second disparity compensation.

* * * * *